(12) United States Patent
Bartram et al.

(10) Patent No.: US 10,977,281 B2
(45) Date of Patent: Apr. 13, 2021

(54) REQUIREMENTS CHARACTERISATION

(71) Applicant: SHL GROUP LTD, Surrey (GB)

(72) Inventors: David Bartram, Surrey (GB); Steven John Fleck, Surrey (GB)

(73) Assignee: SHL Group Ltd, Surrey (GB)

( * ) Notice: Subject to any disclaimer, the term of this patent is extended or adjusted under 35 U.S.C. 154(b) by 481 days.

(21) Appl. No.: 14/227,103

(22) Filed: Mar. 27, 2014

(65) Prior Publication Data

US 2014/0344271 A1   Nov. 20, 2014

Related U.S. Application Data

(63) Continuation of application No. PCT/GB2012/052419, filed on Sep. 28, 2012.

(30) Foreign Application Priority Data

Sep. 29, 2011 (GB) .................................. 1116864.8
Nov. 14, 2011 (GB) .................................. 1119694.6

(51) Int. Cl.
   *G06F 17/30* (2006.01)
   *G06F 16/28* (2019.01)
   *G06Q 10/10* (2012.01)

(52) U.S. Cl.
   CPC .......... *G06F 16/285* (2019.01); *G06Q 10/10* (2013.01)

(58) Field of Classification Search
   CPC .. G06F 17/30598; G06F 16/285; G06Q 10/10
   See application file for complete search history.

(56) References Cited

U.S. PATENT DOCUMENTS

| 6,701,313 | B1* | 3/2004 | Smith | G06F 17/30607 |
| 8,082,168 | B1* | 12/2011 | Judy | G06K 9/6217 |
| | | | | 700/44 |
| 2003/0009479 | A1* | 1/2003 | Phair | G06Q 10/10 |
| 2004/0030566 | A1* | 2/2004 | Brooks Rix | G06Q 10/1053 |
| | | | | 705/321 |
| 2004/0111169 | A1* | 6/2004 | Hong | G06K 9/6217 |
| | | | | 700/44 |
| 2005/0197988 | A1* | 9/2005 | Bublitz | G06Q 10/105 |
| | | | | 706/46 |
| 2006/0235884 | A1* | 10/2006 | Pfenninger | G06Q 50/10 |

(Continued)

OTHER PUBLICATIONS

Wikipedia artical tittle "Kendall rank correction coefficient", 1938, 6 pages.*

(Continued)

*Primary Examiner* — Huawen A Peng
(74) *Attorney, Agent, or Firm* — Fish & Richardson P.C.

(57) ABSTRACT

A method of determining a requirements characterization profile for an entity is disclosed. The method comprises the steps of receiving classification parameters defining a requirement for an entity and selecting, in dependence on the classification parameters, a set of entities from a database of previously assessed entities. The method further comprises retrieving from the database characterization parameters of the selected set of entities, and constructing, in dependence on the characterization parameters, a requirements characterization profile for the entity. An apparatus is provided that comprised means for performing such a method.

17 Claims, 43 Drawing Sheets

(56) References Cited

U.S. PATENT DOCUMENTS

| | | | |
|---|---|---|---|
| 2006/0271421 A1* | 11/2006 | Steneker | G06Q 10/063112 705/7.14 |
| 2007/0015124 A1* | 1/2007 | Mobbs | G09B 7/00 434/219 |
| 2007/0015125 A1* | 1/2007 | Mobbs | G06Q 10/1053 434/219 |
| 2008/0059290 A1* | 3/2008 | McFaul | G06Q 10/063112 705/7.14 |
| 2008/0059523 A1* | 3/2008 | Schmidt | G09B 7/02 |
| 2009/0011395 A1* | 1/2009 | Schmidt | G09B 5/00 434/322 |
| 2009/0132313 A1* | 5/2009 | Chandler | G06Q 10/06 705/7.14 |
| 2009/0276294 A1 | 11/2009 | Roecker | |
| 2011/0196802 A1* | 8/2011 | Ellis | G06F 16/3329 705/321 |
| 2011/0313940 A1* | 12/2011 | Kerr | G06Q 10/10 705/321 |

OTHER PUBLICATIONS

Wikipedia.*
PCT International Search Report and the Written Opinion, PCT/GB2012/052419, dated Jan. 21, 2013, 13 pages.
Australian Patent Office, Examination Report No. 1 for AU Appl. No. 2018202108, dated Mar. 8, 2019, 5 pages.
European Patent Office, Extended European Search Report for EP Appl. No. 18169038.9, dated Sep. 10, 2018, 8 pages.

* cited by examiner

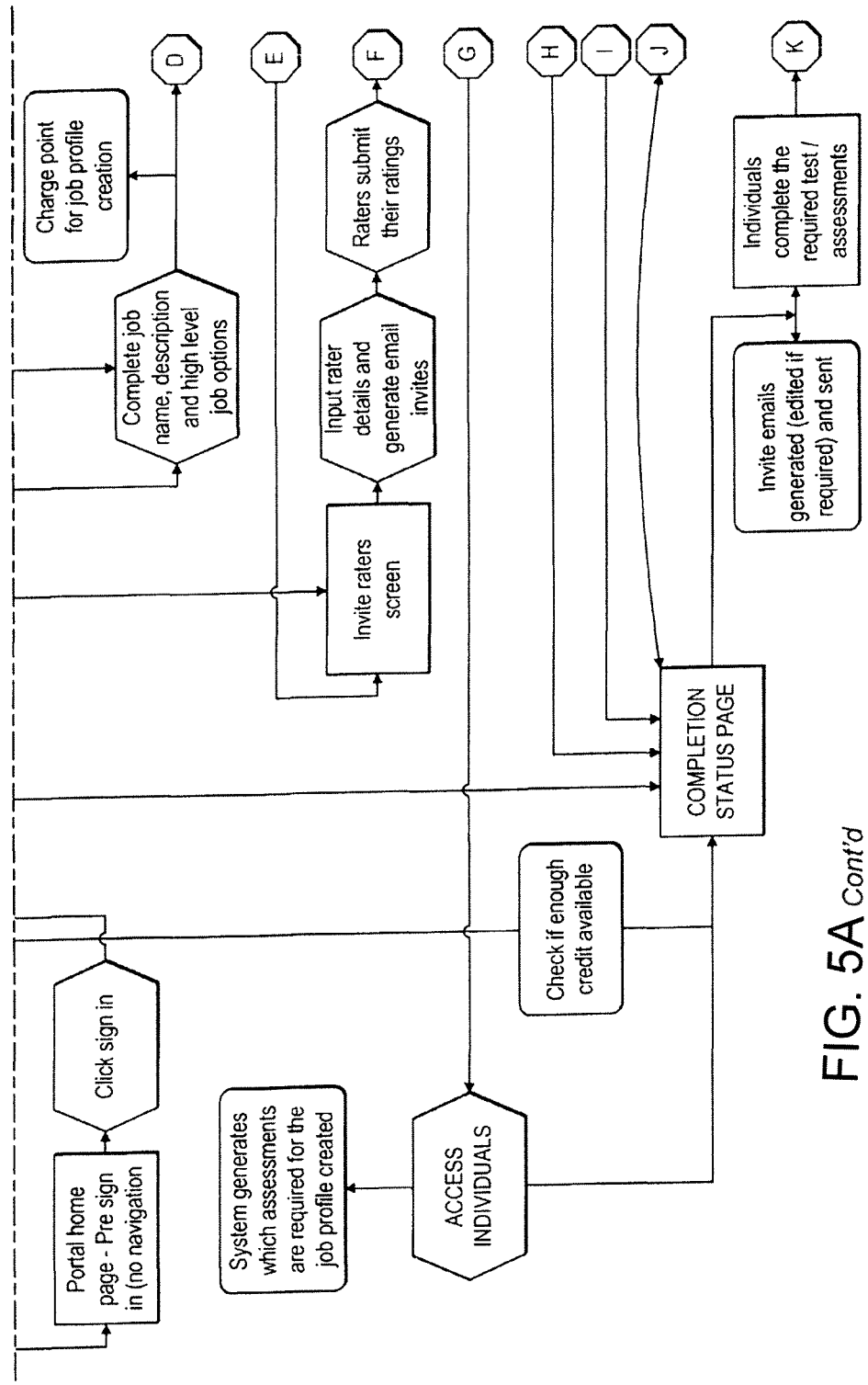
FIG. 5A *Cont'd*

FIG. 6

› The Library | › Available Applications | Welcome Gopal Krishnan | Site Actions ▼
home : shl.com : about SHL Central : contact us
my account : basket : order history : sign out
› My Applications | › Administration Tasks | Search

Welcome to
› What would you like to do today?

'My Applications' shows the list of applications you have access to. Clicking on one of these will take you straight to where you can use it. Go to Available Applications for details what you can use. Invitations to people you would like to take online assessments could be on their way within just a few minutes.
For more information, read about › Bureau You selected the assessments, languages, comparison groups and reports you need from our online catalogue, and enter the contact details of people you want to assess.

Bureau is currently available in the UK, south Africa, Australia, New Zealand, Hong Kong & Singapore.

› Find out more

› Applications

Our Applications are available to use by anyone, not just by HR Managers. They can be purchased instantly by credit card, or on your account.

- Taking on new staff?
- Concerned about losing your best people?
- Want to improve safety in your workplace?
- Need to improve sales team performance?

If the answer is 'Yes' to any of these questions, take a look at our Available Applications

› Find out more

| Site Map | Accessibility | Privacy | Terms of Use | Terms of Business

FIG. 7B

Create new job

*Available Applications* ▸ *My Applications* my account :: basket :: order history :: sign out

Search

Job title:
Job description:
Line manager: [List of jobs ▼]
Additional information (OPTIONAL):
Job related knowledge: [Input text content for inclusion in the Job Profile report]
Job related skills:
Job relatework experience:
Formal qualifications:

Select the job category that is the best match for this job from the classification framework. — 904
The job classification framework consists of levels ranging from broad job categories to very specific job categories. You can select your best matching job category at any level, but try to work your way down to the most detailed job classification level that you can.

906

Complete one box at a time – other boxes are greyed out

[Select occupation ▼]
[Select occupation ▼]
[Select occupation ▼]
[Select occupation ▼]

Select category: Sales Managers

[Next]

| Site Map | Accessibility | Privacy | Terms of Use | Terms of Business

| Central | | | |
|---|---|---|---|
| | | my account :: basket :: order history :: sign out | |
| » Available Applications | » My Applications | Search | |

Additional Information about the job

Below are a number of questions about the context of a job. Respond to the questions you think apply to the job you are focusing on, and that you know the answers to.

The background of the person who will do this job

| | |
|---|---|
| Education | Response options |
| Breadth of job-related | Response options ← 1102 |

The responsibilities of the job

| | |
|---|---|
| Level of reporting | Response options |
| Functional responsibility | Response options |
| Responsibility for resources | Response options |
| Total number of personnel that report to the | Response options |
| Direct reports | Response options |

To what extent the person the person doing this job accountable for the following

| | |
|---|---|
| Cash | Response options |
| Equipment | Response options |
| Public relations | Response options |
| Work methods | Response options |
| The safety of others | Response options |
| Sales performance | Response options |

What proportion of time does the person doing this job spend interacting with people in these groups

| | |
|---|---|
| Senior management level | Response options |
| Supervisory level | Response options |
| Administrative staff | Response options |
| Manual workforce | Response options |
| General public | Response options |

What proportion of time does the person doing this job spend on these activities

| | |
|---|---|
| Persuading others | Response options |
| Interviewing others | Response options |

~1100

Back

Charge point on this page once 'Create new job' is clicking the charge unit is deducted (assuming the user has enough credit on their account)

1104 — Create new job

| Site Map | Accessibility | Privacy | Terms of Use | Terms of Business

Below are a number of questions about the context of a job. Respond to the questions you think apply to the job you are focusing on, and that you know the answers to.

- Size of organisation [Does not apply ▼]

Background of the person who will be doing this job
- Education [Does not apply ▼]
- Breadth of job-related Knowledge [Does not apply ▼]

The responsibilities of the job
- Level of reporting [Does not apply ▼]
- Functional responsibility [Does not apply ▼]
- Responsibility for resources [Does not apply ▼]
- Personal responsibility [Does not apply ▼]
- Direct reports [Does not apply ▼]

What proportion of time does the person doing this job spend interacting with people in these groups
- Senior management level [Does not apply ▼]
- Supervisory level [Does not apply]
- Administrative staff [none]
- Manual workforce [occasional (1 - 9% of time)]
- General public [moderate (10 - 20% of time)]
  [frequent (21%+ of time)]

What proportion of time does the person doing this job spend on these activities
- Persuading others [Does not apply ▼]
- Interviewing others [Does not apply ▼]

How much does the accountability does the person doing this job have for the following
- Cash [Does not apply ▼]
- Equipment [Does not apply ▼]
- Public Relations [Does not apply ▼]
- Work Methods [Does not apply ▼]
- Others Safety [Does not apply ▼]
- Sales Performance [Does not apply ▼]

[Back]  [Next]

| Site Map | Accessibility | Privacy | Terms of Use | Terms of Business

FIG. 11C

Selected occupation -
SOC 17 : Architecture & Engineering

Calculation for a single competency - 1.1: Deciding and Initiating Action

Breakdown of number & proportion of jobs by competency importance levels  P(A)

| Competency importance (A) | NR | LR | R | E | Sum |
|---|---|---|---|---|---|
| Number of jobs | 40 | 31 | 44 | 72 | 187 |
| Occupation prior probabilities | 0.27 | 0.17 | 0.24 | 0.39 | 1 |

Seconds context variable (C): Education
Breakdown of number of jobs by context variable levels and competency importance levels

| Organisation size (B) | | NR | LR | R | E | Sum |
|---|---|---|---|---|---|---|
| 1-500 | 1 | 7 | 9 | 6 | 13 | 35 |
| 500-999 | 2 | 4 | 4 | 9 | 12 | 29 |
| 1000-1999 | 3 | 6 | 2 | 4 | 6 | 18 |
| 2000-19999 | 4 | 4 | 6 | 4 | 8 | 22 |
| 20000+ | 5 | 19 | 10 | 21 | 33 | 83 |
| | Sum | 40 | 31 | 44 | 72 | 187 |

Conditional probabilities:
Proportion of jobs by context variable levels and competency importance levels  P(B|A)

| Organisation size (B) | | NR | LR | R | E | Sum |
|---|---|---|---|---|---|---|
| 1-500 | 1 | 0.18 | 0.29 | 0.14 | 0.18 | 0.78 |
| 500-999 | 2 | 0.10 | 0.13 | 0.20 | 0.17 | 0.60 |
| 1000-1999 | 3 | 0.15 | 0.06 | 0.09 | 0.08 | 0.39 |
| 2000-19999 | 4 | 0.10 | 0.19 | 0.09 | 0.11 | 0.50 |
| 20000+ | 5 | 0.48 | 0.32 | 0.48 | 0.46 | 1.73 |
| | Sum | 1 | 1 | 1 | 1 | 4 |

Conditional probabilities  $P(B|A)P(A)$

| Organisation size categories | | NR | LR | R | E | Sum |
|---|---|---|---|---|---|---|
| 1-500 | 1 | 0.04 | 0.05 | 0.03 | 0.07 | 0.19 |
| 500-999 | 2 | 0.02 | 0.02 | 0.05 | 0.06 | 0.16 |
| 1000-1999 | 3 | 0.03 | 0.01 | 0.02 | 0.03 | 0.10 |
| 2000-19999 | 4 | 0.02 | 0.03 | 0.02 | 0.04 | 0.12 |
| 20000+ | 5 | 0.10 | 0.05 | 0.11 | 0.18 | 0.44 |
| | Sum | 0.21 | 0.17 | 0.24 | 0.39 | 1.00 |

$$P(A|B) = \frac{P(B|A)P(A)}{P(B)}$$

| Organisation size | NR | LR | R | E | Sum |
|---|---|---|---|---|---|
| Posterior probabilities from selected context variables level | 0.20 | 0.26 | 0.17 | 0.37 | 1.00 |

FIG. 13

Calculation for a single competency - 1.1: Deciding and Initiating Action

Selected occupation -
SOC 17 : Architecture & Engineering

Breakdown of number & proportion of jobs by competency importance levels — P (A)

| Competency importance | NR | LR | R | E | Sum |
|---|---|---|---|---|---|
| Number of jobs | 40 | 31 | 44 | 72 | 187 |
| Occupation prior probabilities | 0.27 | 0.17 | 0.24 | 0.39 | 1 |

P (A)

| Organisation size | NR | LR | R | E | Sum |
|---|---|---|---|---|---|
| Prior probabilities from occupation and context variables | 0.20 | 0.26 | 0.17 | 0.37 | 1.00 |

Seconds context variable (C): Education

Breakdown of number of jobs by context variable levels and competency importance levels

| Education (C) | | NR | LR | R | E | Sum |
|---|---|---|---|---|---|---|
| No to some postsecondary | 1 | 12 | 6 | 11 | 14 | 43 |
| College degree | 2 | 21 | 22 | 24 | 42 | 109 |
| Postgraduate degree | 3 | 7 | 3 | 9 | 16 | 35 |
| | Sum | 40 | 31 | 44 | 72 | 187 |

Conditional probabilities:
Proportion of jobs by context variable levels and competency importance levels — P (C|A)

| Education (C) | | NR | LR | R | E | Sum |
|---|---|---|---|---|---|---|
| No to some postsecondary | 1 | 0.30 | 0.19 | 0.25 | 0.19 | 0.94 |
| College degree | 2 | 0.53 | 0.71 | 0.55 | 0.58 | 2.36 |
| Postgraduate degree | 3 | 0.18 | 0.10 | 0.20 | 0.22 | 0.70 |
| | Sum | 1 | 1 | 1 | 1 | 4 |

Conditional probabilities

P (C|A)P(A)

| Education (C) | | NR | LR | R | E | Sum |
|---|---|---|---|---|---|---|
| No to some postsecondary | 1 | 0.06 | 0.05 | 0.04 | 0.07 | 0.22 |
| College degree | 2 | 0.17 | 0.18 | 0.09 | 0.22 | 0.60 |
| Postgraduate degree | 3 | 0.04 | 0.02 | 0.04 | 0.08 | 0.18 |
| | Sum | 0.20 | 0.26 | 0.17 | 0.37 | 1.00 |

$$P(A|C) = \frac{P(C|A)P(A)}{P(C)}$$

| Education | NR | LR | R | E | Sum |
|---|---|---|---|---|---|
| Posterior probabilities from selected context variables level | 0.20 | 0.14 | 0.20 | 0.47 | 1.00 |

*FIG. 14*

| SOC 11200000 | | | | | | |
|---|---|---|---|---|---|---|
| | Occupation (level 1) | 11000000 Management Occupation (2700) | | | Selected occupation level: ○ | |
| | Occupation (level 2) | 11200000 Advertising, Marketing, Promoters, Public Relation, and | | | ● | |
| | Occupation (level 3) | 11202000 Marketing and Sales Managers (359) | | | ○ | |
| | Occupation (level 4) | 11202200 sales Managers (250) | | | ○ | |
| Occupation Changed | | | | | # jobs: 411 | |
| | | | 1 | 2 | 3 | 4 |
| | Occupation | Occupational profile | 0.07 | 0.16 | 0.29 | 0.48 |
| 9 | Size of Organization | 1000 to 1999 | 0.06 | 0.06 | 0.21 | 0.67 |
| 5 | Education | Some post-secondary: AA | 0.05 | 0.06 | 0.25 | 0.65 |
| 5 | Breadth of job-related knowledge | Substantial across function | 0.06 | 0.07 | 0.09 | 0.78 |
| 1 | Level of reporting | 5+ steps to organization head | 0.07 | 0.12 | 0.10 | 0.70 |
| 10 | Functional responsibility | Managers non-routine funcs - minor impact | 0.02 | 0.13 | 0.08 | 0.76 |
| 6 | Responsibility for resources | $500,000-$999,000 | 0.01 | 0.14 | 0.11 | 0.74 |
| 9 | Total personnel | 51-100 | 0.02 | 0.04 | 0.07 | 0.87 |
| 3 | Direct reports | 2 | 0.01 | 0.03 | 0.10 | 0.86 |
| 2 | Contact - Senior management level | Occasional, 1-9% | 0.00 | 0.03 | 0.10 | 0.87 |
| 3 | Contact - supervisory level | Moderate, 10-20% | 0.00 | 0.02 | 0.10 | 0.87 |
| 3 | Contact - administrative staff | Moderate, 10-20% | 0.00 | 0.03 | 0.16 | 0.81 |
| 1 | Contact - Manual workforce | None | 0.00 | 0.03 | 0.17 | 0.79 |
| 3 | Contact - General public | Moderate, 10-20% | 0.00 | 0.03 | 0.20 | 0.76 |
| 3 | Contact Type - Persuading | Moderate, 10-20% | 0.00 | 0.03 | 0.20 | 0.77 |
| 2 | Contact Type -Interviewing | Occasional, 1-9% | 0.00 | 0.03 | 0.20 | 0.76 |
| 4 | Accountability - Cash | High | 0.00 | 0.02 | 0.16 | 0.82 |
| 3 | Accountability - Equipment | Moderate | 0.00 | 0.01 | 0.15 | 0.84 |
| 3 | Accountability - Public Relation | Moderate | 0.00 | 0.01 | 0.16 | 0.83 |
| 3 | Accountability - Work Methods | Moderate | 0.00 | 0.01 | 0.20 | 0.79 |
| 3 | Accountability - Others Safety | Moderate | 0.00 | 0.01 | 0.15 | 0.84 |
| 4 | Accountability - Sales performance | High | 0.00 | 0.01 | 0.16 | 0.84 |
| | | Final profile | 0.00 | 0.01 | 0.16 | 0.84 |

Central

Welcome Steven Fleck home : about : contact us

▸ Available Applications ▸ My Applications my account :: basket :: order history :: sign out Search | Job name and description

Rate Competency Important

The object of this rating task is to identify the most important activities of the job. The most important activities are those that define the essence of the job - without these activities, this would not be the same job. Activities that can central to a job are also critical for enabling the job holder to reach the overall objectives of the job. When an an activity is central to a job, it is likely that poor performance of this activity will prevent the over all job objectives from being reached.

Show more detailed instructions ▸

All 20 competencies to be displayed on one page

| | Not Part of the Job | Minor part of the job | Significant part of the job | Defining part of the job |
|---|---|---|---|---|
| ▯▯ Deciding and Initiating Action | | | ○ 2000 | |
| ▯▯ Leading and Supervising | | ○ | | |
| ▯▯ Working with People | | ○ | | |
| ▯▯ Working with People | ○ | | | |
| ▯▯ Adhering to Principals and Values | | | ○ | |
| ▯▯ Relating and Networking | ○ | | | |
| ▯▯ Persuading and Influencing | | | | |
| ▯▯ Presenting and Communicating Information | | | | |

[ Next ]

| Site Map | Accessibility | Privacy | Terms of Use | Terms of Business

People Performance                                              Welcome Gopal Krishnan     my account :: basket :: order history :: sign out
» Home  » My Applications  » Manage User                                                  [Type your search here]

Raters Status
This page shows all your raters and their statuses.
Use one or more of the fields below and click 'Search' to find raters.

E-mail              First Name       Last Name
[        ]          [        ]       [        ]

Job Title           Status
[Any ▼]             [Any ▼]          [Search]  [Show all]
         2300

Relationship
[Any ▼]
  2302

Add Raters                                                                         Group By: Rater Job
                                                                                   showing 1 to 2 of 2

<< First < Previous 1 Next > Last >>    Rows per page [10 ▼]

E-mail            First Name   Last Name    Title   Relationship    Job Title              Status
                                                                    Show / hide 3 jobs
niko@             niko         synodinos    Mr      HR Manager      asdf                   In Progress
                                                                    (Re-invite)            13/09/2011
                                                                    Test job               Invited
                                                                    (Re-invite)            13/09/2011
                                                                    A job                  Invited
                                                                    (Re-invite)            13/09/2011
mukul.chourey@    mukul        chourey      Mr      Line Manager    A job                  Invited
                                                                    (Re-invite)            13/09/2011

| Site Map | Accessibility | Privacy | Terms of Use | Terms of Business

FIG. 23B

| Home | Help | My Jobs | Rater Status | Completion Status | My Applications |

| Define New Job | Enter Additional Information | Set Competency Importance Levels | Finalise Job | Invite Candidates and Review Scores |

Chief Executive (CEO)
Rate the importance of each activity for this job. Show detailed instructions:
Select Raters: 2 of 2 raters selected — 2502

| Competency | Less Relevant for the Job | Relevant for the Job | Very Important for the Job | Critical for the Job |
|---|---|---|---|---|
| Deciding and Initiating Action | | | | 2 |
| Leading and Supervising | | 1 | 1 | |
| Working with People | | | 1 1 | |
| Adhering to Principals and Values | | 1 | 1 | 2506 — 2 |
| Relating and Networking | | | 1 | 2506 — 1 |
| Persuading and Influencing | | 2 | | |
| Presenting and Communicating Information | | | | |
| Writing and Reporting | 2000 — 2 | | 1 | |
| Applying Expertise and Technology | | 1 | | |
| Analysing | | | | 1 — 2500 |

Competency Importance rating: Conformation page

This is a summary of the importance categories you selected for each activity for this job. Have a look at the list, and then 'SAVE' or 'INVITE RATES.'

Defining part of the job
- Deciding and Initiating Action
- Deciding and Initiating Action
- Deciding and Initiating Action
- Deciding and Initiating Action
- Deciding and Initiating Action

Significant part of the job
- Deciding and Initiating Action
- Deciding and Initiating Action
- Deciding and Initiating Action
- Deciding and Initiating Action
- Deciding and Initiating Action

Minor part of the job
- Deciding and Initiating Action
- Deciding and Initiating Action
- Deciding and Initiating Action
- Deciding and Initiating Action
- Deciding and Initiating Action

Not part of the job
- Deciding and Initiating Action
- Deciding and Initiating Action
- Deciding and Initiating Action
- Deciding and Initiating Action
- Deciding and Initiating Action
- Deciding and Initiating Action
- Deciding and Initiating Action Job name and description 2600 — Save and lock down
2602 — Edit Once all ratings have been reviewed and the job creator has decided the importance rating for each competency (whilst subject to the banding rules) they view this summary / confirmation page

Marketing Managers (11202100)

Competencies

| | | 1.1 | 1.2 | 2.1 | 2.2 | 3.1 | 3.2 | 3.3 | 4.1 | 4.2 | 4.3 | 5.1 | 5.2 | 5.3 | 6.1 | 6.2 | 6.3 | 7.1 | 7.2 | 8.1 | 8.2 | Sum: |
|---|---|---|---|---|---|---|---|---|---|---|---|---|---|---|---|---|---|---|---|---|---|---|
| Size of Organization | 1 | | | | | | | | | | | | | | | | | | | | | 1 |
| Education | 2 | | | | | | | | | | | | | | | | | | | | | 10 |
| Breadth of job-related knowledge | 3 | | | | | | | | | | | | | | | | | | | | | 3 |
| Level of reporting | 4 | | | | | | | | | | | | | | | | | | | | | 6 |
| Functional responsibility | 5 | | | | | | | | | | | | | | | | | | | | | 4 |
| Responsibility for resources | 6 | | | | | | | | | | | | | | | | | | | | | 4 |
| Total personnel | 7 | | | | | | | | | | | | | | | | | | | | | 10 |
| Direct reports | 8 | | | | | | | | | | | | | | | | | | | | | 5 |
| Contact - Senior management level | 9 | | | | | | | | | | | | | | | | | | | | | 7 |
| Contact - Supervisory level | 10 | | | | | | | | | | | | | | | | | | | | | 8 |
| Contact - Administrative staff | 11 | | | | | | | | | | | | | | | | | | | | | 4 |
| Contact - Manual workforce | 12 | | | | | | | | | | | | | | | | | | | | | 2 |
| Contact - General public | 13 | | | | | | | | | | | | | | | | | | | | | 2 |
| Contact Type - Persuading | 14 | | | | | | | | | | | | | | | | | | | | | 7 |
| Contact Type - Interviewing | 15 | | | | | | | | | | | | | | | | | | | | | 10 |
| Accountability - Cash | 16 | | | | | | | | | | | | | | | | | | | | | 1 |
| Accountability - Equipment | 17 | | | | | | | | | | | | | | | | | | | | | 4 |
| Accountability - Public Relations | 18 | | | | | | | | | | | | | | | | | | | | | 11 |
| Accountability - Work Methods | 19 | | | | | | | | | | | | | | | | | | | | | 6 |
| Accountability - Others Safety | 20 | | | | | | | | | | | | | | | | | | | | | 3 |
| Accountability - Sales Performance | 21 | | | | | | | | | | | | | | | | | | | | | 6 |
| Sum: | | 4 | 14 | 8 | 8 | 5 | 6 | 4 | 6 | 0 | 2 | 3 | 1 | 11 | 6 | 4 | 3 | 4 | 9 | 9 | 7 | 114 |

REQUIREMENTS CHARACTERISATION

This application is a continuation of International Application PCTGB2012/052419, with an international filing date of Sep. 28, 2012.

FIELD OF THE INVENTION

This invention relates to apparatus for and method of providing a requirements characterization profile for an entity. In particular, the invention allows for the translation of a generic requirements request into a specific requirements request. Variants of the invention may allow for translation between different models of requirements between different organisations. The invention may also allow for the review and revision of the resulting requirements request. Embodiments of the invention may also provide recommendations of suitable assessments for determining whether the determined requirements are met. The invention has relevance to a wide number of fields in which a user is required to draw up a requirements request based on an apparently limited amount of relevant initial information, for example when a requirements request is required to be drawn up by a non-specialist. A specific example is presented in the field of human resources, describing how such a system may assist in drawing up a job description for a job vacancy.

BACKGROUND OF THE INVENTION

A common problem in many fields is that a requirements request—an order for a part, a request for tenders, even a job description—is often not fit for purpose. The request may be unhelpfully generic, resulting in many clearly unsuitable matches needing to be filtered out. In some cases, the request may be little more than a "wish list", specifying features which may have little bearing on what is actually required to fulfil the requirement. For example, features may be described as "essential" which in reality are not, resulting in potentially suitable matches being needlessly rejected. In other situations the request may fail to list (or give insufficient weighting to) important features, resulting in matches that later prove to be unsuitable.

These problems clearly result in inefficiencies, but in certain circumstances could also result in more serious consequences. For example, a request for a replacement machine part based on incomplete or inappropriate data which may result in an unsuitable part being used, and the part potentially failing catastrophically. Such a situation could arise, for example, when parts exactly matching the original are no longer manufactured and it may not be known precisely which features of the original part are essential and which could be approximated or ignored, without compromising performance or safety (but potentially resulting in a cost saving).

As a further example, in the field of human resources, a common complaint is that the hiring process is often imprecise and arbitrary. Typically, a manager (such as a line manager or human resources manager) decides themselves what features of a candidate are considered to be relevant for a particular job vacancy, draws up a corresponding job description comprising a list of required skills, experience and qualifications, and assesses candidates accordingly for the presence of those required skills, experience and qualifications. In some cases, a job specification would also list desirable competencies of a candidate. Invariably, however, the existence of a very wide range of possible requirements means that these lists of requirements are often poor tools for determining candidate suitability. This is perhaps unsurprising, given that those drawing up the hiring specification are usually unlikely to have exhaustive knowledge of all of the required skills, experience, qualifications and competencies deemed necessary. A poor job description is therefore often the weak link in the hiring process—and this may be true even if the subsequent assessment is entirely valid; the wrong competencies may be being assessed. The result may be the placing of candidates in unsuitable jobs, as well as jobs being filled by unsuitable (or at least non-optimal) candidates.

Generally, these situations may arise because of lack of knowledge and/or experience of the individual (perhaps a non-specialist in the area) tasked with drawing up the requirements request. Alternatively, there may simply be a lack of relevant information on which to base the requirements request.

The present invention aims to address at least some of these problems.

SUMMARY OF THE INVENTION

According to one aspect of the invention, there is provided a method of determining a requirements characterization profile for an entity, comprising the steps of: receiving classification parameters defining a requirement for an entity; selecting, in dependence on the classification parameters, a set of entities from a database of previously assessed entities; retrieving from the database characterization parameters of the selected set of entities; and constructing, in dependence on the characterization parameters, a requirements characterization profile for the entity.

Further features of the invention—which may be provided dependently on or independently of the above or any other aspect(s) of the invention, in any appropriate combination—preferably include:

At least one database, comprising entity data. Preferably, the entity data comprises assessment data (such as characteristics and/or performance data).

At least one server, for housing the at least one database. A plurality of servers may also be used, for example in a distributed or redundant arrangement.

A method of receiving an initial requirements request.

A method of receiving a requirements model.

A method of receiving a set of classification parameters. Preferably, the classification parameters allow an entity to be identified generally. More preferably, the classification parameters are in the form of a nested list of classes and sub-classes.

A method of identifying in dependence on the classification parameters a set of potential candidate entities.

A method of determining a characterization profile comprising a set of characterization parameters of the set of potential candidate entities. Preferably, only a subset of characterization parameters is used. More preferably, only the most significant characterization parameters are used. The most significant characterization parameters may comprise those deemed to be most relevant and least relevant. Preferably, the characterization parameters may be competencies.

A method of assigning the characterization parameters to an importance class. Preferably, the importance class may be one of: essential, desirable, relevant, non-relevant. Preferably, the method further comprises determining a characterization profile or model determined from, preferably comprising a subset of, the characterization parameters.

A method of determining the fraction of members of the set of potential candidate entities with characterization parameters in each of the importance classes. Preferably, the method further comprises determining the probability of a randomly selected member of the set of potential candidate entities having a characterization parameter in an importance class. More preferably, the method further comprises determining the probability for each of a set of characterization parameters for each of a set of importance classes.

A method of receiving a set of context parameters or variables. The classification parameters or variables may be determined from the answers to a series of questions concerning aspects of potential or candidate entities. Preferably, the method further comprises determining modifiers with which to adjust the probabilities in dependence on the context parameters. Preferably, the probability adjustment comprises a Bayesian probability calculation.

A method of determining a relevant set of context parameters. Preferably, the context parameters are determined in dependence on the classification of the entity. The context parameters may be determined from previously determined context parameters. Preferably, the number of context parameters used is in dependence on the classification of the entity. Preferably, the set of context parameters used is those which are determined to have potentially greatest effect on the resultant probabilities. The method of determining whether a context variable is deemed "relevant" may make use of Kendall's Tau-C statistic.

A method of generating a set of requirements or a requirements request in dependence on the determined probabilities and adjusted probabilities of characterization parameters and importance classes.

A method of receiving an adjustment input in respect of the set of requirements or the requirements request. Preferably, the adjustment input relates to assignment of a characterization parameter to an importance class. More preferably, the method further comprises adjusting the assignment of a characterization parameter to an importance class.

A method of forwarding the set of requirements or requirements request to a third party and for receiving adjustment inputs from the third party. The adjustment inputs from the third party may be distinguished by a suitable label, including representation of the third party adjustment input with a symbol, icon, identification number, and display of hover-over narrative.

A method of generating a revised set of requirements or requirements request in dependence on a received adjustment input.

A method of determining a suitable assessment method or technique in dependence on the set of requirements or requirements request for assessing potential or candidate entities; preferably, a method of selecting a plurality of assessment methods or techniques in dependence on the set of requirements or requirements request for assessing potential or candidate entities. Preferably:

a plurality of assessment methods or techniques is selected in dependence on a plurality of characterization parameters such as competencies a respective characterization parameter weighting, or an importance class, is associated with each characterization parameter, and, preferably, the plurality of assessment methods or techniques is further selected according to the characterization parameter weighting (or importance class), with, more preferably, only assessment methods or techniques related to higher weighted (or higher classified) characterization parameters being selected the plurality of selected assessment methods or techniques may be limited to a maximum number of assessment methods or technique the selected assessment methods or techniques may be optimised to relate to a maximum number of characterization parameters the selected assessment methods or techniques may be optimised to relate to a maximum number of characterization parameters in a particular importance class (for example 'high' importance)

the selected assessment methods or techniques may be optimised to relate to a maximum number of combined and weighted characterization parameters (for example using characterization parameter weightings)

a respective assessment method weighting is associated with each assessment method and characterization parameter A method of evaluating a plurality of assessment results to generate a plurality of characterization parameter results, preferably individual assessment results relating to a plurality of characterization parameters. A plurality of assessment results may be weighted and combined to generate a characterization parameter result.

A method of evaluating a plurality of characterization parameter results in dependence on a weighting input, said weighting input preferably being said characterization parameter weighting (or importance class). Preferably, an assessment score (preferably a single assessment score) is calculated in dependence on the plurality of assessment results and weighting inputs.

Integration of the method in a platform that enables further functionality, for example administration of candidate entities; submission of invitations to candidates to undertake an assessment; administration of assessment results; collecting, scoring, evaluating and/or reporting of assessment results; presentation of assessment results; and/or other functions relating to a characterization profile and potential candidate entities.

A method of determining a job specification, comprising: receiving a job classification; selecting from a database in dependence on the classification a set of matching job profiles; extracting for each matching job profile a set of assessed competencies; determining the relative relevance of each of the competencies to the job classification; and generating a job specification based on the determined relevant competencies. This may allow a user who has little understanding of job profiling to produce a set of required competencies that is based on competencies identified as important in previous profiles for similar jobs. It may also allow users to plan for future job vacancies and succession plans.

Preferably, the job classification comprises a standard classification, such as the Standard Occupational Classification (SOC) code as used by O*NET. The classification may be based on a hybrid of standard classifications, for example using the granularity provided by a first classification, in combination with the set of aggregations of levels provided by a second classification.

Preferably, the competencies are defined according to a competency model of a sufficient number of parameters to allow for compatibility by mapping to an externally supplied competency model. An example of such a model is the Universal competency Framework (UCF) developed by SHL Group.

The relevant competencies for a particular job may be determined from data compiled from assessments of workers employed in the same or similar jobs.

Preferably, the relevance of competencies of a job specification may be adjusted according to a set of contextual variables determined by answers provided by the user to questions relating to particulars of the job. The particulars may comprise a requirement of the job, the job environment or of the job candidate.

Preferably, the relevance of competencies of a job specification may be adjusted by a moderator to which the job specification is referred.

At least one server, for providing access for a client or user either directly or via a computer, for example via a web interface, to the results of processing.

One or more server functions may be combined in a single server.

Suitable computer servers may run common operating systems such as the Windows systems provided by Microsoft Corporation, OS X provided by Apple, various Linux or Unix systems or any other suitable operating system.

Suitable databases include ones based on SQL, for example as provided by Microsoft Corporation or those from Oracle or others.

Remote access to the analytics system may be provided via one or more web servers configured to provide a website or other remotely-accessible interface. Web interfaces and other code may be written in any suitable language including PHP and JavaScript. A Microsoft .Net based stack may be used.

A method, preferably as foresaid, further comprising determining a raw profile for the entity in direct dependence on the selection of the set of entities in dependence on the classification parameters.

Preferably, the requirements characterization profile is available alongside the raw profile.

Preferably, wherein the constructed requirements characterization profile can be overridden.

Preferably, wherein the requirements characterization profile is available in adjustable slider format, and preferably raw profile is available in fixed slider, more preferably both in conjunction with each other.

A method of facilitating the recruitment of a job candidate, comprising: receiving job classification information; optionally, receiving job context information; determining, in dependence on the job classification an initial competency profile; and, optionally, refining the competency profile in dependence on the job context information. Preferably, the method further comprises receiving and incorporating feedback on the competency profile. Preferably, the method further comprises determining a suitable assessment for assessing potential candidate for competencies in accordance with the competency profile.

Generally, a method and apparatus is provided for the translation of a generic requirements request into a specific requirements request based on the probabilistic analysis of historic assessment data of a population of entities matching classification parameters determined from the generic request. The term "competency" as used herein may refer generally to any measureable characteristic.

The invention also provides a computer program and a computer program product for carrying out any of the methods described herein, and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein, and/or for embodying any of the apparatus features described herein, a method of transmitting such a signal, and a computer product having an operating system which supports a computer program for carrying out the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

The invention will now be described, purely by way of example, with reference to the accompanying drawings, in which:

FIG. 6 shows the login page presented by the system;

FIGS. 7A-7B show examples of initial user interfaces presented by the system;

FIGS. 9A-9B show examples of initial specification description screens;

FIG. 10 shows the "create new job screen";

FIGS. 11A-11C show examples of context variable input screens;

FIGS. 13 and 14 show an example of the calculation of modified entity characteristics profile;

FIG. 15 shows in tabular form the evolution of characterization prior probabilities with successive iterations;

FIGS. 19A-19B show examples of an entity characteristics profile summary page;

FIGS. 20 to 22 show examples of an interactive profile modification facility;

FIG. 20 shows a Rate competency importance page;

FIG. 21 shows an example of a hover-over/pop-up panel;

FIGS. 22A-22C show the Rate competency importance page with adjustment;

FIGS. 23 to 26 show an external profile feedback facility;

FIGS. 23A-23B show a feedback progress screen, also termed a "Rater status" screen;

FIG. 24 shows the rater landing page;

FIGS. 25A-25B show the rater overview screen;

FIG. 26 shows the final profile review summary page;

FIG. 27 shows the completion status page;

FIGS. 28A-28B show examples of the job library page;

FIG. 29 shows an illustration of how the relevance of a context variable is determined.

DETAILED DESCRIPTION

Figure 1:
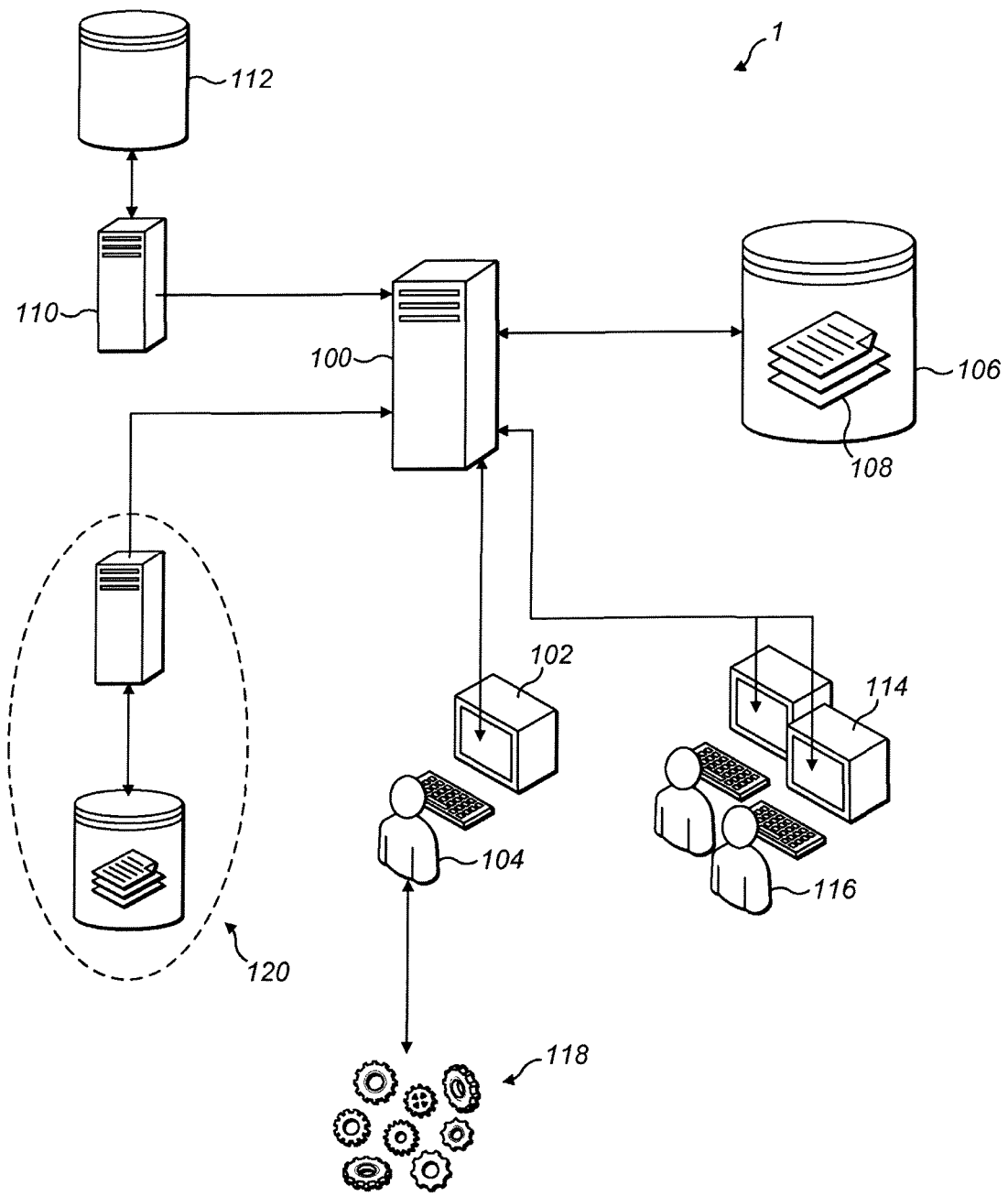
FIG. 1 shows an overview of a system for providing a requirements characterization profile for an entity.

FIG. 1 shows an overview of an expert system for providing a requirements characterization profile for an entity.

The system 1 comprises a server 100 adapted to send and receive data to and from a number of sources over a computer network, including a client terminal 102 from which it receives an initial entity requirements request and to which it transmits a calculated requirements characterization profile.

Server 100 provides access to a proprietary database 106 of entity assessment data 108. This data comprises the results of entity assessments assembled over many years. Database 106 is also used to store calculated requirements characterization profiles, preferably at various stages of computation and moderation.

The entities data 108 in the database 106 have previously been analysed in terms of characteristics and are classified according to classification parameters that allow sets of similar entities to be identified. Typically, the entities in the entity database are classified according to a master set of classification parameters sufficient in number to allow mapping to a preferred set of classification parameters, such as that obtained from external server 110. Where the externally supplied classification data is of superior quality for some fields it may be used to enhance the classification of the entity database 106.

Server 100 is optionally in communication with moderator terminals 114. Moderators 116 may be requested to pass comments, adjust or approve the determined requirements characterization profile.

Server 100 is also configured to determine suitable assessments to be applied to test candidate entities 118 according to the calculated requirements characterization profile.

In an exemplary embodiment, such a system is used in the field of human resources and facilitates the provision of job descriptions. Database 106 comprises a proprietary data set of competency assessments 108 derived from the results of approximately 7,000 unique jobs (the number of analyses increasing as more data is collected), that have been analysed, placed in the database, and mapped to the occupation classification system. Job analysis may be a time-intensive procedure, often requiring several days for a skilled analyst to accurately determine the competencies required for carrying out a particular job. The job analyses are classified according to a set of master classification parameters (typically 100 or more) which are then mapped to a standard occupation classification.

For example, O*Net is a job analysis database, which makes use of an occupation classification system called "O*Net SOC" to organise its job data. This is a more refined version of the US Government Department of Labor SOC framework, in the sense that at the most detailed level it provides more granularity. However, in the "O*Net SOC" does not make use of all the levels of aggregation provided by the standard SOC. In this embodiment, a modified classification is used, which uses the granularity provided by the O*Net SOC and the full set of aggregations of levels provided by the standard SOC. For example, a typical number of uniquely identifiable occupations at each level may be:

Level 4: 1171
Level 3: 449
Level 2: 96
Level 1: 23

Database 106 is therefore based on real-world data and allows for identification of the actual relevance of the various competencies of workers currently (or previously) in identical or similar jobs.

Figure 2:
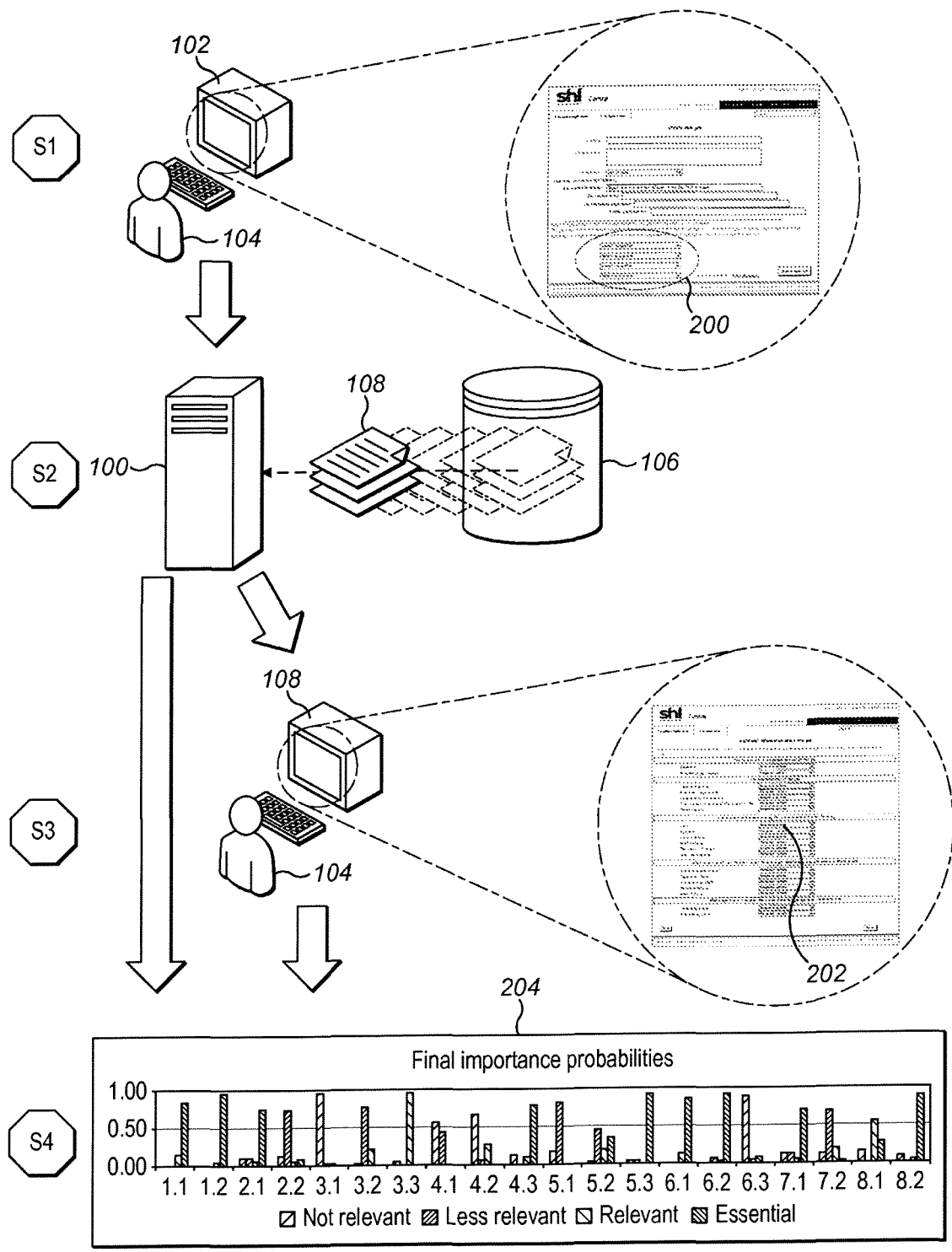
FIG. 2 shows, in overview, the system in use.

FIG. 2 shows, in overview, the system in use.

Step S1—User Profile Requested

User 104 selects the appropriate entity classification on terminal 102 from a drop down or cascade menu 200.

Step S2—Initial Profile Determined

Server 100 receives the selected classification from terminal 102 and looks-up entities 108 matching the classification from the entity database 106. In order to maintain statistical significance, a threshold minimum number of entities (dependent on the level of entity classification selected) is required to fall within the final classification, else the above classification is used. A representative set of defining characteristics is selected as the basis of the entity profile or fingerprint, and the relative proportion of entities matching the classification having the characteristic to specific extents is determined, thereby indicating whether each characteristic is—in order of relevance—"essential", "desirable", "relevant" or "non-relevant". This results in an initial or starting entity profile, essentially a distribution of the relative importance of the various characteristics. The profile is stored in the entity database.

Step S3—Profile Modified (Optional)

If the user wishes, the entity profile may be subsequently modified. One way of achieving this is by the use of context variables 202, determined by interaction with the user to establish further details of relevance. These context variables are used to modify the competency profile by means of Bayesian methods. Working with probabilities in this way allows for this new data to be taken into account, whereas traditional "frequentist" statistical methods applied to the entity database would be constrained to the frequency distribution of the existing data.

Step S4—Profile Finalised

The final entity profile relates the relevance of entity characteristics to the initial entity classification, for example shown as a histogram 204 detailing for each characteristic whether it is deemed "essential", "relevant", "partially relevant" or "not relevant". The profile is stored in the entity database.

The process by which an entity profile is calculated from the initial classification and the subsequently determined context variables is discussed in more detail below.

The resulting estimated characteristics profile can be used for example to draw up a specification request and subsequently used for matching to possible candidate entities. Alternatively, it can be used to inform further decision making regarding desired entity characteristics. The profile can also be used for benchmarking purposes.

Figure 3:
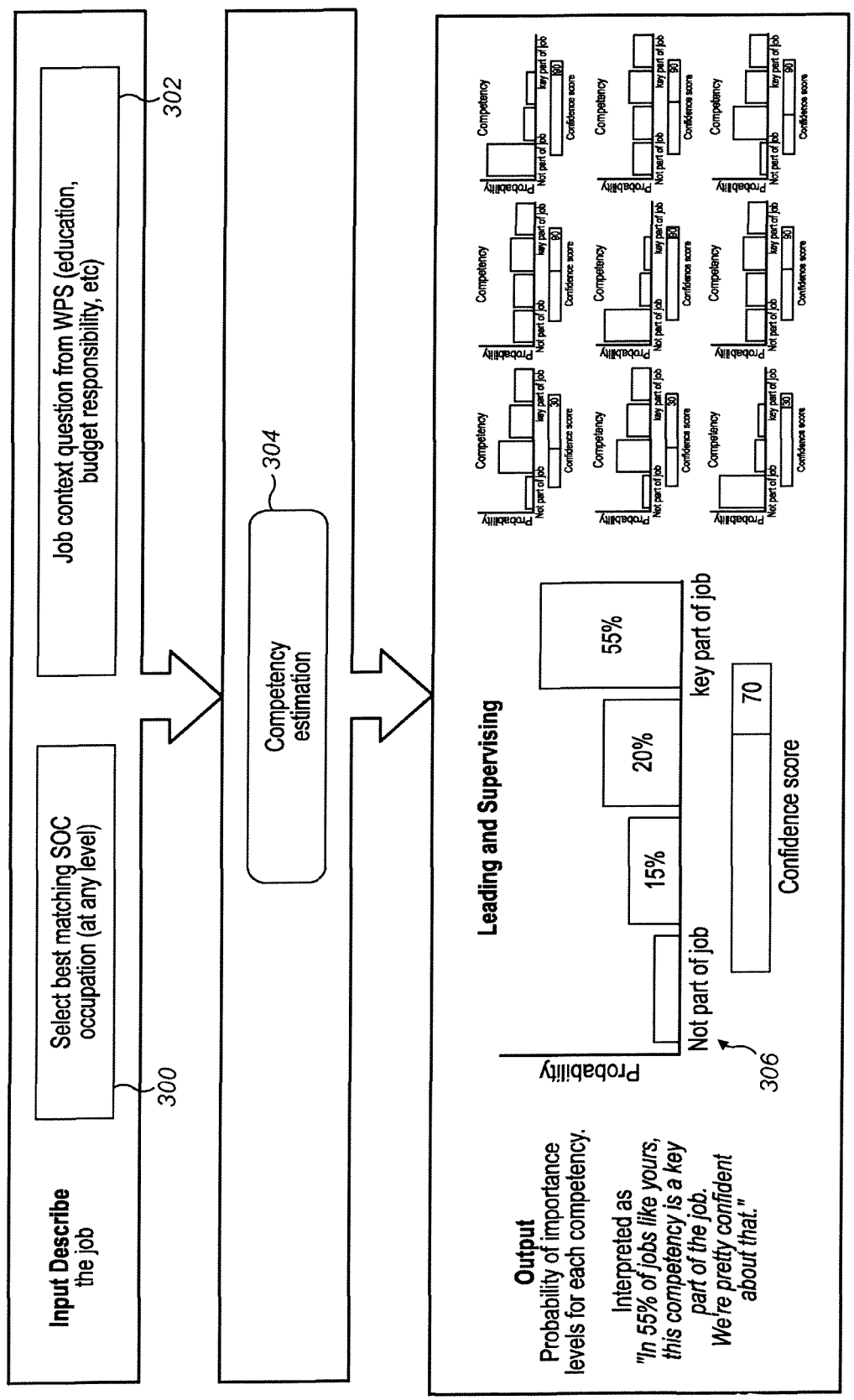
FIG. 3 shows in overview the system as applied in a human resources "job-matching" application.

FIG. 3 shows in overview the system as applied in a human resources "job-matching" application. The steps are analogous to those previously described.

Step S1—User Profile Requested

The user broadly identifies job from the "standard occupational classification" or SOC code by selecting from the options presented at each level of the SOC hierarchy 300 using drop-down menus.

Step S2—Initial Profile Determined

Job profiles within the chosen occupation classification are looked-up in the database (these typically number 30-40, but could range from a minimum of 16 to several thousand) and an occupation profile (based on representative competencies) for the selected job classification is calculated. This forms an initial occupation profile, detailing which competencies are deemed to be important for the job in question.

Step S3—Profile Modified (Optional)

Here, the modification process comprises defining the job in more detail 302. The user is asked approximately 20 questions (answers to which are selectable from drop-down menus) relating to job and the job environment, for example relating to the size of the organisation, specific educational requirements etc. The context questions asked are dependent on the occupation that has been selected. Analyses have been conducted to determine which set of context questions are most likely to influence importance of competencies, for each occupation. This information is used to adjust initial competency profile. For example, it may be known from the data that a particular competency, such as initiative, may be more important in smaller organisations.

Step S4—Profile Finalised

The resulting profile is a recommendation of relevant competencies for the job.

In order to maintain statistical significance, a threshold minimum number of jobs is required to fall within the final classification, else the above classification is used. This minimum number of jobs required for the selected occupation varies depending on the level of occupation selected. For example, the minimum required number of jobs may be:

Level 4: 40 jobs
Level 3: 40 jobs
Level 2: 20 jobs
Level 1: 16 jobs

In this embodiment, the user does not have the option to "modify" the profile by first inspecting the initial "prior" profile based on the occupation only, and then providing context variables to adjust the predicted profile. Rather, the user is required to provide the occupation code and has the option to provide one or more pieces of context information. The user then receives a predicted profile based on the input provided.

Generally, modification of the profile may refer to any changes the user makes to the profile away from the predicted profile. For example, the system may estimate that competency X is "A key part of the job", but the user can choose to classify competency X as "Not part of the job".

The resulting estimated competency profile can be used to draw up a job description and subsequently used for matching to job candidates, for example by identifying the best matched candidates for a job. Alternatively, it can be used to inform further decision making regarding the job competencies, for internal selection, promotion, succession or outplacement. The profile can also be used for benchmarking employees and organisations. The job profiles created could also be used to generate a shortlist of behavioural descriptions that can be used within a 360 feedback system.

Figure 4:
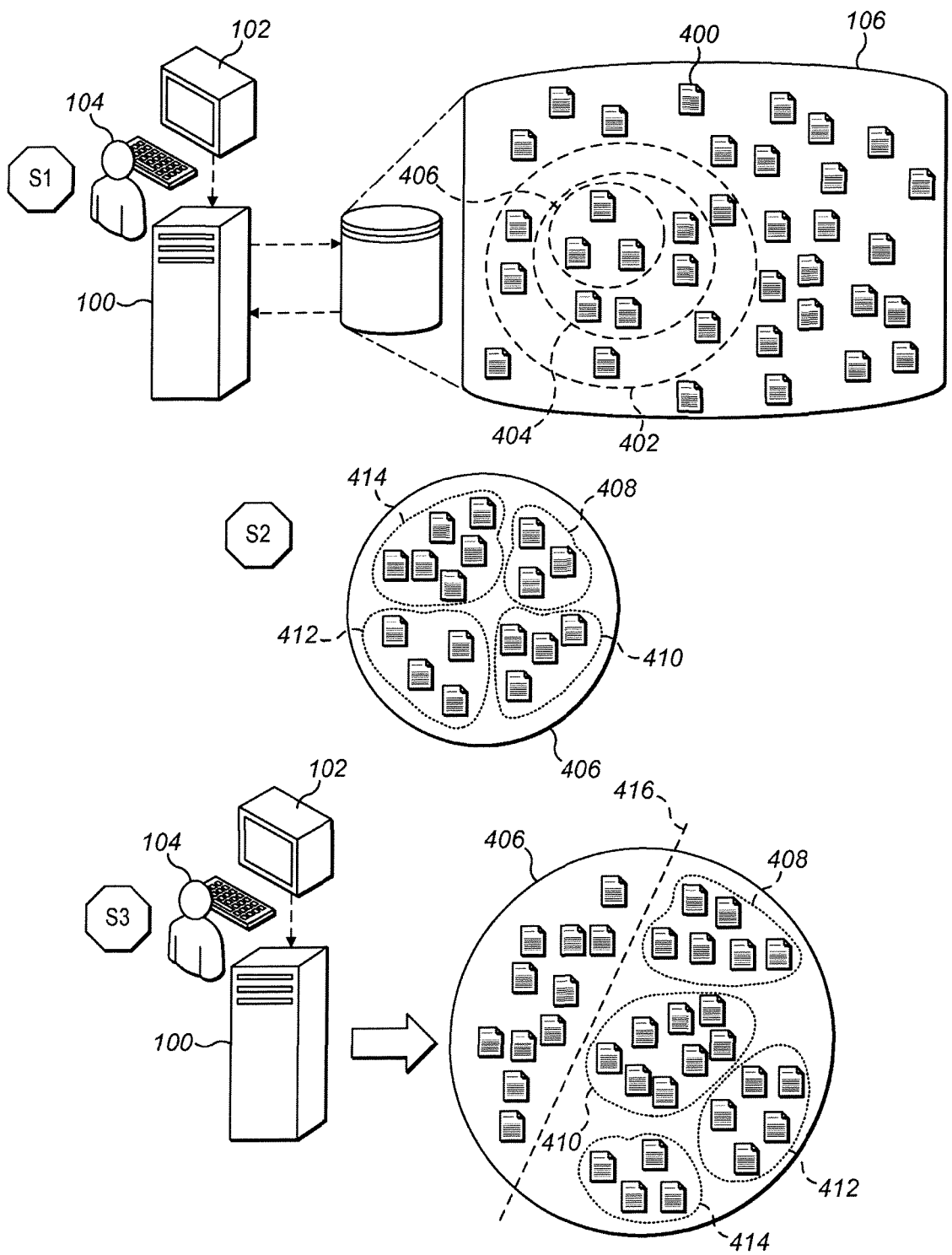
FIG. 4 shows the process of determining an initial entity characterization profile.

FIG. 4 shows the process of determining an initial entity characterization profile. A set of entities 406 is selected from the entity database 106 based on matching to the cascaded entity classification (higher level classifications: 402 and 404) submitted by the user. For each of a set of characteristics (determined as those which are most influential), the possible characteristic assessment results are divided into four groups—corresponding to very high (essential) 408, high (relevant) 410, low (partially relevant) 412 and very low (not relevant) 414 values—and the fraction of entities determined in each group. This results in a probability distribution for each characteristic, indicating from real-world data the significance of the particular characteristic for entities known to belong to that classification.

Also shown is the use of a context variable 416. Once an occupation has been selected, the number of jobs the estimation is based on is the number of jobs in the database mapped to that occupation code. This full set of jobs is drawn on for each context variable used. The only exception is rare instances of missing data i.e., an analysed job in the database might not provide a value for a context variable).

A revised conditional probability is calculated for the probability distribution for each characteristic, taking the factor represented by the value of the context variable into account.

Figure 5A:
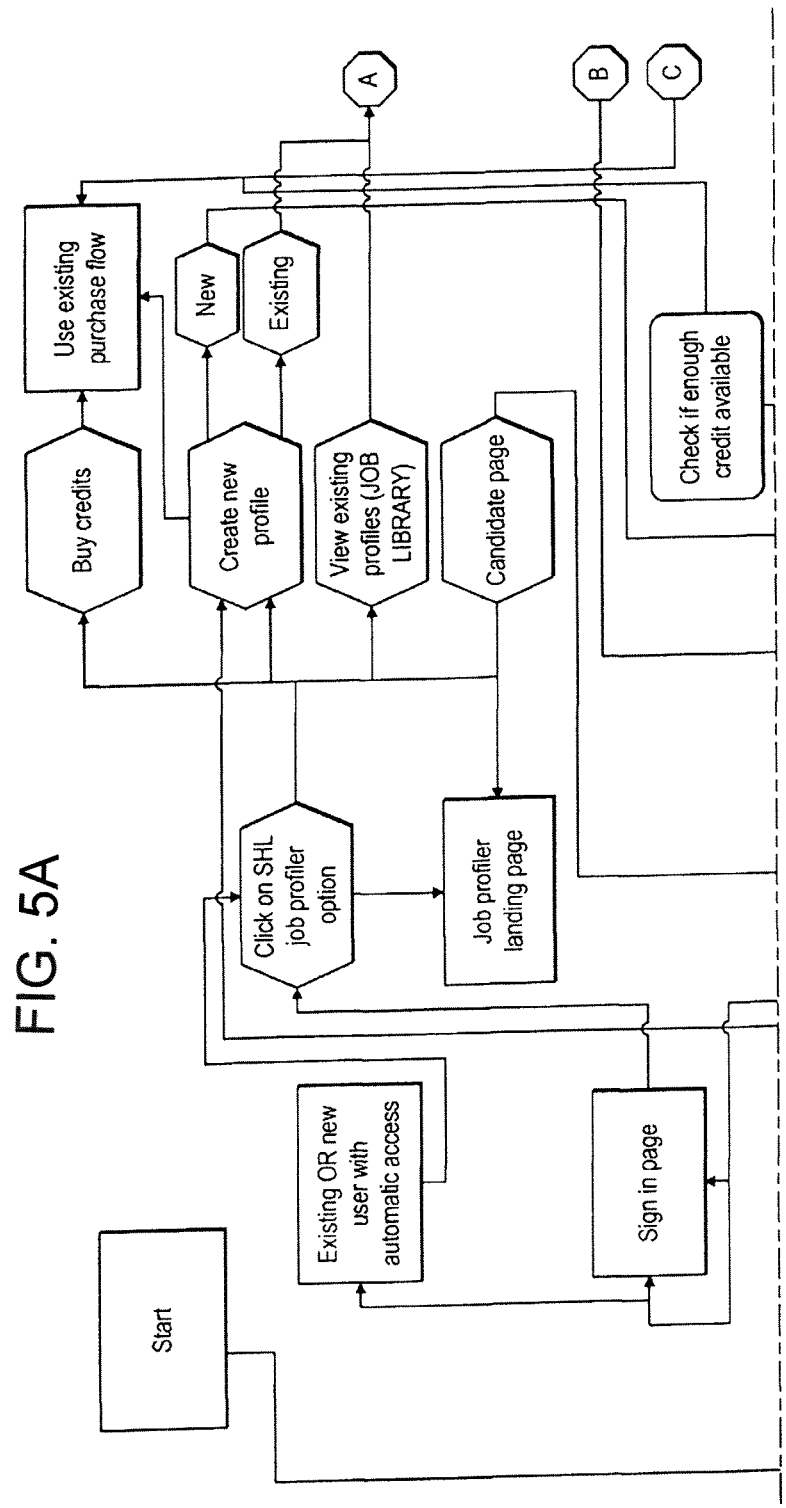
FIGS. 5A-5B show flowcharts of the system processes.
Figure 5B:
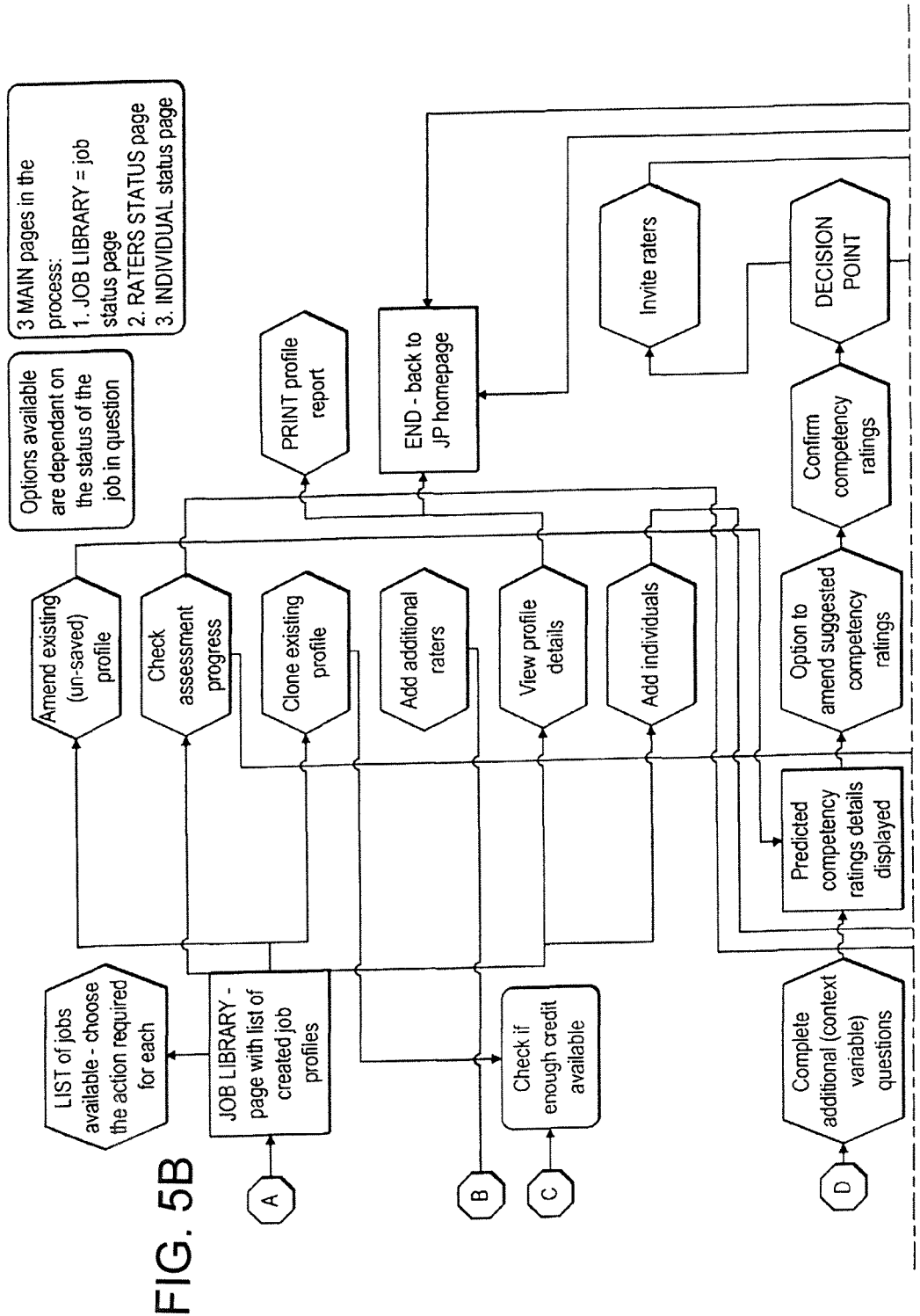
Figure 5B:
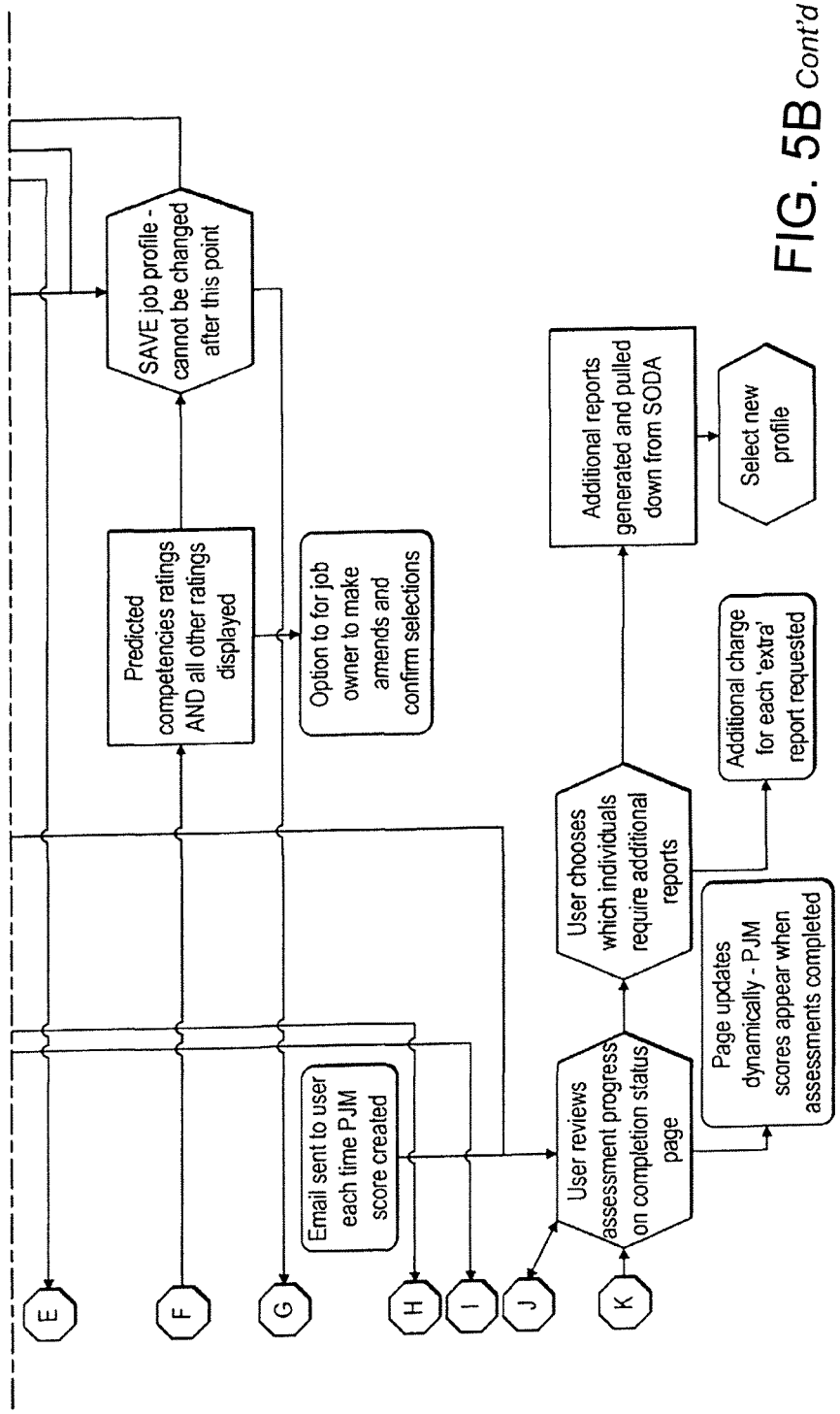

FIGS. 5A and 5B show a flowchart of the system processes.

Figure 6:
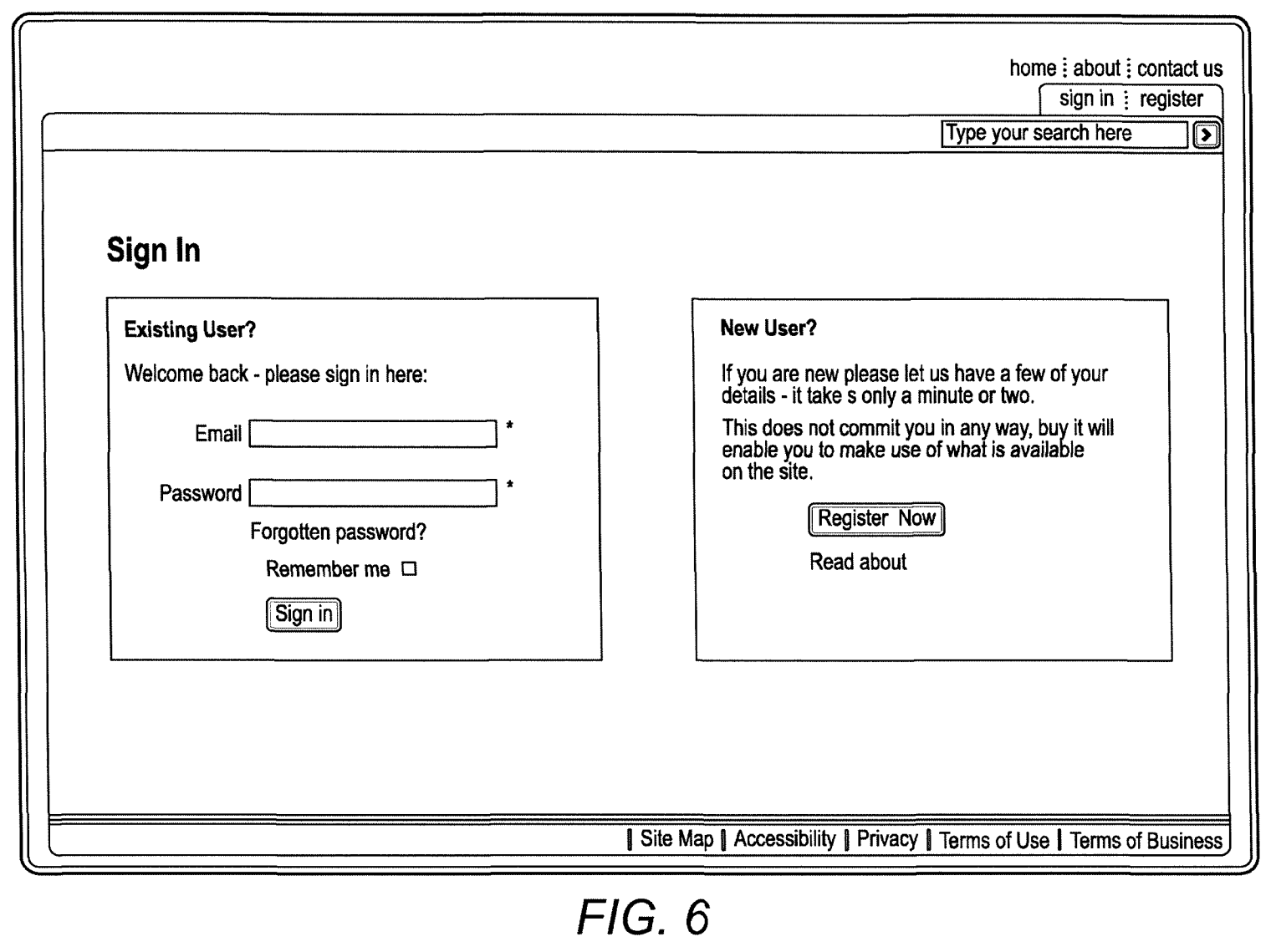

FIG. 6 shows the login page presented by the system.

Figure 7A:
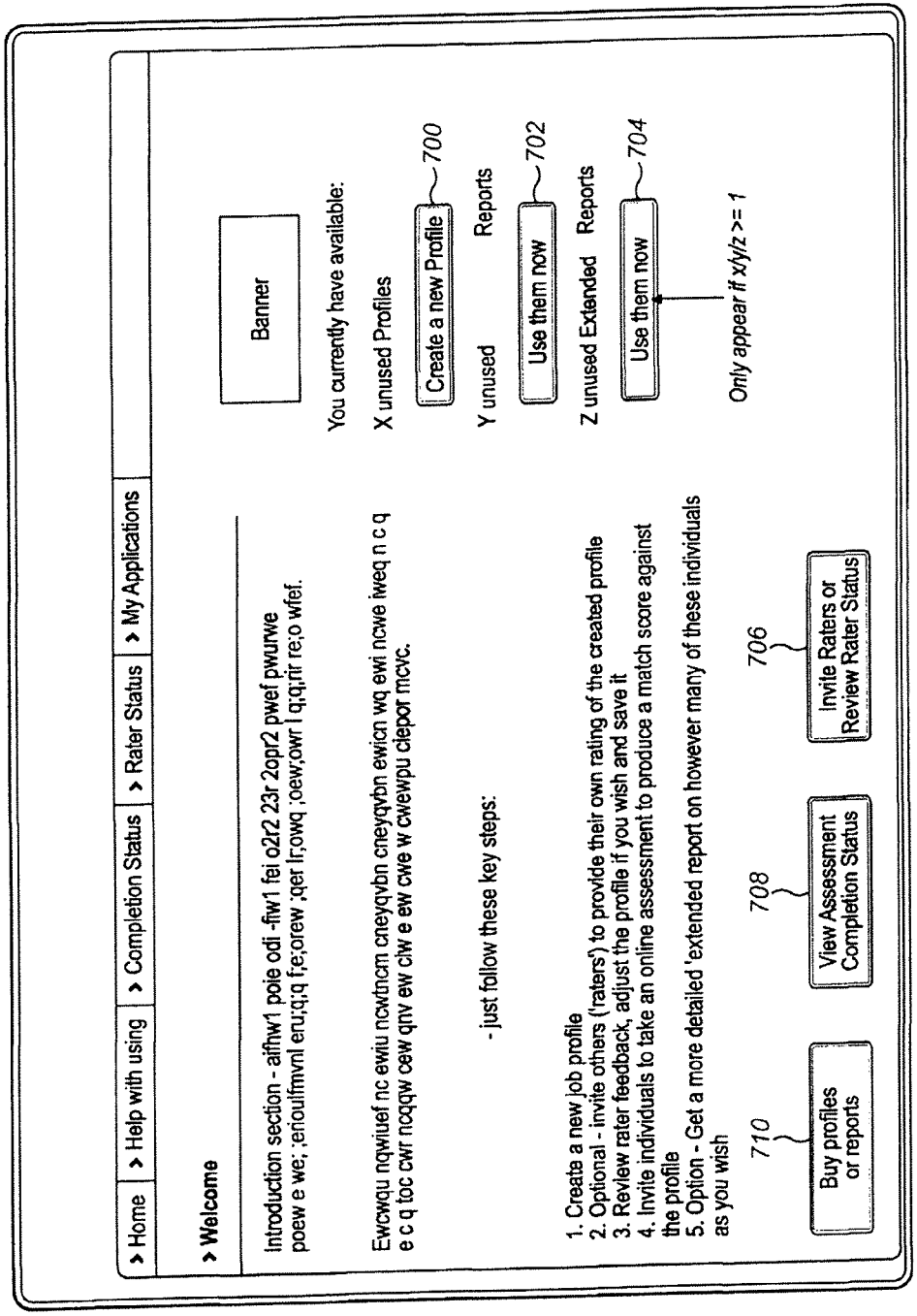

FIGS. 7A and 7B show an initial user interface presented by the system, in this example, for a "job-matching" application. Various options available to the user (not all are shown) include:

create a new profile 700
view existing profiles
use an existing profile
modify an existing profile
forward a profile for comments
invite rating of a profile 706
view available assessments
view assessments recommended for a profile
create a job description
forward a job description to a potential candidate
view candidates
view assessment completion status 708
buy credits 710
use unused reports 702
use extended reports 704

Figure 8:
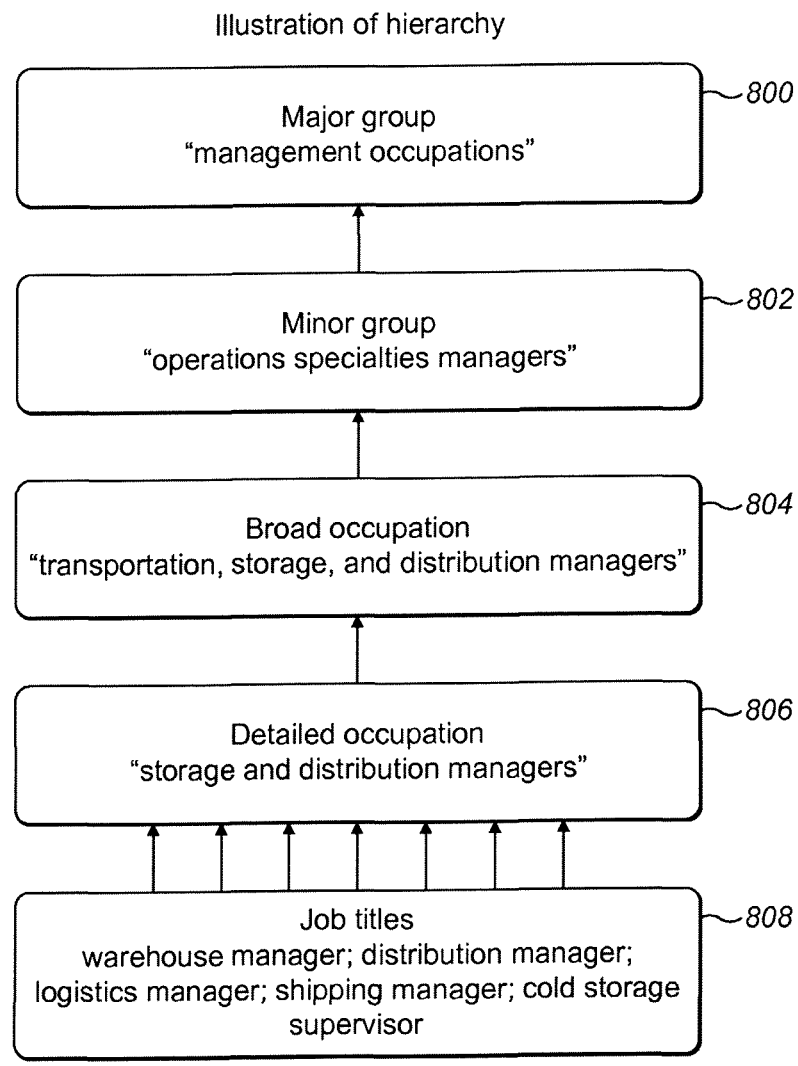
FIG. 8 shows an example of an entity classification model.

FIG. 8 shows an example of an entity classification model. This example is based on the Standard Occupational Classification (SOC) model used by the US Department of Labor with additional features from the O*NET SOC. The classification model is hierarchical, comprising four main levels of increasing specialism:

Major group 800
Minor group 802
Broad occupation 804
Detailed occupation 806

Individual job titles are mapped into the most detailed level—"Job titles" (approximately 1000 in total) 808—although in this embodiment this level is not made available to the user. This allows all jobs to be classified into generic occupations, as used in the O*Net occupation database. For example, major groups (23 in total) comprise the following:

| 11-0000 | Management |
| --- | --- |
| 13-0000 | Business and Financial Operations |
| 15-0000 | Computer and Mathematical |
| 17-0000 | Architecture and Engineering |
| 19-0000 | Life, Physical and Social Science |
| 21-0000 | Community and Social Services |
| 23-0000 | Legal |
| 25-0000 | Education, Training and Library |
| 27-0000 | Arts, Design, Entertainment, sports and Media |
| 29-0000 | Healthcare Practitioners and Technical |
| 31-0000 | Healthcare Support |
| 33-0000 | Protective Service |
| 35-0000 | Food Preparation and Serving |
| 37-0000 | Building and Grounds Cleaning and Maintenance |
| 39-0000 | Personal Care and Service |
| 41-0000 | Sales |
| 43-0000 | Office and Admin Support |
| 45-0000 | Farming, Fishing and Forestry |
| 47-0000 | Construction and Extraction |
| 49-0000 | Installation, Maintenance and Repair |
| 51-0000 | Production |
| 53-0000 | Transportation and Material Moving |
| 55-0000 | Military Specific |

The use of SOC is provided as an example of an entity classification model; generally, a hierarchical method is useful for quickly finding a job in a library of jobs.

Figure 9A:
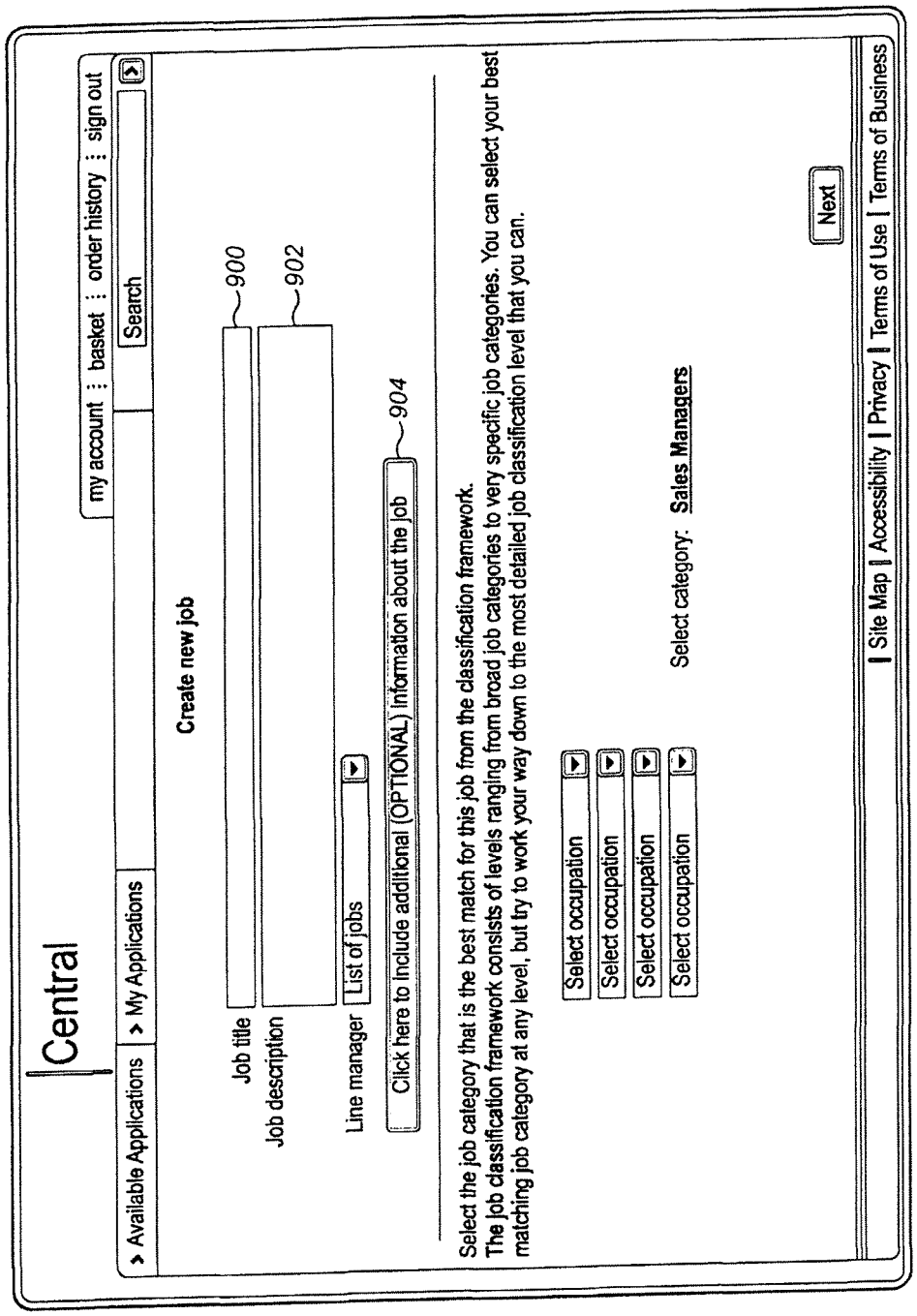

FIGS. 9A and 9B show examples of initial specification description screens, in these examples, for a "job-matching" application. Standard text input fields allow for job title 900 and description 902 to be input; optional job information fields 904 allow for additional text for inclusion in the Job profile report. Occupation drop-down menus 906 allow the user to select the correct SOC code. User inputs are saved when upon completion the user navigates to the next page, otherwise a warning message reminds the user any data they have input will be lost. The can subsequently return to this page to make additional changes.

Figure 10:
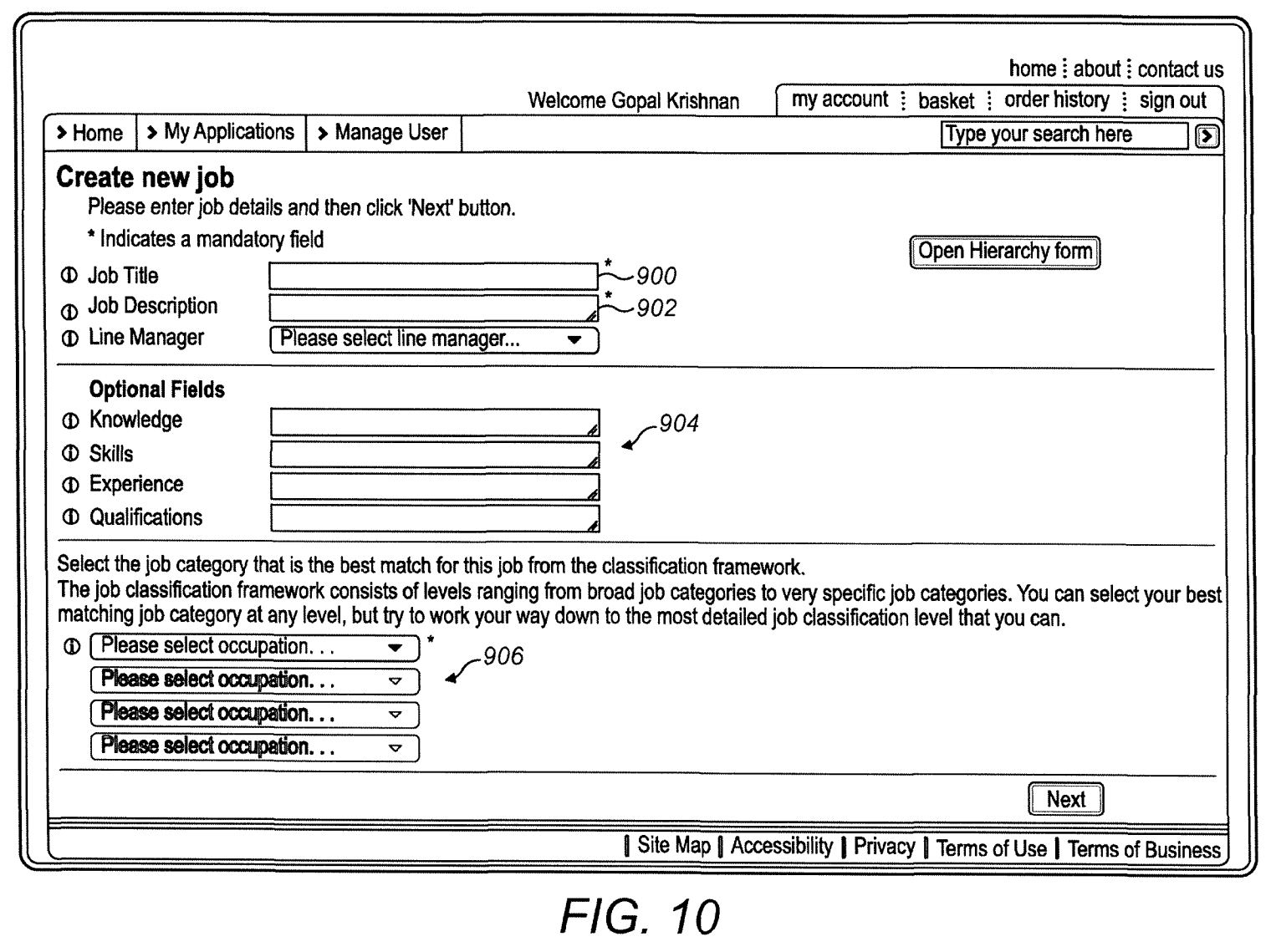

FIG. 10 shows the "create new job screen".

Figure 11B:
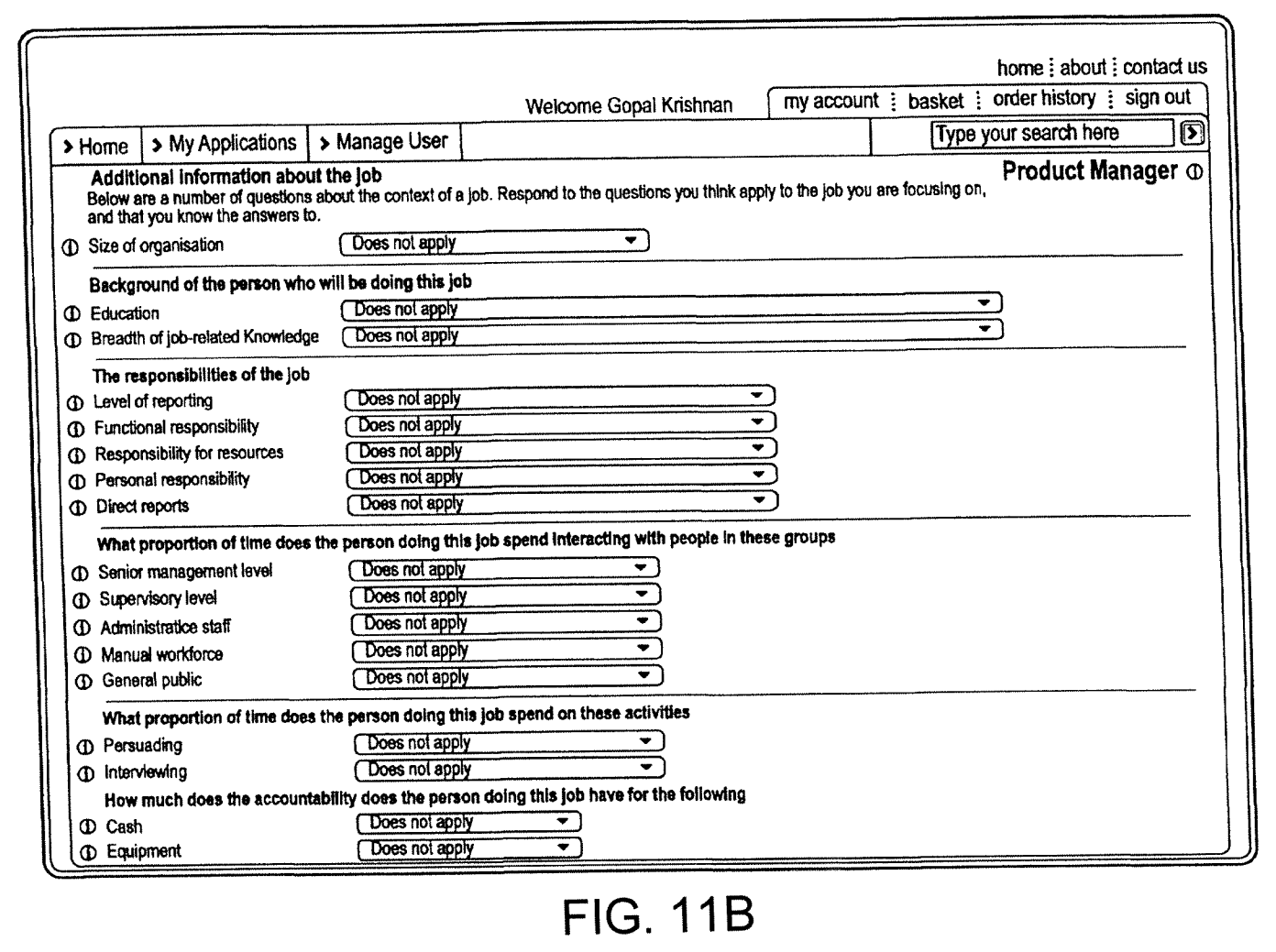

FIGS. 11A, 11B and 11C show examples of context variable input screens, in this example, for a "job-matching" application, allowing additional job information can be input. An array 1100 of approximately twenty questions is presented, the answers to which (selected by the user via the drop down menus 1102) are set as context variables. Responses to these questions are not compulsory. Users can make no changes and click 'Create New job' 1104 if they wish to. As the use of context variables may allow for important modification of the initial characteristics profile, this is a charged service.

In some embodiments, the number of context variables used and/or displayed to the user is determined by the system. This may be based, for example, on their relevance and impact for the specific job or job category selected. In other words, the system decides which context variables will materially change the competency weightings if they are adjusted (meaning which ones will make a material difference to the job) and only displays those to the user.

For example, in some cases, the user will only see ten context variables for the job they have chosen, as the system has calculated that the other twelve do not make any material impact to the competency weightings whichever values are chosen. In another example, the user will be presented with twenty context variables since they could all have an impact on the competency weightings.

The advantage lies in not wasting the user's time trying to find information that will have no impact on the competency weightings.

The generic idea is that of identifying the most relevant context variables for an occupation in a data-driven manner.

The user is free to modify the entries and selection on the initial specification description and context variable input screens until ready to proceed. Once use of this feature is accepted (by selecting "create new job"), a charge unit is deducted (credit allowing) from the user's account.

Figure 12:
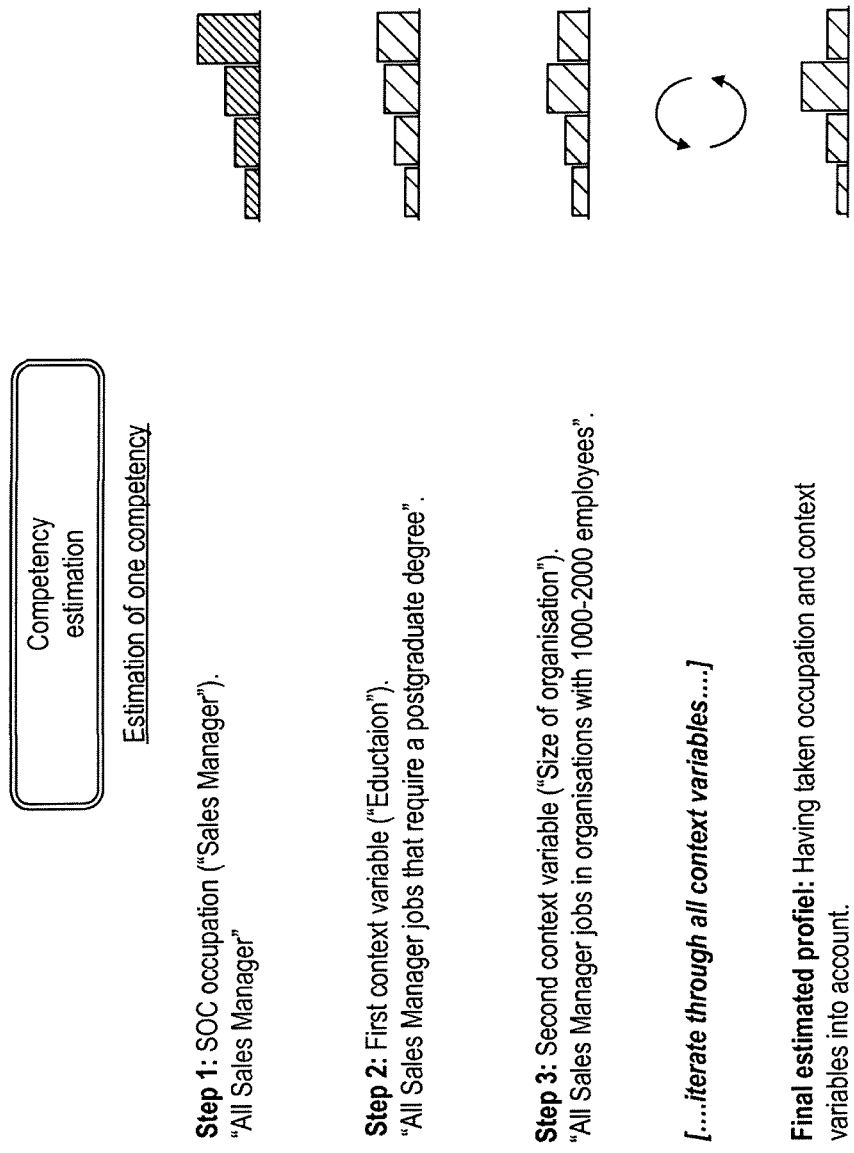
FIG. 12 shows another overview of the process of competency profile estimation and modification.

FIG. 12 shows another overview of the process of competency profile estimation and modification, in this example, for a "job-matching" application.

At Step 1, the user selects the relevant SOC classification and the system evaluates an initial competency profile, by calculating the fraction of jobs assessed at each competency level. This allows for initial statements to be made of the form: "In n % of jobs like yours, competency X is a key part of the job".

At Step 2, the user sets a first context variable (in this example "Education" to " . . . requires a college degree"). The system recalculates the competency profile accordingly, taking this context variable into account.

At Step 3, the user sets a further context variable (in this example, "Size of organisation" to "1000-2000 employees"). The competency profile is recalculated, taking this further context variable into account. The process is repeated for each context variable set.

At the end of the process, a final estimated profile is determined. This final estimated profile is displayed a graphical format, as a histogram 1800 and as a table 1900. A user-editable form may also be presented.

In this embodiment, the user only sees the final profile, as it stands after taking into account the selected occupation and any context questions (variables); in alternative embodiments, the effect of each context variable on the profile is shown separately, for example as each context variable is input and its effect determined.

FIGS. 13 and 14 show an example of the calculation of a modified entity characteristics profile, in this example, for a "job-matching" application.

Generally, a single competency is calculated by combining a set of occupation prior probabilities with context variable level probabilities, to make new prior probabilities for the next context variable as follows:

Initial profile based on classification

Firstly, the user selects a Standard Occupational Classification (SOC) code to the chosen level of specificity within the SOC hierarchy. A check is made that there are sufficient job profiles (typically sixteen) in the database in the selected class to allow a meaningful calculation to be made; if not, the parent class in the hierarchy is used, and so on until a sufficient number of job profiles are available.

For a given competency the matching job profiles are split into four competency importance levels that describe how relevant ("Not relevant", "Partially relevant", "Relevant" or "Essential") each competency is to the job profile.

In the example shown, for the selected occupation of SOC code 17: "Architecture & Engineering", the matching jobs determined from database are broken down by number and proportion of jobs into the competency importance levels for each competency—in the example, the breakdown for Competency 1.1: "Deciding and Initiating Action" is shown.

An occupation prior probability P(A) is calculated for each competency importance level from the number of job profiles within each of these competency importance levels, divided by the total number of jobs in the chosen SOC.

Modified profile incorporating a first context variable

To find the importance of a competency importance level given a selected context variable level, the number of job profiles in each context variable level is divided by the total number of jobs in that competency importance level, to give the conditional distribution P(B|A)

These importances are then multiplied by the occupation prior probability P(A) to obtain the conditional prior probability distribution P(B|A)P(A).

When the first context variable level is selected by the user the system divides the conditional distribution prior probability P(B|A)P(A) for the selected context variable level, by the total probability of said context variable level across all competency importance levels for this competency P(B), to obtain the new occupation prior probability P(A|B), where from Bayes' theorem:

$$P(A \mid B) = \frac{P(B \mid A)P(A)}{P(B)}$$

In the example shown, First context variable (B): "Organisation size"

Modified profile incorporating a second context variable

The values of P(A|B) are suitably rounded, and become the occupation prior probability P(A) for the second context variable, and the process repeats itself for said context variable and the following context variables, until the user has selected a context variable level for all context variables.

That is, the posterior probabilities from the selected, first context variable level, now become the prior probabilities for the second context variable level, and the process continues as previously. The process iterates until the competencies given all the context variable levels have been evaluated.

The new occupation prior probability P(A|C), where from Bayes' theorem:

$$P(A \mid C) = \frac{P(C \mid A)P(A)}{P(C)}$$

In the example shown, Second context variable (C): "Education"

If the value of P(A|B) is zero, the process halts to avoid errors propagating.

FIG. 15 shows in tabular form the evolution of characterization prior probabilities with successive iterations 1500. For the selected Occupation level, the initial occupation profile (defined by the probabilities at each of the four competency levels for each of the competencies) is modified in successive rows descending the table as successive context variables are taken into account.

Figure 16:
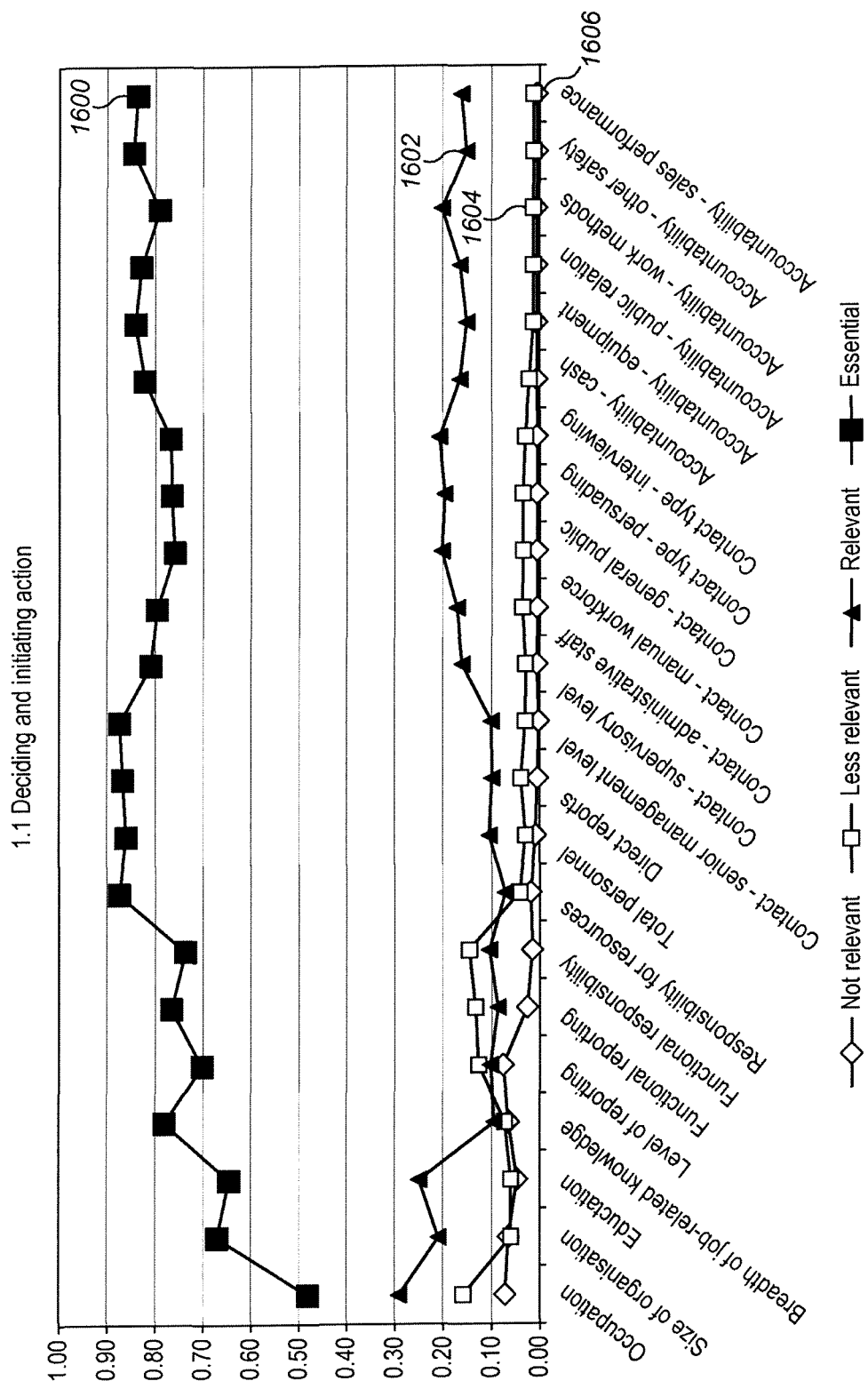
FIG. 16 shows in graphical form the evolution of characterization prior probabilities with successive iterations.

FIG. 16 shows in graphical form the evolution of characterization prior probabilities with successive iterations. The effect of taking successive context variables into account can be seen on the four competency importance levels, essential 1600, relevant 1602, less relevant 1604 and not relevant 1606, evolving from left to right.

Figure 17:
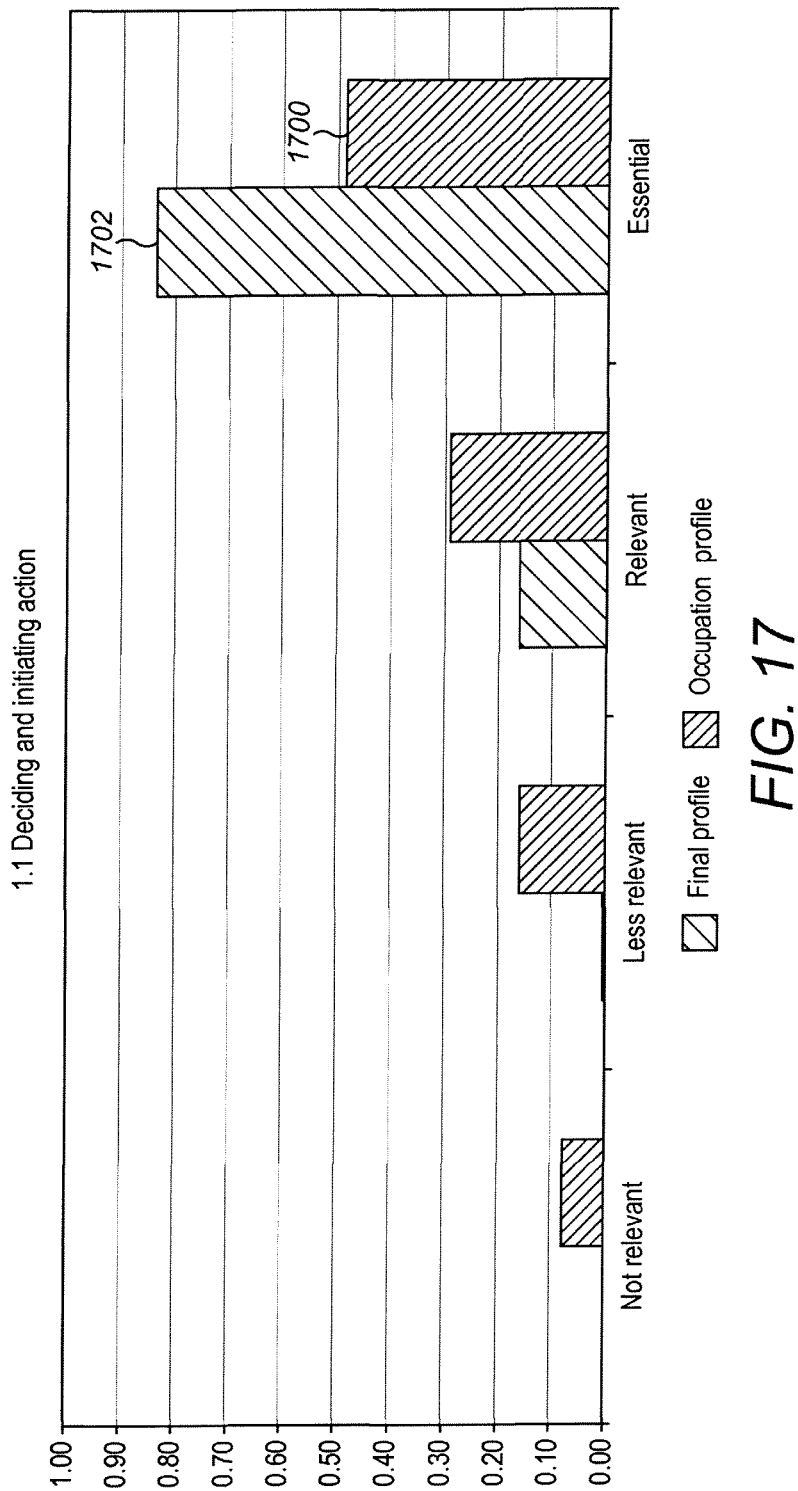
FIG. 17 shows an example of a single competency histogram.

FIG. 17 shows an example of a single competency histogram. For the competency "Deciding and Initiating Action", the four competency importance levels are shown for both the initial predicted occupation profile 1700 and the final profile 1702 (as modified by the taking into account context variables), indicating that the effect of context variables may be considerable.

Figure 18:
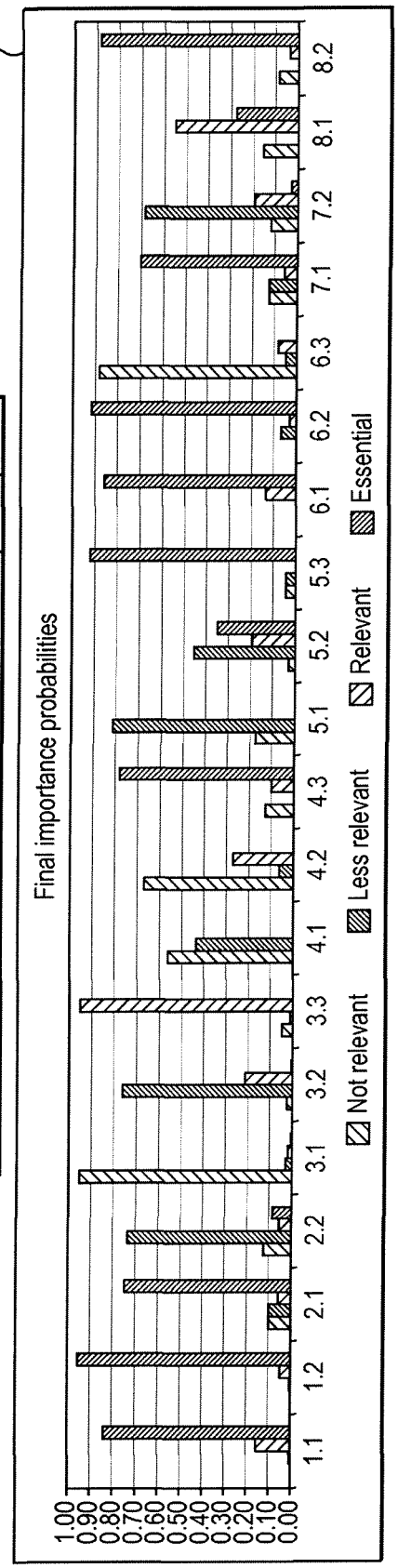
FIG. 18 shows an example of a full final entity characteristic (competency) profile.

FIG. 18 shows an example of a full final entity characteristic (competency) profile, displayed as a series of histograms 1800 with corresponding key. For each of the separate competencies 1802 the final calculated importance probability is shown according to the four levels ("not relevant", "less relevant", "relevant" and "essential").

In some embodiments, the user is presented with information about the probabilities of each of the four outcome categories together with a statement of the confidence with which the recommendation is made. Computation of confidence may be based, for example, on the variance of the four estimated probabilities and the number of jobs in the sample that these are based on.

Figure 19A:
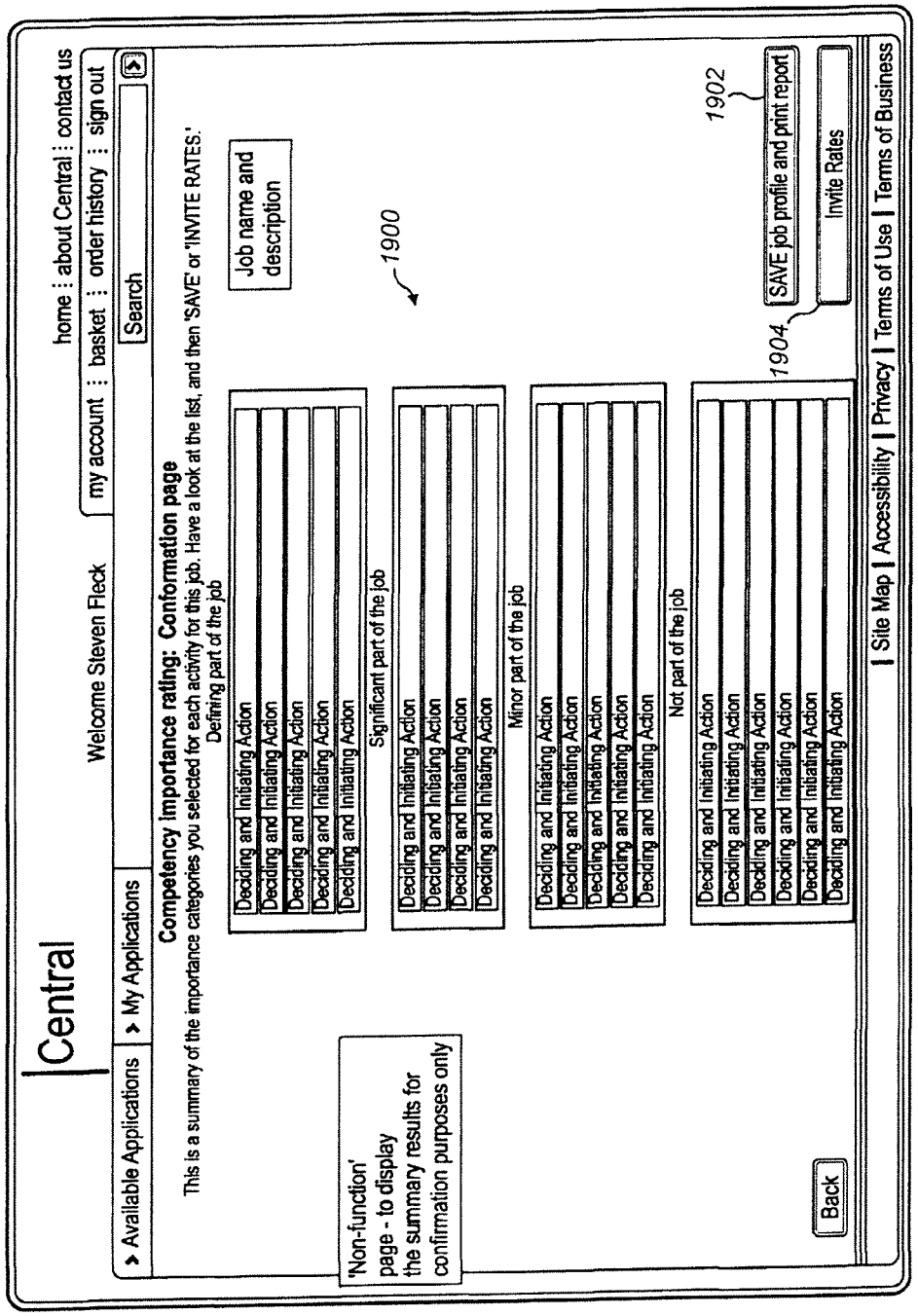
Figure 19B:
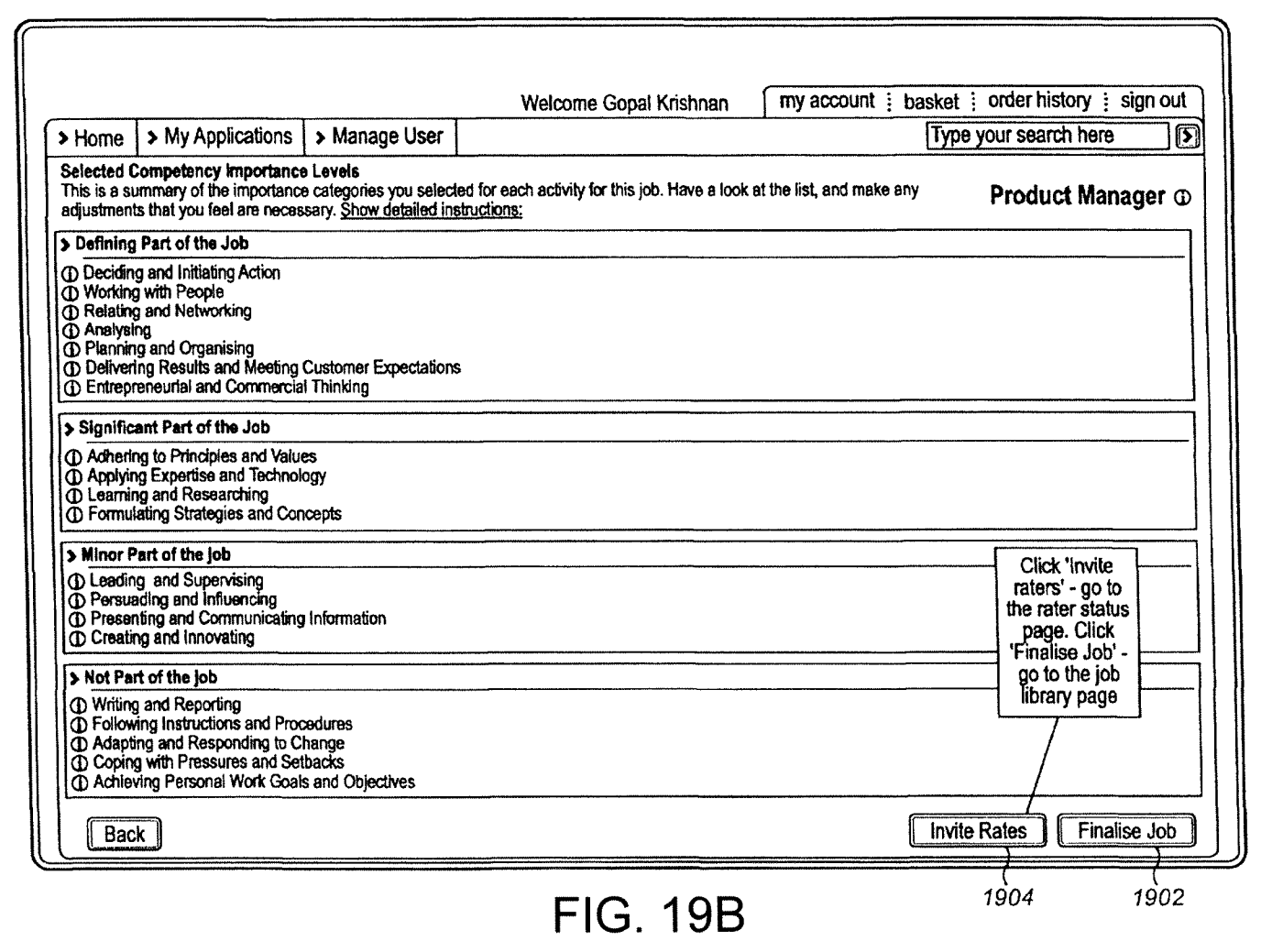

FIGS. 19A and 19B show examples of an entity characteristics profile summary page 1900—in the example shown, for a job matching application, this is a "Competency importance rating: Confirmation page". This page is merely to display the summary results (arranged in order of competency importance) for confirmation purposes. The user has the option to return to a previous screen to make amendments, to save the job profile and/or print the report 1902—or alternatively to invite comment on the profile from other parties ("raters") 1904.

Figure 21:
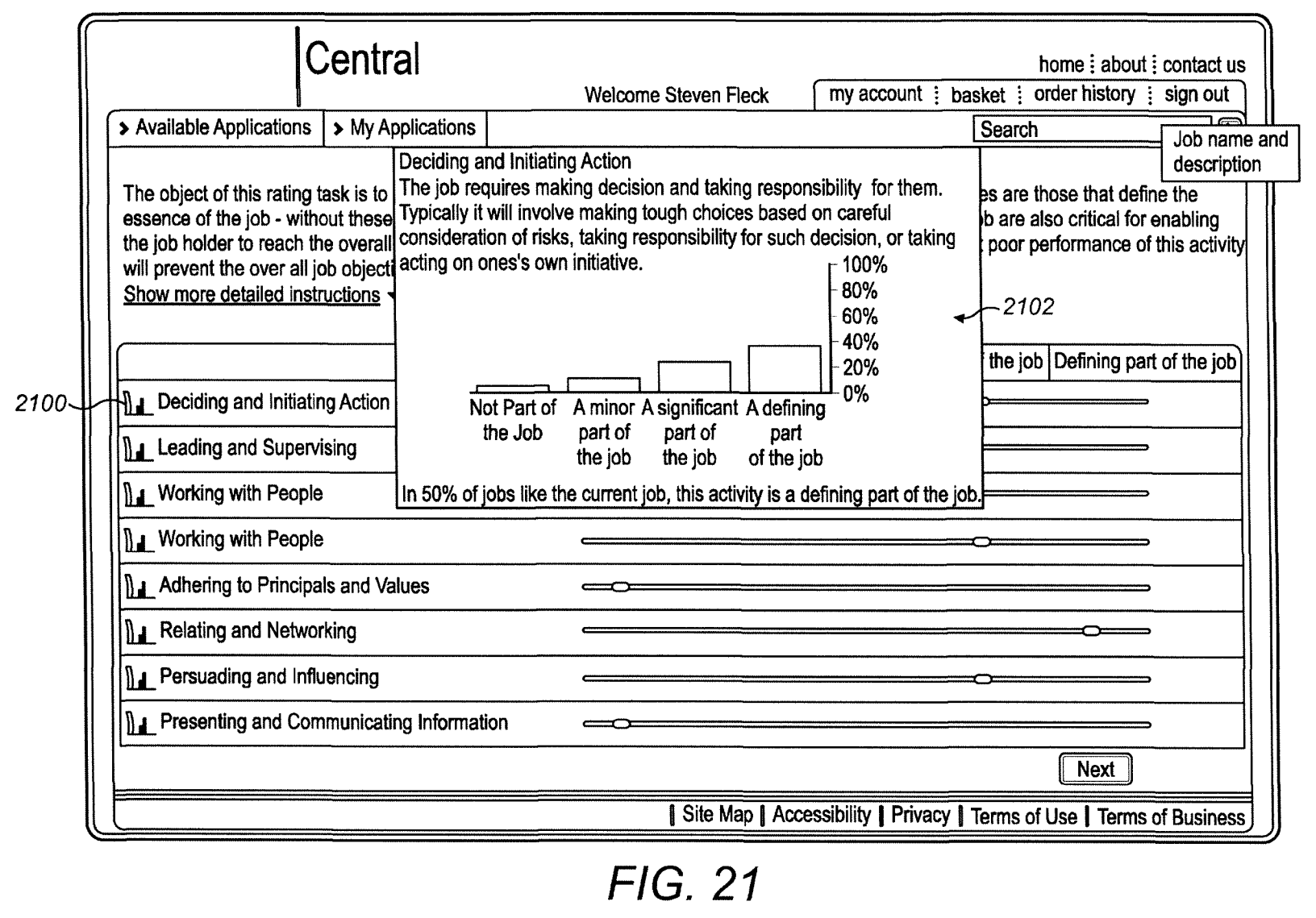

FIGS. 20 to 22 show examples of an interactive profile modification facility.

FIG. 20 shows a Rate competency importance page. Initially, only the system prediction is displayed on a stacked linear layout. Sliders are provided to allow the user to change the competency importance by moving the slider 2000 (which is both 'clickable' and 'slideable'). The system prediction remains unchanged throughout—as the user moves the slider away from the system prediction both markers will appear for that competency row.

FIG. 21 shows an example of a hover-over/pop-up panel 2102, triggered by the user placing the cursor over and/or clicking a competency icon 2100, revealing additional information about the particular competency and explaining how the competency distribution resulted in the determined competency importance.

Figure 22A:
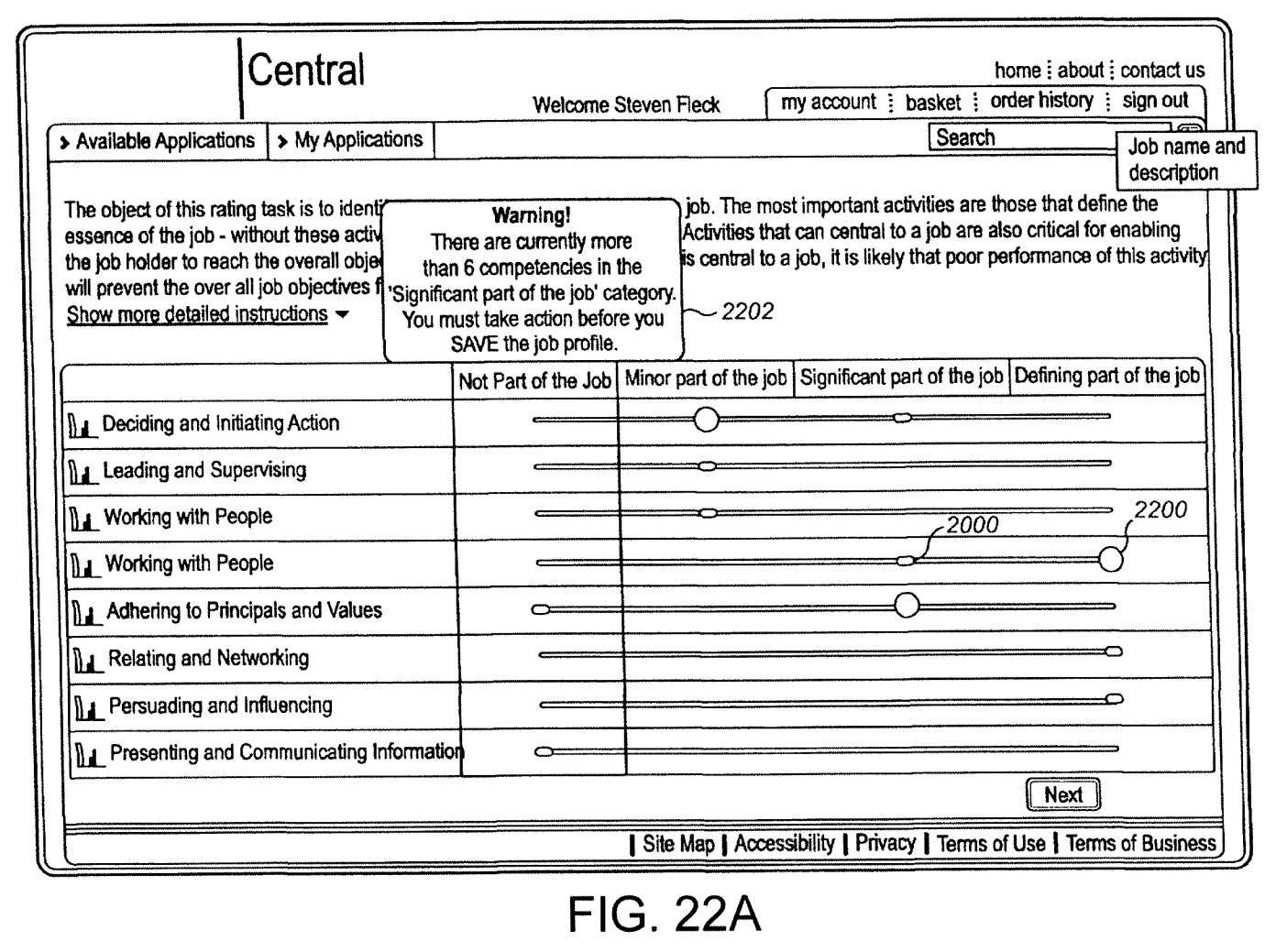
Figure 22B:
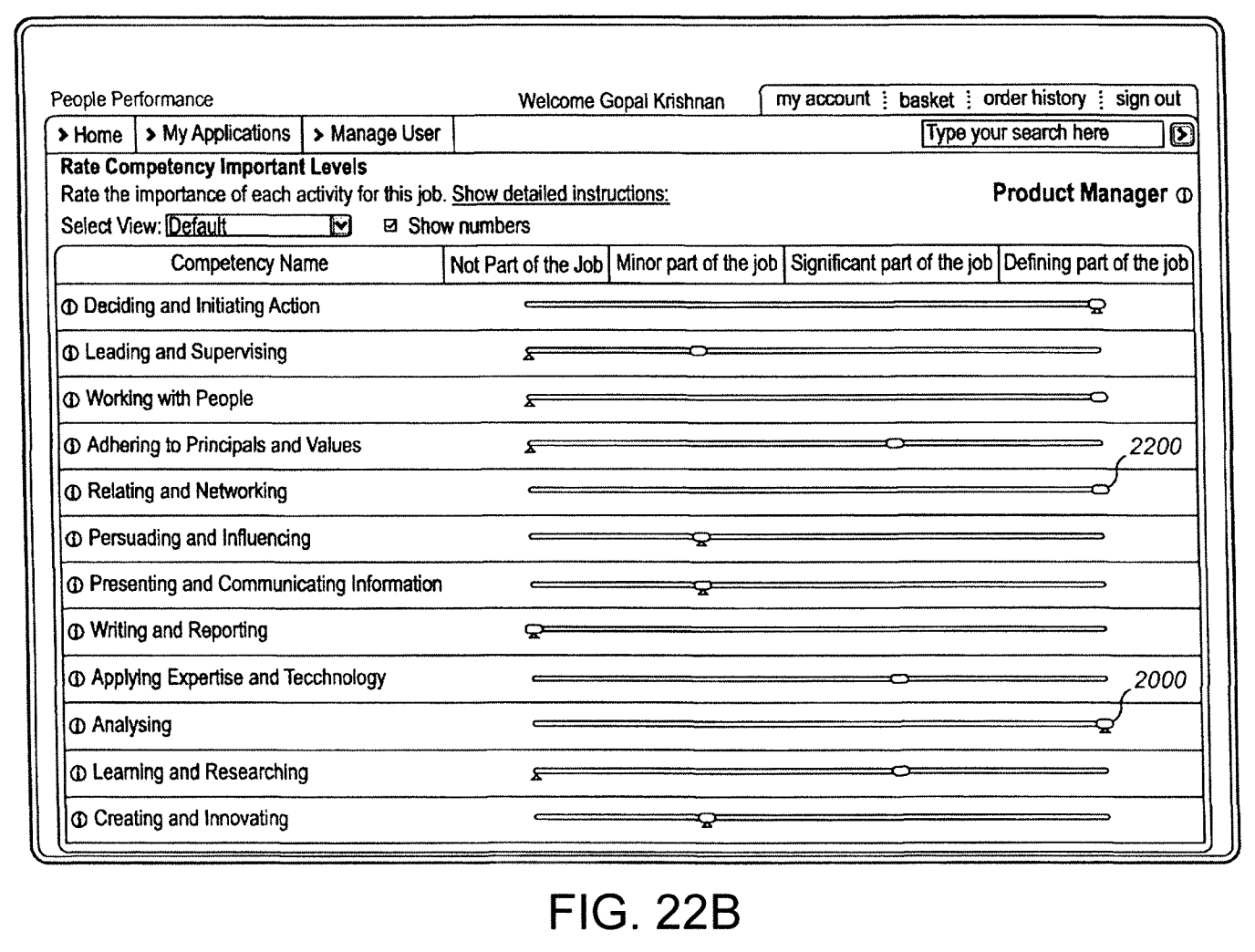
Figure 22C:
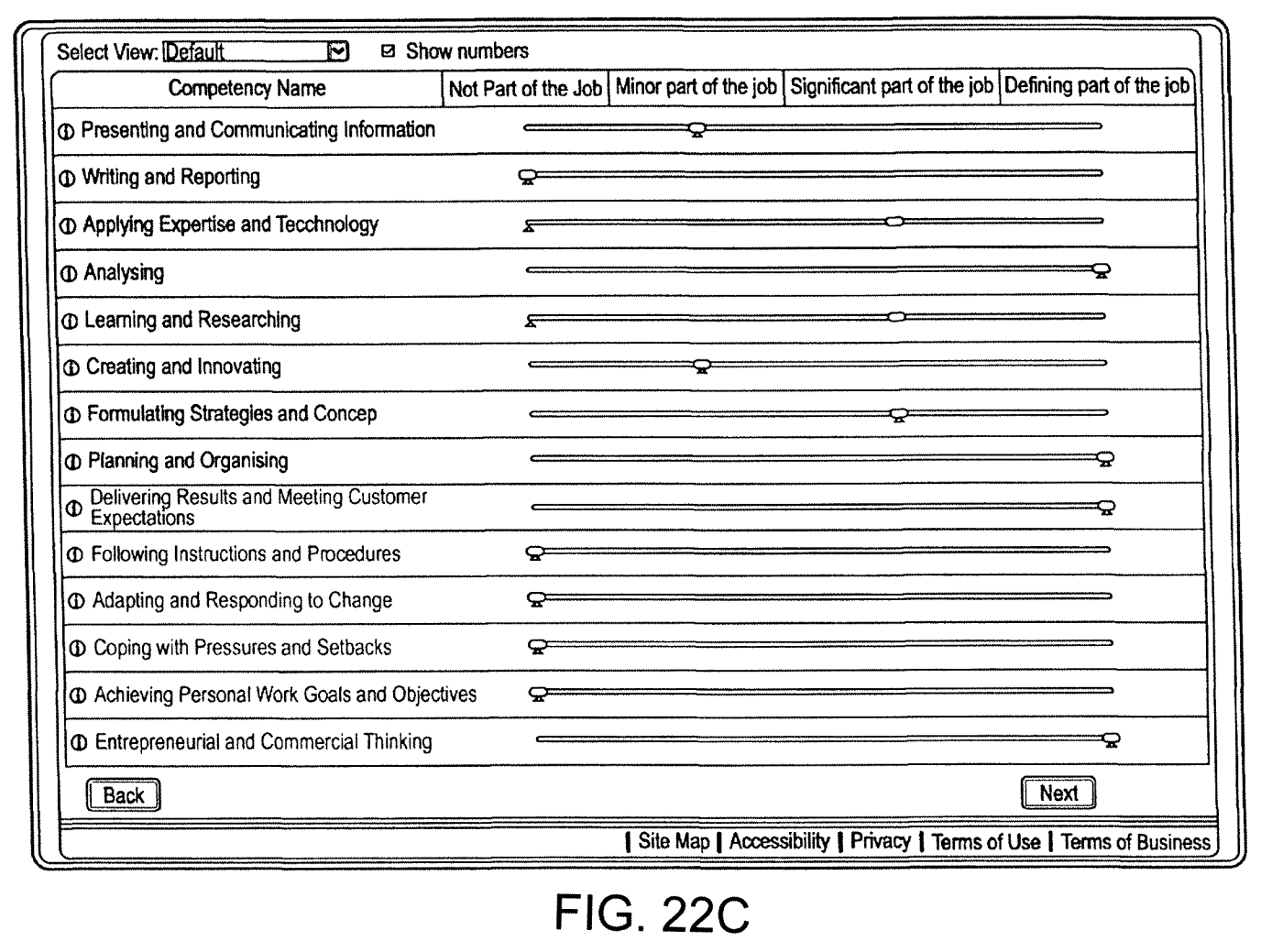

FIGS. 22A, 22B and 22C show the Rate competency importance page with adjustment—the user having moved the slider 2000. Now both the slider original position (before editing) is shown 2000 and the users edited position 2200. A warning message 2202 shows that appears if the user, by his editing, breaks the banding rules placed on the system. The banding rule places a certain threshold on the number of sliders in any one competency importance level column.

FIGS. 23 to 26 show an external profile feedback facility. Feedback on the calculated profile may be sought from other parties, termed 'reviewers' or 'raters'.

Figure 23A:
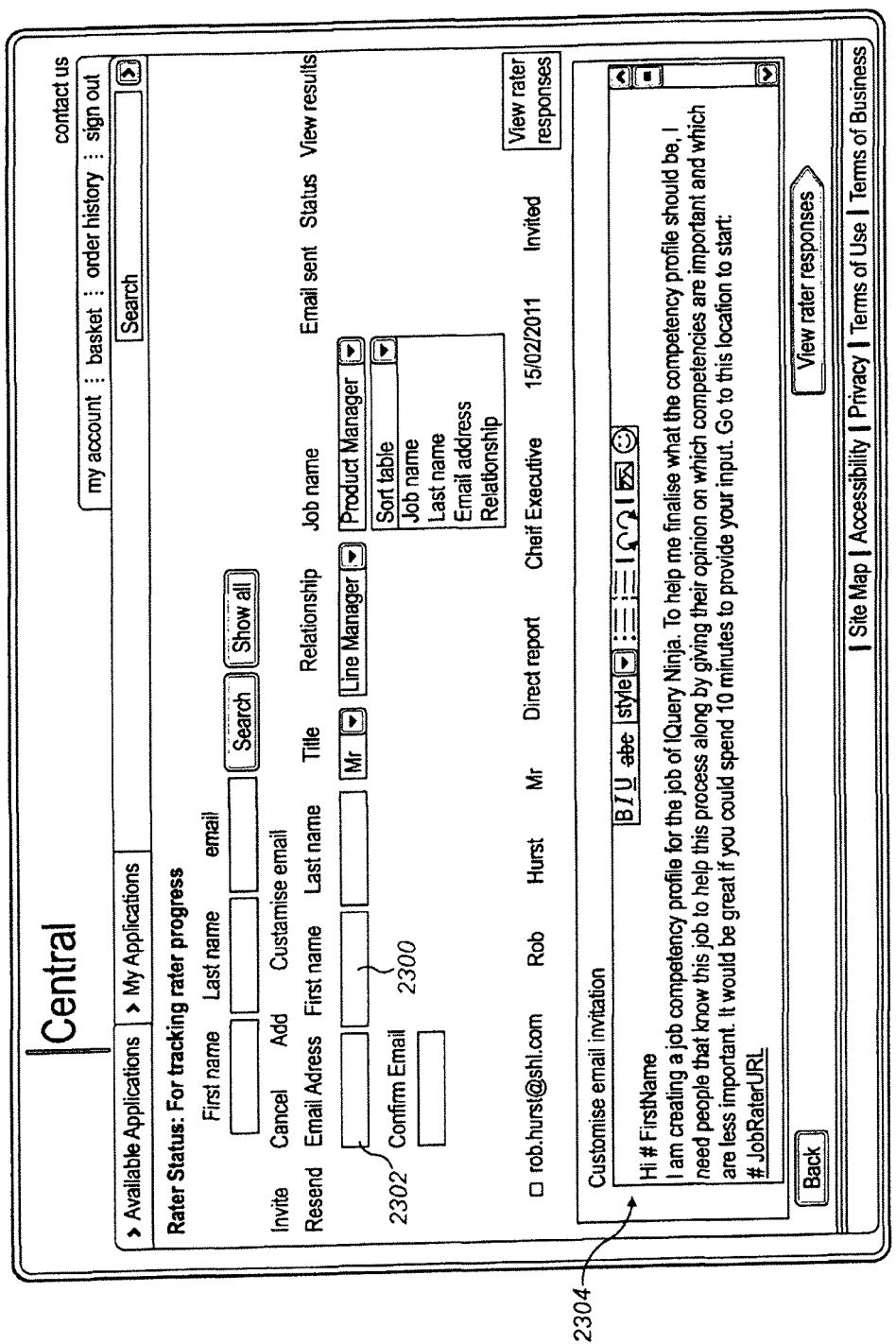

FIGS. 23A and 23B show a feedback progress screen, also termed a "Rater status" screen for tracking 'rater' progress—sortable by Name, job and status. Raters 116 can be contacted via email 2300 by the user 104. A (suggested) default email 2304 is provided (optionally editable via a pop-up text box) with the name 2300 of the user 104 and containing login details, brief instructions about rating, a link to the site to register (if a new user) or log-in (if an existing user) and a link to the job profile requiring their input sent to them. A copy of the rater invitation email is sent to the user (job creator). The user is prevented from sending invitations and/or reminders to raters that have already responded.

Figure 24:
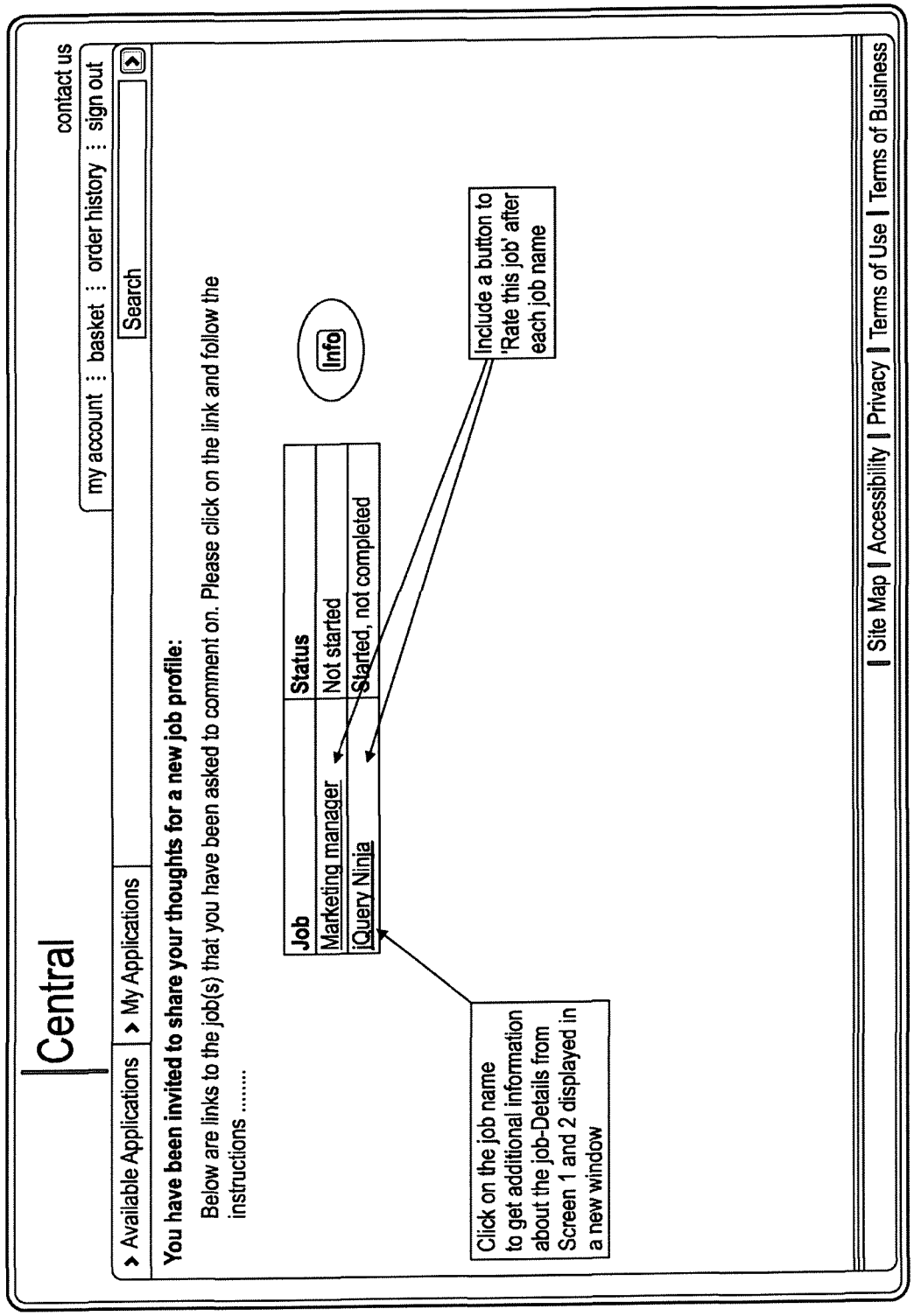

FIG. 24 shows the rater landing page, or the screen that will be seen by the 'raters' once they have clicked on the link within the email 2204. By clicking on the name of the job 2300, a new window with additional information will be brought up.

This screen shows the system profile prediction and allows the rater to make their own submission. If the Creator has completed the job (and closed all ratings) before the new rater gets the chance to submit their rating, the table on this page reflects that the job is closed—so there is no need to continue.

In some embodiments, the Rater is able to view more information about the job they have been invited to rate, if appropriate—such that, for example, they have enough information to provide a useful rating.

Figure 25A:
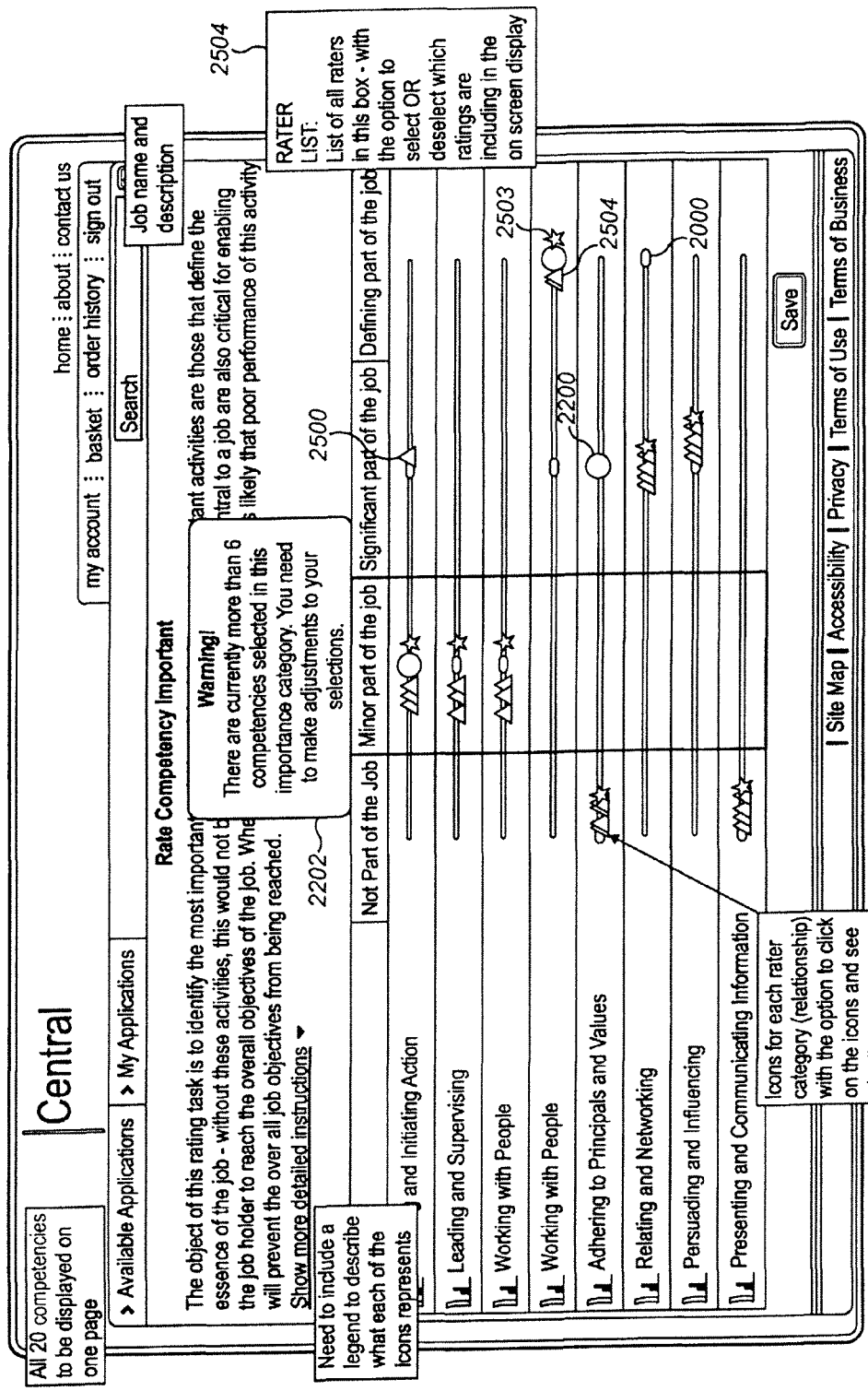

FIGS. 25A and 25B show the rater overview screen. In addition to the original slider position (before editing) 2000 and the user edited position 2200, rater edited slider positions 2500 are marked. On this page the user can observe the suggestions of the raters and has the option 2502 of selecting or deselecting which ratings are included on the display.

The various different rater responses can be displayed for example using different icons 2503, similar icons, or identical icons 2504 (as illustrated in FIG. 25a). If identical icons are used for all raters, a further distinguisher may be displayed with the icon, such as a rater identification number. Optionally, raters may be grouped together in a single icon with a number indicating the number of raters associated with the icon 2506 (as illustrated in FIG. 25b). The user may be given the option of which icon he would like his rating to be displayed with. A warning will appear if the rater, by his editing, breaks the banding rules placed on the system. The banding rule places a certain threshold on the number of sliders in any one competency importance level column.

All predictions—including the banding rules—are displayed; banding ruling warnings are displayed only once the user (Creator or rater) starts moving their slider. Generally, the system prediction remains unchanged throughout; as a user or rater moves a slider away from the system prediction, both markers will appear for that competency row. If a user or rater makes a change that impact on the banding rules, that column will be highlighted with a warning message.

For the raters themselves, their view of the profile is similar to that first seen by the user, save they are only offered the option to submit a rating and not to invite other raters. On submission of a rating, an email is generated and sent to the user (job creator) confirming their submission. The email contains a link to the Rater status page. Once a rater submits a rating they are returned to the main system page.

FIG. 26 shows the final profile review summary page. This is the page (only) the user 110 will see once all ratings have been received (the screen content builds as more ratings are submitted), and the user 110 has decided the importance rating for each competency (whilst subject to the banding rules). On this page the user has the option of saving and locking down the job profile 2500 or editing it further 2502.

Figure 27:
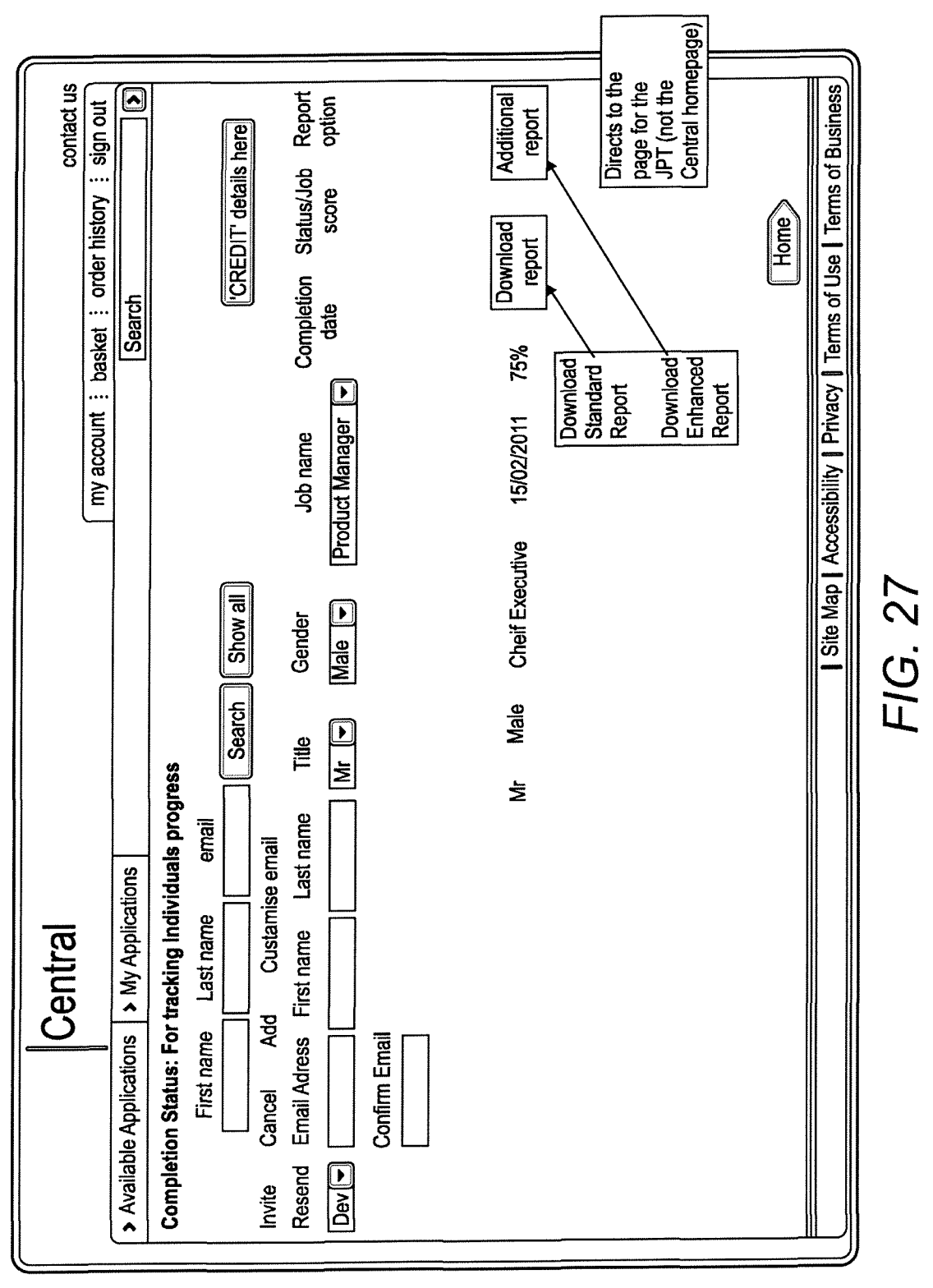

FIG. 27 shows the completion status page, where a user can select to download the report as a pdf, and also has the option of sending the report to others, via email. Information visible on this page includes:

Credit details
Number of job scores available
Number of enhanced reports available Checks are done to ensure that enough credit is available for the functions requested—for example, when adding an individual (to invite for assessment), downloading an 'enhanced' report etc. A copy of the email invite to individuals is sent to the Job creator/inviter.

Figure 28A:
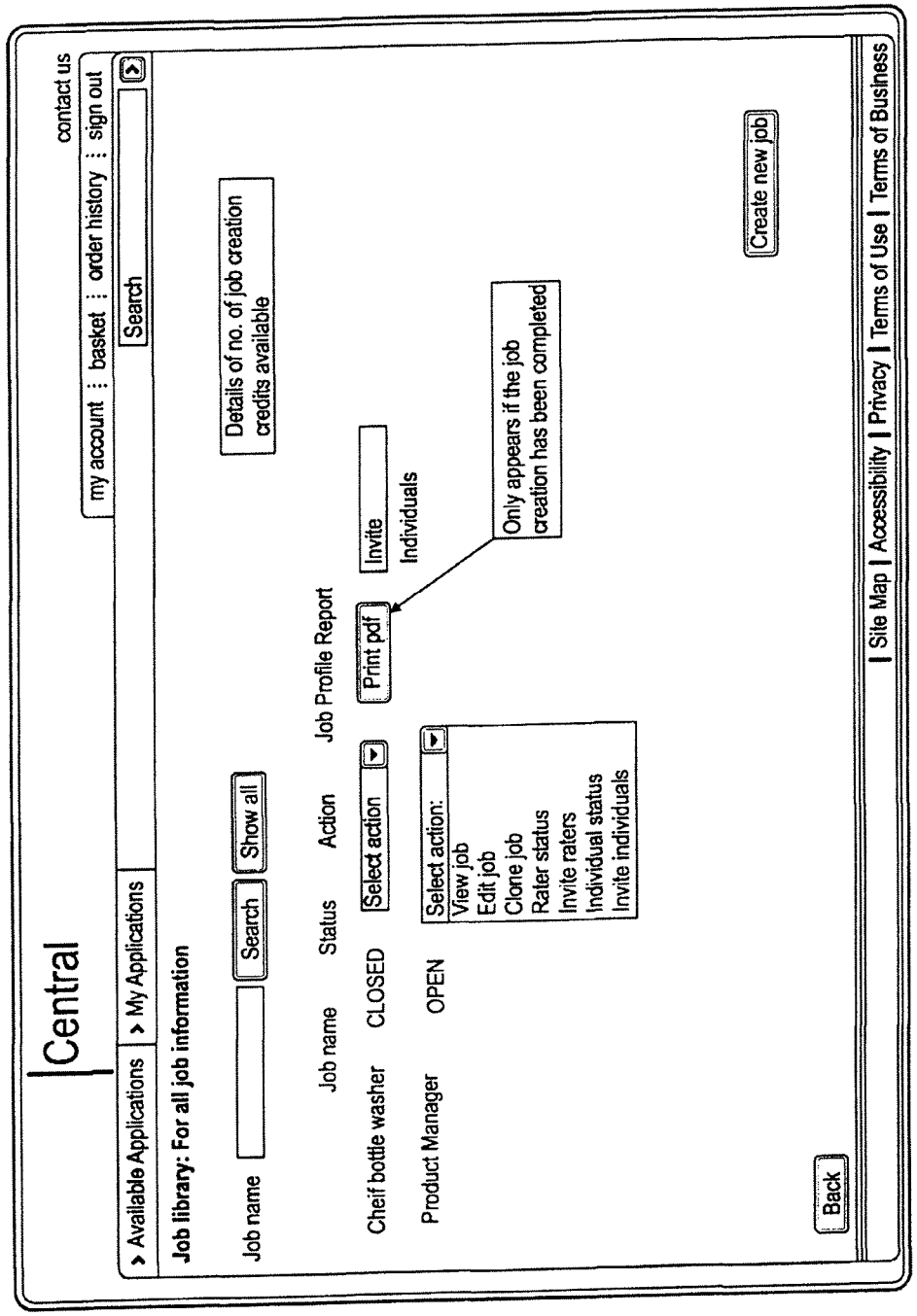
Figure 28B:
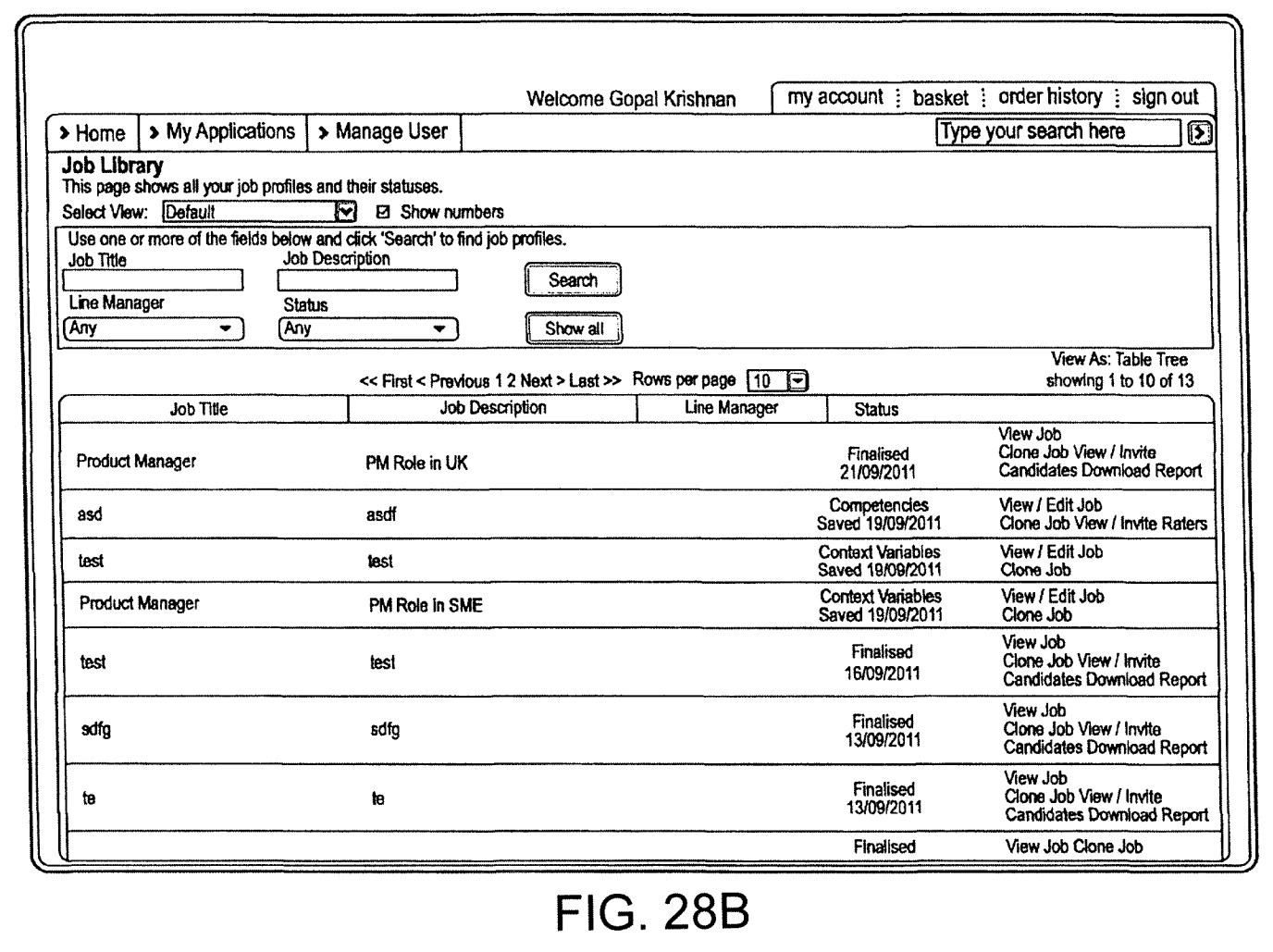

FIGS. 28A and 28B shows the job library page, where the user can observe the current status (Open, closed, Completed, In progress, Not started) of all jobs. From this page the user can link to job resources that are available.

A job is 'in progress' for example when the user (Creator) has not completed the entire process or during the period when the job creator has finalised the competency selection and invited raters to comment.

In some embodiments, an option is provided for Job owners (Creators) to not only print the job profile, but also to view in read-only form the rater responses for each of the jobs they have created.

A 'Create new job' function is provided if the user does not find the job they require in their job library, In summary, the user of the system described can be simply used to:

Create a new job profile
Optionally, invite others ('raters') to provide their own rating of the created profile
Review rater feedback, adjust the profile and save it
Invite individuals to take an online assessment to produce a match score against the profile
Optionally, obtain a more detailed extended report on however many of these individuals as required.

In some embodiments, the system—by ensuring they start with a good set of competency requirements—enables person-job matching to be carried out by relatively unsophisticated users. Having decided on the competency requirements, the system will select a set of assessments designed to optimally measure the competencies and provide the means of online administration of these to specified candidates. The system then uses a matching algorithm to compare each person's score profile to the competency requirements and provides a report to the user on the relative goodness of fit of candidates to the position.

The selection of assessments may be optimised to measure competencies in dependence on the previously determined competency requirements. A multitude of tests is available to measure a wide range of competencies, with specific tests measuring specific competencies or possibly groups of competencies. It may not be necessary to subject candidates to broad, exhaustive assessment, but only a subset that measures competencies of particular interest. A competency weighting may be associated with each competency, according to importance class. For example, only competencies above a pre-defined threshold may be used to determine the selection of assessments. All assessments required for the selected competencies may be selected.

Further, an assessment that is appropriate to an essential competency (that is, a competency that is above the pre-defined threshold) may also be used to test a non-essential competency. Thus it is possible to evaluate competencies that are otherwise not considered sufficiently important to merit dedicated assessment. Alternatively, a combination of assessments that covers the greatest exposure in the weighted competencies for a given limited number of assessments may be determined. In this manner broad, exhaustive assessment may be avoided, therefore streamlining effort and optimising outcome.

For evaluating the assessment data derived from the assessments, a weighting scheme may further tailor the result to the user's needs. As described above, the assessments provide information regarding the competencies that are essential, but they can additionally provide information about further (non-essential) competencies. By using the assessment data that is available in any event to evaluate further competencies, the information extracted may be increased at no additional assessment effort. A score that relates to competencies that are important but not essential can be combined with the scores that relate to essential competencies by weighting the scores according to the associated competency weighting. By combining scores of different relevance (as described above)—or otherwise—in the preferred embodiments a simple assessment (in the form of a single mark, score or rank) is provided for each candidate. This facilitates interpreting the score results, as the result provided to the user could be as simple as a single 'job suitability' score for each candidate.

Figure 30:
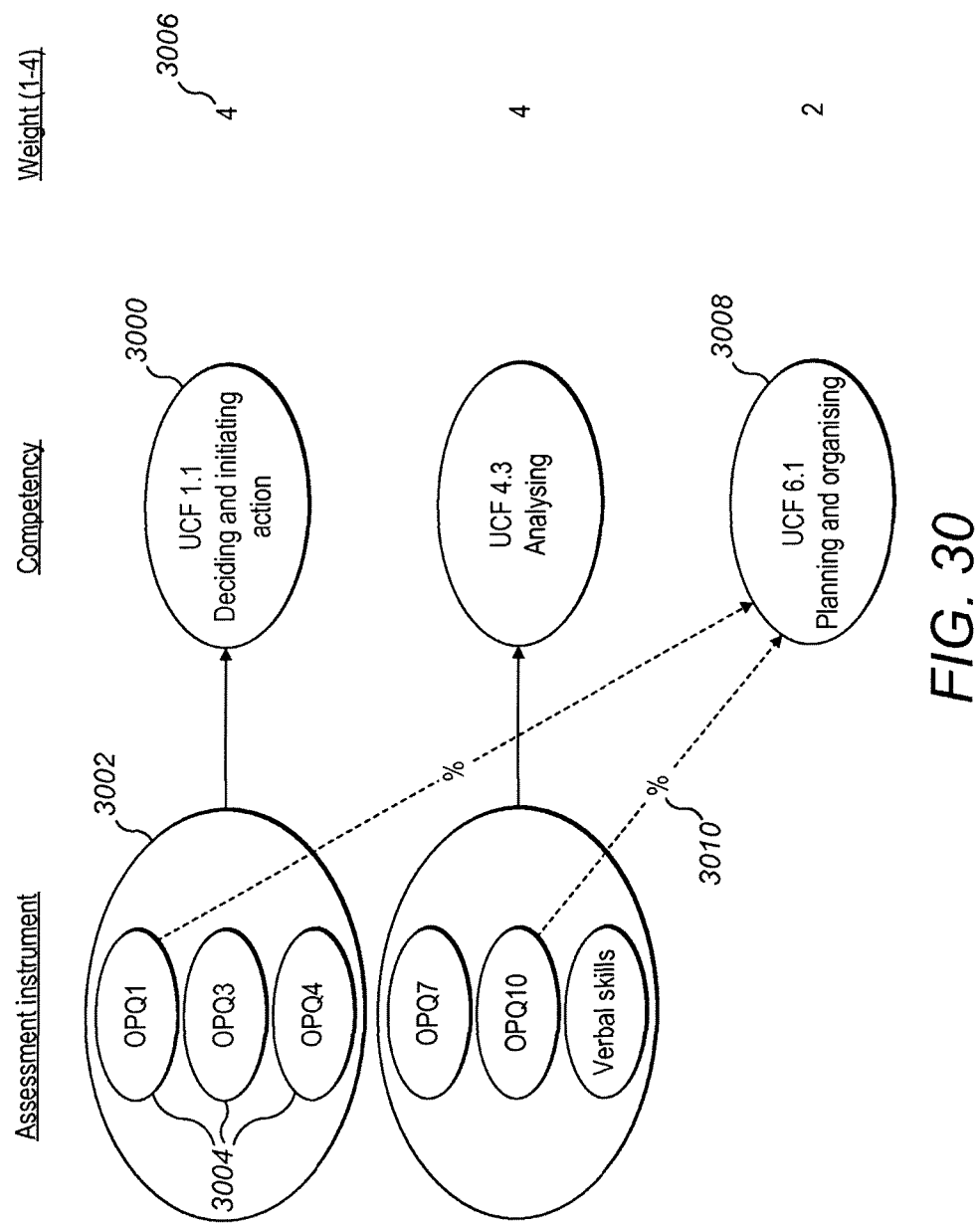
FIG. 30 shows an example of the selection of assessments and weighting of scores.

FIG. 30 illustrates an example of the selection of assessment instruments (typically comprising a series of individual assessments or assessment methods/techniques) and interpretation of scores as described above. A particular competency 3000 of interest is determined based on whether it has an associated competency weighting above a particular threshold (here: weight 4 out of 4, but in other embodiments weight 3 or 4 out of 4). For the particular competency 3000 of interest an assessment instrument 3002 is generated that combines a number of individual assessment methods 3004 (here OPQ1, OPQ3 and OPQ4 for a first assessment instrument, and OPQ7, OPQ10 and "Verbal skills" for a second assessment instrument) that are known to be particularly relevant for determining that particular competency 3000.

In assessing the scores from the assessment methods once the assessments have been undertaken by the relevant candidates (and again with reference to FIG. 30), it is possible that one assessment method 3004 is of greater relevance than another, in which case the scores from the individual assessment methods are weighted. In any event, the scores from the individual assessment methods are combined as appropriate to form a competency score. The calculated competency scores are weighted using weights 3006 and combined in order to present a single score for the particular candidate. With such a system, informed selection of candidates is possible for a user without specialist knowledge about each type of assessment, what competencies it evaluates, and how to interpret the results. Instead, the user may rely on the system to optimise the assessment process to the user's requirements, and evaluate the results in accordance with the user's interests.

In the example shown in FIG. 30, some of the assessment methods (here: OPQ1 and OPQ10) are appropriate for assessing a further competency 3008 that was not specifically selected for testing (here: weight <4). In a variant, the individual assessment methods may be used to determine a competency score for the further competency 3008. As for the other competencies one assessment method may be of greater relevance than another, in which case the scores from the individual assessment methods are weighted at 3010 and combined as appropriate.

The system may be integrated in a platform that enables further functionality, for example administration of applicants; submission of invitations to candidates to undertake an assessment; administration of assessment results; collecting, scoring, evaluating and/or reporting of assessment results; presentation of assessment results; and/or other functions relating to a characterization profile and potential candidate entities.

Further Features

The following relates to commentary on the system described and further features which may be included:
- In the system, three types of competency importance classifications are distinguished:
  - Predicted importance: what the Bayesian estimation process has predicted the importance to be.
  - Rated importance: what a rater of the job has rated the importance of a competency to be (rater could be the "job owner" or an invited rater).
  - Selected/Final importance: The final importance selected by the job owner for each competency, having taken into account the predicted importance and optionally all instances of "rated importance" by invited raters.
- The database stores all types of importance profiles for a job: Predicted importance; Rated importance (could be more than one if several raters); Selected/Final importance.
- A Multi-rater facility allows other users, specified by the original client, to moderate the competency importance levels output by the system, by rating them. The system would then use the multi-rater input (ratings) as data for the second iteration of the Bayesian estimation of the profile (starting where job database estimation left off).
- The system is "self-learning", with the created competency profiles being fed back into the database and used in the estimation of new profiles.
- The classification system is based around the standard occupational classification or SOC, but the program has potential to move beyond this framework.
- Use of a Universal Competency Framework (UCF) with, for example, 112 competencies or alternatively, for example, 93 competencies at the component level. The client competency models can be mapped to the UCF, so the profiling process can be used with a client model/language which allows for great flexibility.
- Ways in which competency profiles today are determined include conducting analysis of the job in question, for example:
  - Directly measuring the competency profile of the job using Card Sort. This can be quick but is difficult to standardise and validate.
  - Deriving the competency profile from a detailed task analysis of the job using a Work Profiling System (WPS). However, this is time consuming, needs experts but is rigorous, standardised and provides good validity.
  - Consulting a database of jobs/occupations allows for mapping of, for example, the O*Net job database content to the UCF and the generation of profiles from that. This is simple but relies on quality of job analysis data in O*NET, and relevance of chosen category to actual job—and ignores the strategic use of competencies.
  - Most job databases, like O*NET, do not have any job-level data but rely on generic data.
- Based on thousands of detailed job analyses using the Work Profiling System (WPS). Each job analysis can take days to complete but provides the most robust data on which to base competency requirements.

WPS has been mapped to the UCF and so component and dimensions level profiles can be generated for any job analysed with WPS.

In order to account for every job being different, over 7000 jobs have been mapped to the SOC codes used in O*NET. This means it is possible to look at the similarities of the competency profiles generated for individual jobs within each job family as defined by SOC.

The importance of a competency is partly a function of the job family and partly a function of organizational context.

It is possible bring together the structure (SOC) used for making O*NET practical with the richness of the data that has been collected over the years using WPS to underpin the process of competency profiling.

Rather than giving the user a 'blank' sheet and then asking the user to pick what the user thinks are relevant competencies, the user can be provided with a lot of information about what competencies are typically important or not important in his/her jobs/roles.

If that is the starting point, then the users are more likely to end up with a profile of requirements that accurately reflects the job: you can build on the foundation of many thousands of job analyses rather than starting from scratch each time.

Each new profile is derived from hundreds of previous ones.

Map client competency models to UCF, so you can use the system profiling process with client model/language.

Link to products: products are mapped to competencies, so it is possible to immediately suggest which products to use to assess for the selected competency model.

Estimate probability of WPS (job analysis) task items: Can be used as first-draft job description, or as a first-cut of which items to respond to in a job analysis survey.

Move beyond the OC as the framework users interact with (can still use it behind the scenes).

Coverage gaps may be addressed by drawing on O*Net data

In those cases where there is no or insufficient data in the WPS database, competency requirements can therefore be generated from equations that relate UCF (or other competency model) to O*NET variables.

Bayesian methods may also be used to combine data from various sources—WPS job data; O*NET job data; date from users of the system—and suitably weight the value of the different sources of data.

Users may also use the system to create and rate jobs, and combine jobs created by these different users (for example users from the same organisation) into an integrated set of jobs. In other words, uber jobs or requirements may be made out of smaller completed sessions.

(Quick) Registration page
  Pre-populated with the details input by the job creator—the (new) rater just has to validate them
  User inputs more detail, creates a password and submits their registration
  The system generates a verification email that contains a link to the registration page (so they can log in)
Rater registration page
  On receipt of the verification email the user clicks to go back to the registration page—and complete the registration process—AND upon registration be directed straight to the Rater landing page.
Buying page/basket
  Allows buying of Job profiles, job scores, enhanced reports.
  All three items listed as available to purchase—User adds whatever quantity of each they require.
  Checkout page—allows a user to us existing process for checking-out once the items have been added to the basket; payment on account or via credit card.
  A confirmation email is sent to the Job creator once the credits have been purchased (as per existing process).

One example of how to determine whether a context variable is deemed "relevant", is to make use of Kendall's Tau-C statistic, which indicates how strong the relationship is between two categorical variables (such as a context variable with, for example, 5 levels versus a competency variable with 4 importance levels). The Kendall's Tau-C value is between 0 and 1.

The following steps are taken:
The Kendall's Tau-C statistic is calculated for each combination of SOC occupation X Context Variable X UCF competency. For example, this statistic may be calculates for the relationship between the context variable "Level of Education" and competency "Deciding and Initiating Action" for the SOC occupation "Marketing Managers". For the same SOC occupation, the Kendall Tau-C metric is continued to be calculated for all combinations of Context Variables X Competencies (21 Context variables X 20 Competencies).

These analyses are repeated for all SOC occupations at all four SOC levels.

Some cut-points are then used to determine how large the Kendall's Tau-C value needs to be for a relationship to be considered important and how many competencies a context variable needs to have a meaningful association with for the context variable to be included, for example:
  Minimum Kendall Tau-C cut-point: 0.1
  "Substantial effect" Kendall Tau-C cut-point: 0.2
  Minimum number of competencies affected with at least minimum Kendall Tau-C value: 4
Decision rule on which context variables "matter" for one SOC occupation. Variable included if it
  affects at least 4 competencies with a Kendall value more than 0.1
  affects ANY competency with a Kendall value more than 0.2

In this embodiment, these current analyses are only conducted on the UCF20 competency model; the same or similar analyses may also be run on other competency models. In alternative embodiments, context variable relevance may be determined using different cut-points—or different methods altogether.

These procedures may be re-run periodically as more data is added to the job database, as the determination of which context variables are most relevant will become increasingly accurate as data is accumulated.

FIG. 29 shows an illustration of how the relevance of a context variable is determined, in the form of the calculation for one SOC occupation. Shaded boxes 2900 indicate a likely relationship between competency and context variable (i.e., that the importance of competency varies with the levels of the context variable).

Occupation-dependent context questions: The set of job context questions that are asked of the user (and that form part of the input into the Bayesian estimation procedure) are dependent on the occupation code selected by the user for the job. A piece of analysis has been conducted to determine, for each occupation code (at each of the four levels), which set of WPS-based context questions are most likely to be informative about the predicted importance of competencies. This ensures that the user is less likely to have to respond to context questions that will not make a material difference to the estimated competency profile.

Competency task statements: For each of the competencies, a short matched "task statement" has been written that illustrates the task/activity context where the competency will tend to be required. For example, for the competency "Deciding and Initiating Action", the matched task statement is "The job requires making decisions and taking responsibility for them. Typically it will involve making tough choices based on careful consideration of risks, taking responsibility for such decisions, or taking action on one's own initiative". The intention of these task statements is to illustrate the competencies in task/activity terms, rather than in terms of personal requirements. If users think of the competency constructs in terms of what activities are actually required in the job rather than which personal qualities they would like to see in job holders, they are more likely to accurately judge the importance of the competency constructs.

Task/activity oriented rating scale: This is related to the previous point. The rating scale on which the users are asked to indicate how important each competency is to the job is task/activity oriented. This contrasts with the personal requirements oriented rating scale ("Essential", "Relevant", "Less Relevant", "Not Relevant") that tends to be used. The final competency profile can still be phrased in personal requirements terms using logic such as "because this competency is a defining part of the job, it is essential that job holders are good at this competency". The task/activity rating scale is as follows:

"Not part of the job": These activities are not part of the job. If a job holder performs these activities poorly, there is no risk that the overall objectives of the job will not be reached."

"A minor part of the job": These activities are not important to the essence of the job. The job role would remain the same even if these activities were excluded. If a job holder performs these activities poorly, there is a small risk that the overall objectives of the job will not be reached."

"A significant part of the job": These activities are important to the essence of the job. If several of these activities were excluded from the job role, this would be a completely different job. If a job holder performs these activities poorly, these is a substantial risk that the overall objectives of the job will not be reached."

"A defining part of the job": These activities are key to the essence of the job. If any of these activities were excluded from the job role, this would be a completely different job. If a job holder performs these activities poorly, it is almost certain that the overall objectives of the job will not be reached."

Alternative embodiments may implement some or all of the following features:

Link the predicted competency profile to a large catalogue of assessments, which in turn is linked to a meta-analysis database of validation evidence. When combined, this provides the functionality to predict the competency requirements are for a job, to recommend which assessments would be optimal to assess individuals in terms of their potential to match the requirements of the job, and to predict the level of validity to expect if the recommended assessments were used to assess for the job.

Predict probability of (WPS) task items: Using the same Bayesian estimation process used for estimating competencies (with the same inputs: occupation code and context variables), instead the probability of WPS task items are estimated (examples of such items are "Scanning written information", "Creating appealing presentations", "Cataloguing material". In essence, competencies are swapped out for WPS task items as the dependent variable of the estimation. This is possible because the jobs in our WPS job database contain information on both competency importance scores as well as ratings of importance of hundreds of specific tasks. There are several possible applications of such estimated task importances:

Create a first-draft task-based job description: The competency estimation process helps a user specify the competencies required of a person doing a job. Estimating task importances would help the user list the specific, detailed activities the job holder would need to perform.

Create a first-draft of a job analysis survey: The task items predicted as most likely to be important could be used to construct a job analysis survey where job stakeholders are asked to directly rate the importance of each item for a job. This contrasts with scenarios where such stakeholders would have to rate a larger volume of tasks where many such tasks are unlikely to be relevant for the job.

Shortened WPS process: The process for conducting a full WPS job analysis process requires an initial phase where the set of WPS task items to be responded to are narrowed down by, first, selecting the appropriate version of WPS for administration, and second, conducting a card-sort to determine which questions within the selected version to respond to. Drawing on a set of items with estimated importances could bypass these two steps.

Run estimation procedure for client competency models: Functionality can be designed where a client competency model is mapped to the models in the estimation system, and predictions can be generated and reported directly into the language of the client competency model.

The following table shows examples of "user stories", illustrating potential uses of (and further information relating to) the described system, to be understood in the format "As a . . . I want . . . , so that . . . ."

| Domain | Summary | As a... | I want... | so that... |
| --- | --- | --- | --- | --- |
| Candidate assessment | End user meta story | User | To get a rank ordered list of my candidates in terms of how likely they are to succeed in the job | I can make a rapid and reliable hiring decision, making sure I get the right person at the right time in the right role |
| Registration | User authentication | User | to be able to access job profiling tool via my Central login | I do not have to have separate passwords and user id's |
| New job profile creation [1] | Create job record | User | to be able to create a job record including a name and description | I can easily find the job again |
| New job profile creation [2] | Select based job | User | to be able to select the 'base' job that my job profile will be based on | I have to answer as few questions as possible to create my recommended job profile |
| New job profile creation | Variable number of 'context variable questions' | User | to have to answer only relevant context variable questions based on the job that I have selected from the static list | I don't waste time answering questions that are irrelevant |
| New job profile creation | Descriptions of context questions | Product Owner | to show users some additional information about the context variable questions - to put the context variable questions into context! | users are more likely to respond consistently |
| New job profile creation [3] | Display predicted competency importance | User | to see the predicted competency importance ratings (UCF20) for my job once I have entered my responses to the context variables | I am able to review them |
| New job profile creation | Display certainty of predicted importance ratings | Product Owner | to be able to tell users how sure we are in the competency importance prediction that we make | users can understand how comfortable they should feel in making changes to the predictions |
| New job profile creation [4] | Save changes to predicted importance ratings | User | to save the importance ratings once I have reviewed them | I either accept all predictions (having reviewed them) or save the changes that I have made to predictions |
| Additional Ratings [5] | Review multiple ratings | User | to be able to see other job rater views on the competency profile alongside mine | I can make final decisions on the profile that will be used to assess candidates |
| Report generation | Printable/saveable job profile/description document | User | to be able to print or save a document that shows the job profile I have created (including some standard area's for me to enter further information) | I have a physical record of the job profile |
| Candidate assessment | assessment recommendations | User | the job profiling tool to recommend the assessments that my candidates should complete based on the final job profile | I do not have to be an expert to use the tool |
| Candidate assessment [6] | Invite candidates | User | be able to enter candidate names and email addresses | my candidates are assessed |
| New job profile creation [7] | User job library | User | to be able to browse all jobs I have previously created on the system | I can easily access previously created jobs, and either edit the job, invite candidates to assess against them, or clone them as a basis for a new job. |
| New job profile creation | Organisation job library | User | to be able to access a list of all jobs created in my organisation by myself or other users from my organisation | I can select a relevant existing job for editing, cloning, or assessing candidates, or inspect/build relationships between jobs in my organisation |

| | | | -continued | |
|---|---|---|---|---|
| New job profile creation | Associate job with organisation | User | to make sure a new job is automatically associated with the organisation the job owner belongs to | we can keep track of which jobs from the same organisation that have been created on the system |
| Overall system | Create new organisation | Central Administrator | to be able to register new organisations on the system | so that the job owner users can be associated with the organisation they belong to |
| Overall system | Associate user with an organisation | Central Administrator | to be able to associate a job owner user with an organisation | the organisation context of a user is available when the users creates new jobs |
| Design | Extensible architecture | Product Owner | the backend architecture of the application to be flexible, modular and extensible | so that I can easily extend the functionality the profiling system exposes |
| Data Extract [8] | Access to job database | Product Owner | easy direct query access to all aspects of the SQL database where job and usage data is being stored | I can pull out job information to enhance and improve the job database underpinning the application |
| Registration [9] | Register new external user | User | to enable the system to register a new external user on the profiling system | job profiling activities can be performed on behalf of the external user |
| Data Extract | Get list of registered external users | Central Administrator | to be able to get a list of all external users from my integrator user account that have been registered on the profiling system | I can review and manage the users that have been registered |
| Overall system | Get list of registered external users from an organisation | Central Administrator | to be able to get a list of all external users from a specified organisation that have been registered on the profiling system with my integrator user account | so that I can review and manage the registered external users |
| Data Extract | Get all organisations registered to integrator account | Central Administrator | to get a list of all organisations that have been registered to the integrator account on the profiling system | so that I can review and manage the organisations my users are located within and are using on the system |
| New job profile creation | Get list of jobs in organisation | User | to get a list of all jobs registered to my organisation | I can check whether the job I am profiling has been profiled before by someone else, or I can find a job that is similar to the job I want to profile, and I can use it as a template |
| New job profile creation | Get jobs that are hierarchical child jobs of a specified job | User | to be able to get a list of jobs that are hierarchical child jobs of a specified job (i.e., that report to the specified job) | I can review the job content and competency requirements of jobs at different reporting lines and levels in relation to each other |
| New job profile creation | Set parent job | User | to be able to set the parent job of a specified job | I can manage the hierarchical relationships between jobs |
| Data Extract | Access to ALL job profiles | Central Administrator | to be able to access details of ALL Job profiles created in the system | Assist with customer enquiries etc . . . |
| Data Extract | Ability to extract job profiles from the system | Central Administrator | to be able to extract all Job profile details at any time from the system | I can use the information to update the database of job profile information - so that it is kept constantly up to date |
| Additional Ratings [10] | option to exclude some ratings | User | to be able to exclude certain raters importance rating scores from the summary page view | I can focus on specific importance ratings that are not skewed by any one individual rater |

| | | | | |
|---|---|---|---|---|
| Additional Ratings | New rater viewing job profile being created | Invited rater | contributors will not have access to Screen1 and Screen 2, but Job Name and Job Description to be displayed in all Screens (except for Screen 1); and to view the summary details with predicted competencies importances provided by the system but NOT any ratings submitted by other invited raters | I can add my own ratings to each of the competencies |
| Additional Ratings [11] | Submit competency ratings | Invited rater | Add my competency importance ratings to the Job profile being created | The role profile created can include feedback from a number of different people involved in the role |
| Overall system | Prevention of amendment of existing job profiles | Product Owner | to be able to prevent the amendment of existing Job profiles | Users cannot abuse the system, simply amending existing profiles rather than creating new ones each time |
| Data Extract | Access to usage details and statistics | Product Owner | to have access to usage statistics (number of profiles, reports, assessed candidates etc . . .) | I can track the success of the solution |
| Overall system | Future proofing to include third party tests | Product Owner | to have the solution future proofed to incorporate third party tests and assessments | When the third party/ UCF mapping has been completed, more tests and assessments can be offered as part of the assessment process |
| Candidate assessment | Use Candidate management process | Product Owner | to use the existing candidate management functionality already available to manage the assessment process | there is a consistent solution offered to customers |
| New job profile creation [12] | No effect from underlying database updates | Product Owner | to have updates made to the underlying database, but not have these updates affecting any Role profiles that have been created and Saved. | Role profiles that have been created remain valid and can be referenced by users at any time after their creation (even if the profile would be likely to change if it were recreated, due to the updates to the database). |
| Registration | Granting access to Central | Central Administrator | Review the users' application and access information about the individual | I can make a decision as to whether to grant them access to Central |
| Registration | Approval of Central access | Central Administrator | to approve or reject a user's application and send notification email | I can give access or deny them access and notify them automatically of the decision and impact thereof |
| Candidate assessment [13] | Comparison of candidates at different times | User | to be able to compare candidates that have been assessed against the same role at very different times - AND also be able to distinguish between different groups of candidates that have been assessed against the same role profile at different times. | I can make a direct comparison of candidates over time (OR include additional candidates at any time during the assessment process) |
| Additional Ratings [14] | Pre-identification of invited raters | User | to be able to invite raters - invite them using an email with a unique URL that will take them straight to the registration page then contributor's landing page | they can rate the job profile I am creating |

| | | | | |
|---|---|---|---|---|
| New job profile creation [15] | Option to choose from drop down boxes | User | to not have to pick from all 4 of the drop down lists - put as a minimum I must select from box 1 | the process is a simple as possible. One selection MUST be made to ensure that the a high level competency selection can be made |
| Overall system | Class leading ease of use - for ALL screens | User | once I have selected the Job Profiler option to view a simple, easy to understand, uncluttered landing screen | the Job Profiler is easy to access and simple to use. |
| New job profile creation | View competency summary | User | to view ALL the competencies on one page - All 20 of them. The predetermined importance rating for each one of the competencies will be pre-filled and the user must have the option to click on any one of the other imp ratings as required. SCREEN could | the competency review and amendment process is as simple as possible |
| Additional Ratings [16] | Invitations to raters | User | to have NO restriction on the number of people I can invite to rate the role profile I have created, have fields available to input: - Rater name, email address, relationship to me (by choosing from a drop down list of options), | I can invite raters |
| Additional Ratings | Slider functionality on screen 3 | User | Slider functionality for Creator/Rater to rate competencies. It should also display predictions | I can finalise the job profile immediately |
| Candidate assessment [17] | Generating PJM reports | User | to have the option to generate a PJM report for any number of the candidates assessed | I can see more detail for any one of the candidates at any time |
| General screen navigation | Ease of understanding the creation process and screen flow | User | to know exactly where I am in the Job Profile Creation process - perhaps using a STEP process, highlighting at the top of the web page what steps there are and which have been completed. | I am clear as to how many steps there are in the process - and how many of them I have completed |
| New job profile creation [18] | Making amendments to role profiles | User | to be able to go back and amend details I have submitted when creating a new role profile - BEFORE I have saved the role profile | I can correct any errors I believe I have made AFTER the event |
| Candidate assessment | Track assessment progress | User | to be able to track progress of candidates being assessed | I can see what's going on with the assessment |
| Candidate assessment | Chasing candidates | User | to be able to chase candidates (if required) that are involved in the assessment | I can control the assessment project |
| Individual Store [19] | Candidate assessment against multiple roles | User | Create a job profile and assess against that role with pre-existing test and assessment results - i.e. Be able to assess ONE candidate against a number of different roles (providing the minimum assessment requirements are met) | I don't have to ask candidates to sit the same assessments numerous times. |
| Overall system | Data Protection Notice content | Product Owner | The Data Protection Notice for ALL users (Role creators and role raters) to include permissions that allow for the data submitted to be used to update the underlying database. | I can keep the system up to date with the latest information captured |
| New job profile creation | Cloning options | User | when cloning a job profile to be able to view ALL the inputs previously made for the job profile AND be able to make amends to any of the inputs I wish to. In addition, I would want to be able to change the name of the Job profile (this information would | it is easy for me to create a new role that is very similar to an existing role on the system |

| | | | | |
|---|---|---|---|---|
| Candidate assessment | Report options available | User | The 'purpose' of an activity should be determined once a User has confirmed that they wish to assess against a job profile they have created. | it is as uncomplicated as possible for untrained users to get what they want from the system. |
| Additional Ratings [20] | Inclusion of a comments field for raters | Invited rater | to have the option to include comments when I add my ratings for a certain job profile | I can let the job creator know anything else that I feel is relevant to the job profiles being created. |
| Additional Ratings | Multiple ratings | Invited rater | to be able to complete ratings for all the profiles I have been asked to rate in one go - i.e. not have to use the link from each of the separate emails I have been sent | the rating process for multiple profiles is as painless as possible. |
| Additional Ratings | Landing page for invited raters | Invited rater | to be directed from the email I receive inviting me to rate to a landing page that offers me instructions and information on what is required of me/things to consider etc . . . | I can submit the best rating possible. |
| Additional Ratings | Resend email functionality | User | to have the option to RESEND any rater invites | any raters that say that have not received the email with the unique link can receive it and then go on and rate the job profile |
| Candidate assessment | Request additional reports | User | to have the option to order additional (more detailed) reports by using the links on the 'Completion Status' page | I can view a more detailed report ONLY for those individuals that I need to/want to . . . |
| Candidate assessment | Select purpose for candidate assessment | User | once I have chosen OR created a role profile to choose an option to assess candidates and then be taken to a screen where I select the purpose of the assessment (from Selection OR Development) | Once I have chosen the reason for the assessment it pre-populates the screen where I complete all the individuals' details |
| New job profile creation [21] | Making amendments to competency estimation input parameters - BEFORE user requests the benchmark (in Screen 3) | User | to have the ability to make amendments to competency estimation input parameters - BEFORE user requests the benchmark (in Screen 3) | for example, I can stop half way through creation of a profile and come back to it at a later time to complete and SAVE the profile |
| New job profile creation | Banding rules for competencies ensure that there are limits to how many competencies can be classified into each importance band | Product Owner | to ensure that there are limits to how many competencies that can be classified into each importance band | we don't have situations where too many competencies are classified into the higher importance bands |
| Implement WSI OD back-end | Developer | Implement WSI OD back-end for JPT | it could be integrated with the front end screens at a later date | |
| System Testing UAT Support | | | | |
| New job profile creation | Saving inputs when creating or cloning a new job | User | To be able to submit responses to the additional (context variable) questions and for those responses to be saved in the database. This means that I can go between screens and not lose any of the responses I have input to either of the screens. In addition, if I am cloning a job BUT I choose to change the original foundation job (new SOC code) the system will return the results from the | . . . should I move away from that page and come back to it, the responses I gave previously are still available for me to view/amend. |

| | | | | | |
|---|---|---|---|---|---|
| | | | 'supplementary' questions that are consistent across the two different roles being considered. Any previously submitted responses that are not relevant to the new job being created (from the cloned job) will be deleted so that they have no impact on the new job. | |
| New job profile creation | There is a requirement to ask the Job creator to explicitly state what level of job they are looking to define/ profile. | User | to be able to input the level of the job I am creating. This input will be by choosing the appropriate option from a drop down list. | The 'system' can make the correct selection of which Verify level (etc.) to include as part of the assessment suite to create the job score. |
| Overall system | System needs to be localised rather than just translated - | User | to be able to use the system in a language and more technical terms that are familiar to me. (e.g. US$ referenced and not UK£). There is also the issue of payment currency to address, but this can be picked up at a later date. | The service can be used with no issues outside of the UK. |
| Overall system | System Admins (working on Helpdesk) need to have access to make changes to any user inputs as required. | Administrator | To be able to help users by having access to everything they can do on their system and make changes even when they are not able to. | Customers that make mistakes/errors when using the system have a support mechanism that they can use - that can actually help them. |
| New job profile creation | Original rater (Creator) submission is saved, not just overwritten when the FINAL profile is confirmed. | User | To have my first rating submission saved, just as it is for all other raters. Any changes I make when finally confirming the job profile WILL NOT overwrite my original rating submission, but will be saved separately. | In future analysis of job creator behaviour can be analysed - how frequently do raters change their submission based on the responses of other raters for example . . . |
| Data Extract | Offers the user the opportunity to carry out two distinct tasks: Profile a specific job AND use the job profile created to assess candidates against (and generate a job match score). There is a need to be able to extract the full details of the job profile created from the Central system in order that it could be used elsewhere - notably with the PJM functionality directly. | User | to be able to extract details of the job I have just created using a format that can be used in other systems (primarily xml format that can be uploaded). | existing clients with their own systems and are able to use the Job profiler and then take the results and use them on their own system. |
| New job profile creation | Need to input additional information about the job being created - so that the information is available in the Job profile report | User | To be able to input the following information: Organisation, Department, Location | The information captured can be included in the Job matching competency report |
| New job profile creation | When the prediction is returned back to the Job creator it should be possible to highlight those competencies where the system is 'less certain' about the Importance | User | to be able to see clearly which competencies I should focus my efforts on based on the predictions that are least certain as highlighted to me. | I can create a focused job profile as efficiently as possible, concentrating my efforts on those areas where they are most required. |

| | | | | |
|---|---|---|---|---|
| | ranking prediction we have made. All details of the prediction are available from the graphical display that is accessed by clicking on the competency name, but it should also be possible to highlight to users where the prediction is less certain (perhaps limited to 3 competencies we are LEAST certain about) | | | |
| New job profile creation | Require the options offered in the 4 drop down selection boxes to be as easy to understand and navigate as possible | User | to VERY easily navigate the job list options to be able to find the best match as simply as possible. | I can save time with my job selection - improving the overall process for me. |
| New job profile creation | Need to be able to offer the Creator the option of choosing from a summary list of 'Most popular' job titles - to make the job name selection process quicker and more straightforward | User | to have the option of choosing from a list of jobs that are chosen by users most often AS WELL AS being able to choose from the drop down lists available to me. | I can save time with my job selection - improving the overall process for me. |
| New job profile creation | to have a Job Hierarchy in the Job Profile page | User | to have a Job Hierarchy in the Job Profile page | |

Notes on the above table are as follows:

[1]  1. Create a job table in database
    2. Create a stored procedure to save jobs in database
    3. Create a job controller with methods
    4. Create a job view

[2]  Once this selection has been made and the user clicks NEXT to navigate to the next page (Context variable questions) the charge occurs and the user cannot make any change to the previous choices - only changes to the subsequent pages.

[3]  1. Call Estimation Engine
    2. Populate UI from Estimation Engine
    3. Allow users to select competency importance

[4]  Saving the ratings you have agreed will mean in effect that you have SAVED the profile as a whole. NO changes possible after this point.

[5]  Display ratings from multiple raters (and predictions)

[6]  Using the existing 'Completion Status' page, need the following fields to complete/view:
    Purpose of assessment (Selection OR development)
    Email address
    First name
    Last name
    Title
    (optionally) Language (will determine what language the individual is first offered for assessment)
    Gender
    (optionally) Product
    Job Name
    Status
    PJM score
    NEW (view only)
    OPTION to order additional reports

[7]  Task 1 is the tabular view of jobs with the action options available etc. Task 2 is a tree/org view of jobs crated (To be completed in future iteration—TBC)

[8]  Need to be able to gain access to the underlying data in the system AND be able to update it - but this should all go through the existing protocols. No special access to the database is expected.

[9]  Access to the Job profiler functionality is 'free' to all Central users, so this requirement is already available as part of the general Central functionality.

[10] view 2 - display ratings from multiple raters (+predictions)

| | |
|---|---|
| [11] | view1 - creator - view summary; Lock the profile & proceed to job library (to print Job profile); Invite raters;; back button - 0.5 pd<br>view2 - rator - view summary; Lock the profile & Submit ratings (it will take them to the landing page); back button - 0.5 pd |
| [12] | Profile created remains fixed, so that there is a constant record of the Job profile created on the system. If users wish to take advantage of system updates they have to create a new profile which may or may not be different from one created with the same input parameters as before the update was carried out. |
| [13] | No candidate grouping<br>Any review of candidates that have been assessed will be carried out using the filters available on the system (ie. Sort results by date etc - then individuals can then be compared. No other facility is required. |
| [14] | All raters must register before taken to the landing page. |
| [15] | 1. Create tables for occupations with foreign keys, etc.<br>2. Create a stored procedure to read the list of occupations<br>3. Add new methods to the job controller to retrieve the list of all occupations and save it into the cache<br>4. Add 4 new drop down lists to the job view to display occupations<br>5. On selection change update sub-occupations by querying the cache with LINQ |
| [16] | Must include details of suggested number of raters etc. in the HELP text on the page - but have no system restrictions.<br>This is the Invite Rater screen story. Estimates updated to 5 pds.<br>Task1 - Sorting and Filtering<br>Task2 - Invitation Links<br>Task3 - pagination<br>Task4 - Add buttons for Invite & Resend for each rater and each job<br>Task5 - Customise email link |
| [17] | no selection drop-down, just additional button on Completion status page |
| [18] | Once a job profile is finally submitted, all screens become read only. If user decided to lock down the ratings and generate report, then the contributor who had not completed the ratings will not be able to do it and get error. |
| [19] | Individual store<br>Assessments against roles always start with the role and then lead on to the assessment (rather than the other way round). Expected that when details are input in the 'invite individuals' section that there is recognition if the individual is already 'in the system' - the role new role profile can then be assessed against the results that have already been used.<br>For the same candidate is assessed for 2 jobs, the scores for job 1 will affect the scores for job 2 |
| [20] | Just one free form text field - OPTIONAL for raters to submit any comments |
| [21] | Only following 2 things that are allowed to be changed are -<br>SOC codes<br>Context Variable |

The application responds to the growing need for organisations to have real confidence in matching the right people to the right jobs, so that they perform to their highest potential. The system provides:

- a quick, easy and highly reliable means of measuring the fit, or match of an individual's competencies and potential, with the specific competency set required for a particular job.
- a robust way of creating a competency based job description for a specific job, and then assessing the degree of people's competency match with that job, providing an overall view of an individuals' fit to a specific role and can be used in both a selection and development context.
- a straightforward online step-by-step process, designed for use by line managers at any level in any organisation, not only by trained HR professionals.

the job analysis and specification on over 7,000 jobs.

Four main steps, each one completed online:
1. Define the job to be assessed for either recruitment or development by creating the job description with an easy-to-use, automated job description/competency builder.
2. The job description/competency builder is based on more than 7,000 jobs mapped to the SHL Universal Competency Framework.
3. You then have an option to share the draft job description with other stakeholders, inviting them for their input, which you can then consolidate into one overall job view, making changes to the final job description if you wish before locking it down.
4. Once the job description has been locked down, you then invite individuals to sit a couple of assessments, determined by the solution and tailored to best predict the competencies included in the job description. This results in a score and report showing how closely an individual fits the competency requirements specific to that job.

There is also an optional, more detailed "plus' report, giving you a bespoke interview guide specifically designed to help you explore that individual's stronger or weaker areas of fit to the job.

In addition to the foregoing, embodiments of the invention may have the following features:

the probability adjustment comprises a Bayesian probability calculation.

the method further comprises determining a characterization profile or model determined from the classification parameters.

the method further comprises determining a characterization profile or model determined from a subset of the classification parameters.

a step of forwarding a set of characterization requirements or a requirements request to a third party.

a step of receiving adjustment inputs from the third party.

adjustment inputs from the third party are distinguished by at least one of: a suitable label, a representation of the third party adjustment input with a symbol, icon, identification number, a display of hover-over narrative.

the step of generating a revised set of characterization requirements or a requirements request in dependence on the received adjustment input.

the step of determining a suitable assessment method or technique in dependence on the set of characterization requirements.

the step of selecting a plurality of assessment methods or techniques in dependence on the set of requirements.

the plurality of assessment methods or techniques are selected in dependence on a plurality of characterization parameters.

the characterization parameters are competencies.

associating a characterization parameter weighting, or an importance class, with each characterization parameter.

the plurality of assessment methods or techniques is further selected according to the characterization parameter weighting or importance class.

only assessment methods or techniques related to higher weighted or higher classified characterization parameters being selected.

the plurality of selected assessment methods or techniques are limited to a maximum number of assessment methods or techniques.

the selected assessment methods or techniques are optimised to relate to a maximum number of characterization parameters.

the selected assessment methods or techniques are optimised to relate to a maximum number of characterization parameters in a particular importance class.

the importance class is 'high' importance.

the selected assessment methods or techniques are optimised to relate to a maximum number of combined and weighted characterization parameters.

the selected assessment methods or techniques are optimised by using characterization parameter weightings.

respective assessment method weighting is associated with each assessment method and characterization parameter.

the step, prior to receiving the classification parameters, of evaluating a plurality of assessment results to generate a plurality of characterization parameter results.

the assessment results are individual assessment results resulting to a plurality of characterization parameters.

a plurality of assessment results are weighted and combined to generate a characterization parameter result.

the step of evaluating a plurality of characterization parameter results in dependence on a weighting input, said weighting input preferably being said characterization parameter weighting or importance class.

the step of calculating an assessment score in dependence on the plurality of assessment results and weighting inputs.

at least one of the following functions: administration of candidate entities; submission of invitations to candidates to undertake an assessment; administration of assessment results; collecting, scoring, evaluating and/or reporting of assessment results; presentation of assessment results; and/or other functions relating to a characterization profile and potential candidate entities.

A method of determining a job specification, the method comprising the steps of:
receiving a job classification;
selecting from a database in dependence on the classification a set of matching job profiles;
extracting for each matching job profile a set of assessed competencies;
determining the relative relevance of each of the competencies to the job classification; and
generating a job specification based on the determined relevant competencies.

the job classification comprises a standard classification.

the classification is the Standard Occupational Classification SOC code as used by O*NET.

the classification is based on a hybrid of standard classifications, wherein the granularity is provided by a first classification, in combination with the set of aggregations of levels provided by a second classification.

the competencies are defined according to a competency model of a sufficient number of parameters to allow for compatibility by mapping to an externally supplied competency model.

the competency model is the Universal competency Framework UCF.

the relevant competencies for a particular job are be determined from data compiled from assessments of workers employed in the same or similar jobs.

the relevance of competencies of a job specification are adjusted according to a set of contextual variables determined by answers provided by the user to questions relating to particulars of the job.

the particulars of the job comprise a requirement of the job, the job environment or of the job candidate.

the relevance of competencies of a job specification are adjusted by a moderator to which the job specification is referred.

the step of determining a raw profile for the entity in direct dependence on the selection of the set of entities in dependence on the classification parameters.

the requirements characterization profile is available alongside the raw profile.

the constructed requirements characterization profile can be overridden.

the requirements characterization profile is provided in adjustable slider format and preferably raw profile is available in fixed slider.

both an adjustable slider and a fixed slider are provided in conjunction with each other.

A method of facilitating the recruitment of a job candidate, the method comprising the steps of:
receiving job classification information;
determining, in dependence on the job classification an initial competency profile.

receiving job context information along with the job classification information.

refining the competency profile in dependence on the job context information receiving and incorporating feedback on the competency profile.

determining a suitable assessment for assessing potential candidate for competencies in accordance with the competency profile.

An apparatus for determining a requirements characterization profile for an entity, the apparatus comprising:
means for receiving classification parameters defining a requirement for an entity;
means for selecting, in dependence on the classification parameters, a set of entities from a database of previously assessed entities;
means for retrieving from the database characterization parameters of the selected set of entities; and
means for constructing, in dependence on the characterization parameters, a requirements characterization profile for the entity.

An apparatus for determining a job specification, the apparatus comprising:
  means for receiving a job classification;
  means for selecting from a database in dependence on the classification a set of matching job profiles;
  means for extracting for each matching job profile a set of assessed competencies;
  means for determining the relative relevance of each of the competencies to the job classification; and
  means for generating a job specification based on the determined relevant competencies.
at least one server, for providing access for a client or user either directly or via a computer, to the results of processing.
the server provides access via a web interface, to the results of processing.
one or more server functions are combined in a single server.

It will be understood that the invention has been described above purely by way of example, and modifications of detail can be made within the scope of the invention. For example, in the case of requesting replacement machine parts, this could be achieved by the method as described earlier, mutatis mutandis. In such a method, the classification parameters of the present invention might for example be a description and/or function of the particular desired machine part, and the characterization parameters might be properties of a potential replacement, with the requirements characterization profile describing a potential replacement, constructed by posing suitably crafted questions to the person requesting the replacement machine parts based on the characterization parameters.

Each feature disclosed in the description, and (where appropriate) the claims and drawings may be provided independently or in any appropriate combination.

Reference numerals appearing in the claims are by way of illustration only and shall have no limiting effect on the scope of the claims.

What is claimed is:

1. A computer-implemented method of assisting a user in assessing a set of potential candidates for an entity, comprising the steps of:
  receiving, from the user, classification parameters defining a requirement for an entity;
  selecting, in dependence on the classification parameters, a set of multiple entities from a database of previously assessed entities;
  retrieving, from the database, characterization parameters of the selected set of multiple entities;
  constructing, in dependence on the characterization parameters, a requirements characterization profile for the entity, the constructing comprising:
    determining a fraction of members of the selected set of entities having each of the characterization parameters in each of a set of importance classes; and
    constructing the requirements characterization profile to specify requirements relating to characterization parameters based on the fractions determined for the characterization parameters with respect to the respective importance classes;
  receiving a set of context parameters or variables, wherein (i) the context parameters or variables are determined in dependence on a classification of the entity and/or (ii) the number of context parameters or variables used is in dependence on the classification of the entity;
  determining modifiers with which to adjust the fractions in dependence on the context parameters;
  generating a revised requirements characterization profile in dependence on the determined modifiers;
  outputting the revised requirements characterization profile;
  receiving a plurality of assessment results;
  evaluating a plurality of assessment results to generate a plurality of characterization results relating to a plurality of characterization parameters;
  evaluating the plurality of characterization results in dependence on a weighting input, said weighting input being said characterization parameter importance class;
  calculating an assessment score for a candidate entity in dependence on the plurality of assessment results and weighting inputs; and
  providing the assessment score to the user.

2. The method according to claim 1 wherein the classification parameters are in the form of a nested list of classes and sub-classes.

3. The method according to claim 1 wherein only a subset of characteristic parameters is used to select the set of entities from the database, wherein only the most significant characteristic parameters are used, the most significant characterization parameters comprising those characterization parameters deemed to be at least one of most relevant and least relevant.

4. The method according to claim 1 wherein the characterization parameters are competencies.

5. The method according to claim 1 wherein the step of receiving the classification parameters comprises determining the classification parameters from answers to a series of questions concerning aspects of potential entities or candidate entities.

6. The method according to claim 1 wherein the context parameters or variables used are those context parameters or variables which are determined to have potentially greatest effect on the resultant probabilities.

7. The method according to claim 6 wherein determining whether a context parameter or variable has potentially the greatest effect on the resultant probabilities uses Kendall's Tau-C statistic.

8. The method according to claim 1 wherein context parameters or variables (i) are determined from previously determined context parameters and/or (ii) are determined from answers to a series of questions concerning aspects of potential entities or candidate entities.

9. The method according to claim 1 further comprising assigning the classification parameters to an importance class.

10. The method according to claim 9 wherein the importance class is one of: essential, desirable, relevant, non-relevant.

11. The method according to claim 9 further comprising the step of: determining the fraction of members of the selected set of entities with characterization parameters in each of the importance classes.

12. The method according to claim 1 further comprising determining a characterization profile or model determined from the classification parameters or from a subset of the classification parameters.

13. The method according to claim 1 further comprising the step of determining an initial profile for the entity in direct dependence on the selection of the set of entities in dependence on the classification parameters,
  wherein the requirements characterization profile is available alongside the initial profile.

14. The method according to claim 13, wherein the requirements characterization profile is provided in adjustable slider format and initial profile is available in fixed slider format, wherein both an adjustable slider and a fixed slider are provided in conjunction with each other.

15. The method according to claim 1, wherein the classification parameters defining a requirement for an entity comprises an occupation classification for a first job;
   wherein the set of multiple entities from the database of previously assessed entities are a set of multiple job profiles for respective other jobs that match the occupation classification for the first job; and
   wherein constructing the requirements characterization profile for the entity comprises generating a job profile for the first job that indicates levels of importance of different worker competencies relative to each other, wherein the levels of importance of the different worker competencies for the first job are determined based on importance classes that the job profiles in the set of multiple job profiles assign to the worker competencies for the respective other jobs.

16. The method according to claim 1, wherein constructing the requirements characterization profile for the entity comprises:
   determining, for each of multiple characterization parameters, a probability distribution over a same set of multiple importance classes, wherein the probability distribution for a particular characterization parameter is based on amounts of the entities in the set of multiple entities that have the particular characterization parameter associated with the respective importance classes in the set of multiple importance classes.

17. A system for assisting a user in assessing a set of potential candidates for an entity, the system comprising:
   one or more computers and one or more computer-readable media storing instructions that, when executed by the one or more computers, cause the one or more computers to perform functions comprising:
      receiving, from the user, classification parameters defining a requirement for an entity;
      selecting, in dependence on the classification parameters, a set of entities from a database of previously assessed entities;
      retrieving, from the database, characterization parameters of the selected set of entities;
      constructing, in dependence on the characterization parameters, a requirements characterization profile for the entity, the constructing comprising:
         determining a fraction of members of the selected set of entities having each of the characterization parameters in each of a set of importance classes; and
         constructing the requirements characterization profile to specify requirements relating to characterization parameters based on the fractions determined for the characterization parameters with respect to the respective importance classes;
      receiving a set of context parameters or variables, wherein (i) the context parameters or variables are determined in dependence on a classification of the entity and/or (ii) the number of context parameters or variables used is in dependence on the classification of the entity;
      determining modifiers with which to adjust the fractions in dependence on the context parameters;
      generating a revised requirements characterization profile in dependence on the determined modifiers;
      outputting the revised requirements characterization profile;
      receiving a plurality of assessment results;
      evaluating a plurality of assessment results to generate a plurality of characterization results relating to a plurality of characterization parameters;
      evaluating the plurality of characterization results in dependence on a weighting input, said weighting input being said characterization parameter importance class;
      calculating an assessment score for a candidate entity in dependence on the plurality of assessment results and weighting inputs; and
   providing the assessment score to the user.

* * * * *